(12) United States Patent
Nishio et al.

(10) Patent No.: US 6,643,042 B1
(45) Date of Patent: Nov. 4, 2003

(54) OPTICAL COMMUNICATION NETWORK NODE

(75) Inventors: Makoto Nishio, Tokyo (JP); Naoya Henmi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/126,248

(22) Filed: Jul. 30, 1998

(30) Foreign Application Priority Data

Jul. 30, 1997 (JP) ............................................. 9-203682
Feb. 19, 1998 (JP) ........................................... 10-056086

(51) Int. Cl.⁷ .......................... H04L 12/28; H04J 14/02; H04J 3/04
(52) U.S. Cl. ..................... 359/128; 359/115; 359/109; 370/395.1; 370/396; 370/535
(58) Field of Search ................ 370/396, 395, 370/400, 535, 399, 534, 536, 466, 465, 389, 419, 359; 359/128, 123, 117–119, 139, 135, 124, 154, 134, 127

(56) References Cited

U.S. PATENT DOCUMENTS

| 5,903,371 A | * | 5/1999 | Arecco et al. ............... 359/119 |
| 5,907,551 A | * | 5/1999 | Nishio et al. ................ 370/395 |
| 5,920,412 A | * | 7/1999 | Chang ......................... 359/128 |
| 6,069,719 A | * | 5/2000 | Mizrahi ....................... 359/124 |
| 6,137,800 A | * | 10/2000 | Wiley et al. ................. 370/396 |
| 6,366,377 B1 | * | 4/2002 | Tajima ........................ 359/128 |

* cited by examiner

*Primary Examiner*—Kwang Bin Yao
*Assistant Examiner*—Hanh Nguyen
(74) *Attorney, Agent, or Firm*—Scully, Scott, Murphy & Presser

(57) ABSTRACT

Optical signals having arbitrary wavelengths of wavelength-multiplex optical signals are separated in an optical add-dorop multiplexer 110. Switching of the signals after separation and an external signal that is input outside is conducted in an ATM switch 170. The signals after the switching by the ATM switch 170 is combined with wavelength-multiplex signals in the optical add-dorop multiplexer 110.

19 Claims, 27 Drawing Sheets

OPTICAL COMMUNICATION NETWORK NODE

BACKGROUND OF THE INVENTION

The present invention relates to an optical communication network node, and more particularly to an optical communication network node utilizing an asynchronous transfer mode (referred to as an ATM, hereinafter) technology and an optical wavelength dividing multiplex technology.

In recent years, together with improvement of a transmission band due to development of an optical fiber transmission technology, expectation to a broad band ISDN (referred to as a BISDN, hereinafter) has been raised, in which these kinds of communication services, such as voice, a data and an image, are contained together and which provides the services to a member. There is an ATM technology as a network technology indispensable for realizing this BISDN. The ATM is for dividing all information into packets, each having a fixed length, that are referred to cells, and transmitting the information after a header necessary for a routing is added thereto, as described in a publication "ATM-LAN" (authored by Hiroshi Shimizu and Hiroshi Suzuki, published by Soft Research Center on Feb. 10, 1995), for example.

In this case, the cells are transmitted to objective ATM nodes or terminals by means of two kinds of logical connections of a virtual circuit and a virtual path. The virtual circuit is the connection which is set by allocating network resources (a route and a band) necessary for communication between a plurality of terminals by means of a signaling procedure every time a call is generated.

The virtual path is a logical transmission path which is semifixedly preset between predetermined nodes in accordance with prediction of a demand for how many traffics are expected between nodes, such as exchanges and transmission devices within an ATM network, for example, or a monitoring result of an amount of traffics that are actually transmitted therebetween. The virtual path is a connection which does not depend on network topology formed by actually connecting transmission lines, such as optical fibers and coaxial cables, to each other. This virtual path contains a plurality of virtual circuits.

On the other hand, between ATM transmitting or exchange devices on the basis of such cells, because of development of an optical fiber communication technology, fast cells are converted into optical signals and transmitted. Moreover, in recent years, in order to make a network have a more massive capacity, an optical communication node is being investigated, in which a wavelength dividing multiplex typed optical cross-connect device for multiplexing and transmitting a plurality of optical wavelengths in one optical fiber transmission line and, in a communication node, an optical signal is switched to another predetermined node as it is, and an ATM device are combined.

Conventionally, as such an optical communication node, there is an optical communication network node described in First Optoelectronics and Communications Conference (OECC '96) Technical Digest, PD-1-5, pp. 10–11, 1996, "Optical Cross-connect System Using Fixed-wave Length Converters To Avoid Wavelength Blocking", authored by Tatsuya, Shiragaki, Tomoki Kato, and Naoya Henmi.

FIG. 30 shows such an optical communication network node.

In addition, in explanation hereinafter, it is referred to a "drop" that a signal from a network constructed of the optical communication network node is sent to other networks and devices connected to a node of its own, as a matter of convenience. On the contrary, it is referred to an "insert" that a signal from other networks and devices connected to the node of its own is sent to the network constructed of the optical communication network node. Moreover, it is referred to a "pass" that a signal from an adjacent optical communication network node within the network is sent to other optical communication network nodes.

Optical signals from wavelength multi-inputting optical transmission lines 4100-i (wherein i is 1 to M1, which is the same hereinafter.) are separated into optical signals having the n number of different wavelengths in wavelength de-multiplexers 4110-i, and thereafter, are input to an optical switch network 4130.

The optical switch network 4130 sends the optical signals from the wavelength de-multiplexers 4110-i to predetermined wavelength converters 4140-i·n or receiving interfaces 4160-j (wherein j is 1 to M2, which is the same hereinafter.).

Each of the wavelength converters 4140-(i·n-n+1) to 4140-i·n fixedly converts a wavelength of the input optical signal into $\lambda 1$ to $\lambda n$.

Wavelength multiplexers 4111-i combines the optical signals from the wavelength converters 4140-(i·n-n+1) to 4140-i·n and sends the combined signals to wavelength multi-outputting optical transmission lines 4150-i, respectively.

On the other hand, cells of the optical signals from the optical switch network 4130 are converted into cells of electric signals in receiving interfaces 4160-k (wherein k is 1 to L, which is the same hereinafter.), respectively, and thereafter, are sent to an ATM switch 4170. And, cells of the optical signals from input optical transmission lines 4180-k are also converted into cells of electric signals in receiving interfaces 4161-k, respectively, and thereafter, are sent to an ATM switch 4170.

The ATM switch 4170 switches and outputs the input cells of the electric signals to predetermined transmitting interfaces 4162-j or 4163-k in accordance with headers thereof.

The switched cells of the electric signals are converted into cells of optical signals by the transmitting interfaces 4162-j, and thereafter, are sent to the optical switch network 4130.

The optical switch network 4130 also sends the cells of the optical signals from the transmitting interfaces 4162-j to the predetermined wavelength converters 4140-1 to 4140-M1·n or the receiving interfaces 4160-J.

Also, the switched cells of the electric signals are converted into cells of optical signals by the transmitting interfaces 4163-j, and thereafter, are sent to output optical transmission lines.

As described above, conventionally, the cells multiplied by the optical signals having an arbitrary wavelength, which are transmitted by the arbitrary wavelength multi-inputting optical transmission lines 4100-i, can be dropped into the arbitrary output optical transmission lines 4190-k. Also, the optical communication network node shown in FIG. 30 converts the cells from the arbitrary input optical transmission lines 4180-k into the optical signals having an arbitrary wavelength, and inserts the signals into the arbitrary wavelength multi-outputting optical transmission lines 4150-i.

Moreover, the optical communication network node shown in FIG. 30 can make the signals pass between the wavelength multi-inputting optical transmission lines 4100-i and the wavelength multi-outputting optical transmission lines 4150-i by converting the cells multiplied by the optical signals having an arbitrary wavelength, which are transmitted by the arbitrary wavelength multi-inputting optical transmission lines 4100-i, into the optical signals having an arbitrary wavelength, and inserting the signals into the arbitrary wavelength multi-outputting optical transmission lines 4150-i.

The above-mentioned conventional optical communication network node can conduct the drop and insert and further conduct the pass of the signals. However, this prior art has defects below.

First, in the above-mentioned prior art, two duplicate methods are used for conducting the conversion of a wavelength and passing the arbitrary optical signals between the wavelength multi-inputting optical transmission lines 4100-i and the wavelength multi-outputting optical transmission lines 4150-i. In other words, a method for realizing it by the optical switch network 4130 and the wavelength converters 4140-1 to 4140-M1·n, and a method for realizing it by converting the optical signals from the optical switch network 4130 into the electric signals, and thereafter, switching the signals by means of the ATM switch 4170, and using a path of the optical switch network 4130 and the wavelength converters 4140-1 to 4140-M1·n again are adopted.

Therefore, there is a defect that a large-scale optical switch network becomes to be needed and that it is difficult to realize a small-sized node and to lower a cost of the node. Particularly, in FIG. 30, in order to be able to output any signal on the wavelength multi-inputting optical transmission lines 4100-i and the input optical transmission lines 4180-k from anyone of the wavelength multi-outputting optical transmission lines 4150-i and the output optical transmission lines 4190-k, M2=(M1·n), and the number (2·M1·n)2 of cross points is necessary for the optical switch network 4130.

Also, since the above-mentioned two methods are overlapped to each other, there is a defect that the ATM switch with a large capacity becomes to be needed and that it is difficult to realize a small-sized node and to lower a cost of the node. Particularly, in FIG. 30, under a condition same as before, the ATM switch 4170 needs the number (M2+L)2= (M1·n+L)2 of cross points in order to switch the signals from the wavelength multi-inputting optical transmission lines 4100-i and the input optical transmission lines 4180-k.

Moreover, in the above-mentioned prior art, the optical switch network 4130 and the ATM switch 4170 are constructed in a hybrid manner. Accordingly, both the optical switch network 4130 and a self-routing switch of the ATM switch 4170 are not concurrently realized by one fast broad-band switch. Therefore, in FIG. 30, under the condition same as before, the number (2·M1·n)2 of cross points is necessary for the optical switch network 4130, and the number (M1·n+L)2 of cross points is necessary for the ATM switch 4170. In other words, since fast broad-band switches are used for both the optical switch network and the ATM switch, there is a defect that it is difficult to realize a small-sized node and to lower a cost of the node.

SUMMARY OF THE INVENTION

The present invention is made to solve the above-mentioned defects in the prior arts, and the objective of the present Invention is to provide an optical communication network node in which the required number of cross points of an optical switch network or a required capacity of an ATM switch is small, and accordingly, it is possible to realize a small-sized node and to lower a cost of the node.

Also, the objective of the present invention is to provide an optical communication network node in which the number of cross points unnecessary for an optical switch network which corresponds to a space dividing equivalent circuit is reduced, and it becomes to be possible to reduce hardware corresponding to the number of the unnecessary cross points, and it is possible to realize a small-sized device and moreover to lower a loss.

A first optical communication network node in accordance with the present invention includes first optical dropping means for dropping optical signals having arbitrary wavelengths of wavelength-multiplex optical signals which is multiplied by a wavelength, switching means for conducting switching of a signal after a drop by means of the above-described optical dropping means and an external input signal that is externally input, and first optical inserting means for joining a signal after switching by means of the above-described switching means to the above-described wavelength-multiplexing optical signals.

Also, the above-described switching means includes an input terminal to which a signal after drop by means of the above-described first optical dropping means and the above-described external input signal are input, a plurality of output terminals, and an ATM switch for outputting an input to the above-described input terminal to a desired one of the above-described plurality of output terminals.

Moreover, the above-described switching means includes second optical dropping means for further dropping optical signals having arbitrary wavelengths of the signal after the drop by means of the above-described first optical dropping means, a first input terminal to which the signal after drop by means of the above-described second optical dropping means is input, a plurality of first output terminals, a first ATM switch for outputting an input to the above-described first input terminal to a desired one of the above-described plurality of first output terminals, a second input terminal to which the above-described external input signal is input, a plurality of second output terminals, a second ATM switch for outputting an input to the above-described second input terminal to a desired one of the above-described plurality of second output terminals, and second optical inserting means for joining an output of the above-described second ATM switch to the signal after the drop by means of the above-described first optical dropping means.

And, the above-described switching means includes an input terminal to which the signal after the drop by means of the above-described first optical dropping means and the above-described external input signal are input, a plurality of output terminals, and an optical switch means for outputting an input to the above-described input terminal to a desired one of the above-described plurality of output terminals.

In short, in the present invention, since after dropping the optical signals having arbitrary wavelengths of wavelength-multiplex optical signals which is multiplied by a wavelength, the switching of the dropped signal and the external input signal is conducted, and the signal after the switching is joined to the wavelength-multiplex optical signals, the number of cross points necessary for an optical switch network is reduced and it is possible to realize a small-sized node and to lower a cost of the node.

Furthermore, in order to achieve the above-described objective, the second invention is an optical communication network node having both an ATM exchange function for exchanging ATM cells and an optical exchange function for exchanging optical signals as it is. The optical communication network node is constructed of a plurality of wavelength-multiplex receiving interfaces with buffers, having one input end and a plurality of output ends, for, after separating wavelength-multiplex optical signals input from the above-described one input end through each of a plurality of first input optical transmission lines into a plurality of optical signals having different wavelengths, outputting these plurality of optical signals as it is from each of the above-described plurality of output ends, or converting the above-described plurality of optical signals into electric signals, temporarily storing ATM cells in the buffers, which are taken out from transmission frames, and after processing headers of the ATM cells output from the above-described buffers, converting the electric signals into optical signals and outputting the optical signals from each of the above-described plurality of output ends, a plurality of receiving interfaces with buffers, having one input end and one output end, for converting optical signals input from the above-described input end through each of a plurality of second input optical transmission lines into electric signals, temporarily storing ATM cells in the buffers, which are taken out from transmission frames, and after processing headers of the ATM cells output from the above-described buffers, converting the electric signals into optical signals and outputting the optical signals from the above-described output end, a plurality of wavelength-multiplex transmitting interfaces, having a plurality of input ends and one output end, for converting each of optical signals on optical circuits, which are input from the above-described plurality of input ends, into an optical signal having a predetermined wavelength as it is, or for, after storing ATM cells in transmission frames, which are taken out by converting each of optical signals from the above-described plurality of input ends into electric signals, converting the electric signals into optical signals having the above-described predetermined wavelength, combining the plurality of converted optical signals having the above-described predetermined wavelength, outputting wavelength-multiplex optical signals from the above-described one output end, and transmitting the signals to a plurality of first output optical transmission lines, a plurality of transmitting interfaces, having one input end and one output end, for, after storing ATM cells in transmission frames, which are taken out by converting each of optical signals input from the above-described input end into electric signals, converting the electric signals into optical signals, outputting the optical signals from the above-described output end, and transmitting the signals to a plurality of second output optical transmission lines, a first optical switch network, having a plurality of input ends and a plurality of output ends which are connected to each output end of the above-described plurality of wavelength-multiplex receiving interfaces with the buffers, respectively, for setting the above-described predetermined optical circuits between the above-described plurality of predetermined input ends and output ends, or for exchanging the optical signals cell by cell under control by the above-described plurality of wavelength-multiplex receiving interfaces with the buffers, a second optical switch network, having a plurality of input ends and a plurality of output ends which are connected to each output end of the above-described plurality of receiving interfaces with the buffers, respectively, for exchanging the optical signals cell by cell under control by the above-described plurality of receiving interfaces with the buffers, and an optical distributing switch network, having a plurality of input ends and a plurality of output ends which are connected to the above-described first and second optical switch networks, for switching optical signals from the above-described plurality of input ends to the above-described output ends which are connected to the input ends of the above-described plurality of predetermined wavelength-multiplex transmitting interfaces and the input end of the above-described plurality of transmitting interfaces.

The third invention is an optical communication network node having both an ATM exchange function for exchanging ATM cells and an optical exchange function for exchanging optical signals as it is. The optical communication network node is constructed of a plurality of wavelength-multiplex receiving interfaces with buffers, having one input end and a plurality of output ends, for, after separating wavelength-multiplex optical signals input from the above-described one input end through each of a plurality of first input optical transmission lines into a plurality of optical signals having different wavelengths, outputting these plurality of optical signals as it is from each of the above-described plurality of output ends, or converting the above-described plurality of optical signals into electric signals, temporarily storing ATM cells in the buffers, which are taken out from transmission frames, and after processing headers of the ATM cells output from the above-described buffers, converting the electric signals into optical signals and outputting the optical signals from each of the above-described plurality of output ends, a plurality of receiving interfaces with buffers, having one input end and one output end, for converting optical signals input from the above-described input end through each of a plurality of second input optical transmission lines into electric signals, temporarily storing ATM cells in the buffers, which are taken out from transmission frames, and after processing headers of the ATM cells output from the above-described buffers, converting the electric signals into optical signals and outputting the optical signals from the above-described output end, a plurality of wavelength-multiplex transmitting interfaces, having a plurality of input ends and one output end, for converting each of optical signals on optical circuits, which are input from the above-described plurality of input ends, into an optical signal having a predetermined wavelength as it is, or for, after storing ATM cells in transmission frames, which are taken out by converting each of optical signals from the above-described plurality of input ends into electric signals, converting the electric signals into optical signals having the above-described predetermined wavelength, combining the plurality of converted optical signals having the above-described predetermined wavelength, outputting wavelength-multiplex optical signals from the above-described one output end, and transmitting the signals to a plurality of first output optical transmission lines, a plurality of transmitting interfaces, having one input end and one output end, for, after storing ATM cells in transmission frames, which are taken out by converting each of optical signals input from the above-described input end into electric signals, converting the electric signals into optical signals, outputting the optical signals from the above-described output end, and transmitting the signals to a plurality of second output optical transmission lines, first and second optical selective switch networks, having a plurality of input ends and a plurality of output ends, for selectively sending optical signals from the above-described plurality of input ends which are connected to the output ends of the above-described plurality of wavelength-multiplex receiving interfaces with the buffers and the output end of the above-described receiving interfaces with the buffers, respectively, to the above-described predetermined one or more than one output ends, a plurality of first optical switches, having a plurality of input ends and one output end which are connected to the output ends of the above-described first optical selective switch network, for setting predetermined optical circuits between the above-described plurality of predetermined input ends and one output end, or for exchanging the optical signals cell by cell under control by the above-described plurality of wavelength-multiplex receiving interfaces with the buffers, a plurality of second optical switches, having a plurality of input ends and one output end which are connected to the output ends of the above-described second optical selective switch network, for exchanging the optical signals cell by cell under control by the above-described plurality of receiving interfaces with the buffers, and an optical distributing switch network, having a plurality of input ends which are connected to output ends of the above-described first and second optical switches, and an output end which is connected to the input ends of the above-described plurality of wavelength-multiplex transmitting interfaces and the input end of the above-described transmitting interfaces, for switching optical signals from the above-described plurality of input ends to the above-described predetermined output end.

The fourth invention is an optical communication network node having both an ATM exchange function for exchanging ATM cells and an optical exchange function for exchanging optical signals as it is. The optical communication network node is constructed of a plurality of wavelength-multiplex receiving interfaces with buffers, having one input end and a plurality of output ends, for, after separating wavelength-multiplex optical signals input from the above-described one input end through each of a plurality of first input optical transmission lines into a plurality of optical signals having different wavelengths, outputting these plurality of optical signals as it is from each of the above-described plurality of output ends, or converting the above-described plurality of optical signals into electric signals, temporarily storing ATM cells in the buffers, which are taken out from transmission frames, and after processing headers of the ATM cells output from the above-described buffers, converting the electric signals into optical signals and outputting the optical signals from each of the above-described plurality of output ends, a plurality of receiving interfaces with buffers, having one input end and one output end, for converting optical signals input from the above-described input end through each of a plurality of second input optical transmission lines into electric signals, temporarily storing ATM cells in the buffers, which are taken out from transmission frames, and after processing headers of the ATM cells output from the above-described buffers, converting the electric signals into optical signals and outputting the optical signals from the above-described output end, a plurality of wavelength-multiplex transmitting interfaces, having a plurality of input ends and one output end, for converting each of optical signals on optical circuits, which are input from the above-described plurality of input ends, into optical signals having predetermined wavelengths as it is, or for, after storing ATM cells in transmission frames, which are taken out by converting each of optical signals from the above-described plurality of input ends into electric signals, converting the electric signals into optical signals having the above-described predetermined wavelengths, combining the plurality of converted optical signals having the above-described predetermined wavelengths, outputting wavelength-multiplex optical signals from the above-described one output end, and transmitting the signals to a plurality of first output optical transmission lines, a plurality of transmitting interfaces, having one input end and one output end, for, after storing ATM cells in transmission frames, which are taken out by converting each of optical signals input from the above-described input end into electric signals, converting the electric signals into optical signals, outputting the optical signals from the above-described output end, and transmitting the signals to a plurality of second output optical transmission lines, a first optical switch network, having a plurality of input ends and a plurality of output ends which are connected to each output end of the above-described wavelength-multiplex receiving interfaces, for setting the above-described predetermined optical circuits between the above-described plurality of predetermined input ends and output ends, or for exchanging the optical signals cell by cell under control by the above-described plurality of wavelength-multiplex receiving interfaces with the buffers and the above-described plurality of receiving interfaces with the buffers, a second optical switch network, having a plurality of input ends and a plurality of output ends which are connected to each output end of the above-described receiving interfaces, for exchanging the optical signals cell by cell under control by the above-described plurality of wavelength-multiplex receiving interfaces with the buffers and the above-described plurality of receiving interfaces with the buffers, and an optical distributing switch network, having a plurality of input ends which are connected to each output end of the above-described plurality of wavelength-multiplex receiving interfaces with the buffers and the above-described plurality of multiplex interfaces with the buffers, and a plurality of output ends which are connected to the input ends of the above-described first optical switch network and the inputs of the above-described second optical switch network, for switching optical signals from the above-described plurality of input ends to the above-described predetermined output ends.

The fifth invention is an optical communication network node having both an ATM exchange function for exchanging ATM cells and an optical exchange function for exchanging optical signals as it is. The optical communication network node is constructed of a plurality of wavelength-multiplex receiving interfaces with buffers, having one input end and a plurality of output ends, for, after separating wavelength-multiplex optical signals input from the above-described one input end through each of a plurality of first input optical transmission lines into a plurality of optical signals having different wavelengths, outputting these plurality of optical signals as it is from each of the above-described plurality of output ends, or converting the above-described plurality of optical signals into electric signals, temporarily storing ATM cells in the buffers, which are taken out from transmission frames, and after processing headers of the ATM cells output from the above-described buffers, converting the electric signals into optical signals and outputting the optical signals from each of the above-described plurality of output ends, a plurality of receiving interfaces with buffers, having one input end and one output end, for converting optical signals input from the above-described input end through each of a plurality of second input optical transmission lines into electric signals, temporarily storing ATM cells in the buffers, which are taken out from transmission frames, and after processing headers of the ATM cells output from the above-described buffers, converting the electric signals into optical signals and outputting the optical signals from the above-described output end, a plurality of wavelength-multiplex transmitting interfaces, having a plurality of input ends and one output end, for converting each of optical signals on optical circuits, which are input from the above-described plurality of input ends, into an optical signal having a predetermined wavelength as it is, or for, after storing ATM cells in transmission frames, which are taken out by converting each of optical signals from the above-described plurality of input ends into electric signals, converting the electric signals into optical signals having the above-described predetermined wavelength, combining the plurality of converted optical signals having the above-described predetermined wavelength, outputting wavelength-multiplex optical signals from the above-described one output end, and transmitting the signals to a plurality of first output optical transmission lines, a plurality of transmitting interfaces, having one input end and one output end, for, after storing ATM cells in transmission frames, which are taken out by converting each of optical signals input from the above-described input end into electric signals, converting the electric signals into optical signals, outputting the optical signals from the above-described output end, and transmitting the signals to a plurality of second output optical transmission lines, first and second optical selective switch networks, having a plurality of input ends and a plurality of output ends, for selectively dropping optical signals from the above-described plurality of input ends into the above-described predetermined one or more than one output ends, a plurality of first optical switches, having a plurality of input ends which are connected to each of the output ends of the above-described first optical selective switch network, and one output end which is connected to each input end of each of the above-described wavelength-multiplex receiving interfaces, for setting predetermined optical circuits between the above-described plurality of predetermined input ends and one output end, or for exchanging the optical signals cell by cell under control by the above-described plurality of wavelength-multiplex receiving interfaces with the buffers and the above-described plurality of receiving interfaces with the buffers, a plurality of second optical switches, having a plurality of input ends which are connected to the output ends of the above-described second optical selective switch network, and one output end, for exchanging the optical signals cell by cell under control by the above-described plurality of wavelength-multiplex receiving interfaces with the buffers and the above-described plurality of receiving interfaces with the buffers, and an optical distributing switch network, having a plurality of input ends which are connected to each of the output ends of the above-described plurality of wavelength-multiplex receiving interfaces with the buffers, and a plurality of output ends which are connected to each of the input ends of the above-described first optical selective switch network and the above-described second optical selective switch network, for switching optical signals from the above-described plurality of input ends to the above-described predetermined output ends.

The sixth invention is an optical communication network node having both an ATM exchange function for exchanging ATM cells and an optical exchange function for exchanging optical signals as it is. The optical communication network node is constructed of a plurality of wavelength-multiplex receiving interfaces with buffers, having one input end, a plurality of first output ends, and a plurality of second output ends, for, after separating wavelength-multiplex optical signals input from the above-described one input end through each of a plurality of first input optical transmission lines into a plurality of optical signals having different wavelengths, outputting these plurality of optical signals as it is from each of the above-described plurality of first output ends, or converting the above-described plurality of optical signals into electric signals, temporarily storing ATM cells in the buffers, which are taken out from transmission frames, and after processing headers of the ATM cells output from the above-described buffers, converting the electric signals into optical signals and outputting the optical signals from each of the above-described plurality of second output ends, a plurality of receiving interfaces with buffers, having one input end and one output end, for converting optical signals input from the above-described input end through each of a plurality of second input optical transmission lines into electric signals, temporarily storing ATM cells in the buffers, which are taken out from transmission frames, and after processing headers of the ATM cells output from the above-described buffers, converting the electric signals into optical signals and outputting the optical signals from the above-described output end, a plurality of wavelength-multiplex transmitting interfaces, having a plurality of first input ends, a plurality of second input ends, and one output end, for converting each of optical signals on optical circuits, which are input from the above-described plurality of first input ends, into an optical signal having a predetermined wavelength as it is, or for, after storing ATM cells in transmission frames, which are taken out by converting each of optical signals from the above-described plurality of second input ends into electric signals, converting the electric signals into optical signals having the above-described predetermined wavelength, combining the plurality of converted optical signals having the above-described predetermined wavelength, outputting wavelength-multiplex optical signals from the above-described one output end, and transmitting the signals to a plurality of first output optical transmission lines, a plurality of transmitting interfaces, having one input end and one output end, for, after storing ATM cells in transmission frames, which are taken out by converting each of optical signals input from the above-described input end into electric signals, converting the electric signals into optical signals, outputting the optical signals from the above-described output end to the plurality of first output optical transmission lines, a first optical switch network, having a plurality of input ends which are connected to the first output ends of the above-described wavelength-multiplex receiving interfaces with the buffers, and an output end which is connected to the input end of the above-described plurality of wavelength-multiplex receiving interfaces, for setting the above-described predetermined optical circuits between the above-described plurality of predetermined input ends and output end, a second optical switch network, having a plurality of input ends which are connected to the second output ends of the above-described wavelength-multiplex receiving interfaces with buffers, and a plurality of output ends which are connected to the input end of the above-described transmitting interfaces through an optical combiner, for exchanging the optical signals cell by cell under control by the above-described plurality of wavelength-multiplex receiving interfaces with the buffers, a third optical switch network, having a plurality of input ends which are connected to the output end of the above-described plurality of receiving interfaces with the buffers through an optical separator, and a plurality of output ends which are connected to the input end of the above-described transmitting interfaces through the above-described optical combiner, for exchanging the optical signals cell by cell under control by the above-described plurality of receiving interfaces with the buffers, and a fourth optical switch network, having a plurality of input ends which are connected to the output end of the above-described plurality of receiving interfaces with the buffers through the above-described optical separator, and a plurality of output ends which are connected to each of the second input ends of the above-described plurality of wavelength-multiplex transmitting interfaces, for exchanging the optical signals cell by cell under control by the above-described plurality of receiving interfaces with the buffers.

In accordance with the optical communication network node of the second invention, in case that the wavelength-multiplex optical signals are input to the plurality of wavelength-multiplex receiving interfaces with buffers through the plurality of first input optical transmission lines, after these wavelength-multiplex optical signals are separated into a plurality of optical signals having different wavelengths, the optical signals are output as it is to the first optical switch network, or the ATM cells which are taken out in the transmission frames by converting the wavelength-multiplex optical signals into electric signals are temporarily stored in the buffers, and after the headers of the ATM cells output from the buffers are processed, the electric signals are converted into optical signals and the optical signals are output to the first optical switch network.

Also, in case that the optical signals are input to the plurality of receiving interfaces with buffers through the second optical switch network, these receiving interfaces with buffers temporarily store the ATM cells in the buffers, which are taken out from the transmission frames by converting the optical signals into electric signals, and after processing the headers of the ATM cells taken out from these buffers, convert the electric signals into optical signals and output the optical signals to the second optical switch network.

In the first optical switch network, the predetermined optical circuits are set between the predetermined input ends and output ends, or the optical signals are exchanged cell by cell under control by the wavelength-multiplex interfaces with the buffers, and the exchanged signals are output to the optical distributing switch network.

In the second optical switch network, the optical signals are exchanged cell by cell under control by the plurality of receiving interfaces with the buffers, and the exchanged signals are output to the optical distributing switch network.

The optical distributing switch network switches and distributes the optical signals input from the first optical switch network and the second optical switch network to the plurality of predetermined wavelength-multiplex transmitting interfaces and the plurality of the transmitting interfaces.

In the plurality of wavelength-multiplex transmitting interfaces, the input optical signals are converted into an optical signal with a predetermined wavelength as it is, and the optical signal is output to the plurality of first output optical transmission lines, or after the ATM cells are stored in the transmission frames, which are taken out by converting the input optical signals into electric signals, the electric signals are converted into optical signals, the plurality of converted optical signals are combined, and the combined signals are output to the plurality of first output optical transmission lines.

Furthermore, in the plurality of transmitting interfaces, after the ATM cells are stored in the transmission frames, which are taken out by converting the optical signals input from the optical distributing switch network into electric signals, the electric signals are converted into optical signals, and the optical signals are output to the plurality of second output optical transmission lines.

Also, in accordance with the optical communication network node of the third invention, after the wavelength-multiplex optical signals input to the wavelength-multiplex receiving interfaces with buffers through the first input optical transmission lines into a plurality of optical signals having different wavelengths, the optical signals are output as it is, or the ATM cells are temporarily stored in the buffers, which are taken out from the transmission frames by converting the optical signals into electric signals, and after the headers of the ATM cells output from the buffers are processed, the electric signals are converted into optical signals and the optical signals are output, and in the first optical selective switch network, these optical signals are selectively separated into the output ends and sent to the first optical switches, and in the first optical switches, the optical signals are output to a predetermined optical circuits or are exchanged cell by cell under control by the wavelength-multiplex receiving interfaces with the buffers and output to the optical distributing switch network.

On the other hand, in case that the optical signals are input to the receiving interfaces with buffers through the second input optical transmission lines, after the ATM cells are temporarily stored in the buffers, which are taken out from the transmission frames by converting the optical signals into electric signals, the headers of the ATM cells output from the buffers are processed and the electric signals are converted into optical signals again, and the optical signals are output to the second optical selective switch network.

In the second optical selective switch network, these optical signals are selectively output to predetermined output ends and sent to the second optical switches, and in the second optical switches, these optical signals are exchanged cell by cell under control by the receiving interfaces with the buffers, and are output to the optical distributing switch network.

In the optical distributing switch network, the optical signals from the first and second optical switches are distributed to the wavelength-multiplex transmitting interfaces and the transmitting interfaces.

In the wavelength-multiplex transmitting interfaces, the optical signals are converted into an optical signal having a predetermined wavelength, or after the ATM cells are stored in the transmission frames, which are taken out by converting the optical signals into electric signals, the electric signals are converted into optical signals having the predetermined wavelength, wavelength-multiplex optical signals in which the converted optical signals are combined, and are output to the wavelength-multiplex output transmission lines.

In the transmitting interfaces, after the ATM cells are stored in the transmission frames, which are taken out by converting the input optical signals into electric signals, the electric signals are converted into optical signals, and the optical signals are output to the second output optical transmission lines.

Moreover, in accordance with the optical communication network node of the fourth invention, after, in the wavelength-multiplex receiving interfaces with buffers, the optical signals input through the first input optical transmission lines are separated into a plurality of optical signals having different wavelengths, the optical signals are output as it is, or after the ATM cells are temporarily stored in the buffers, which are taken out from the transmission frames by converting the optical signals into electric signals, the headers of the ATM cells output from the buffers are processed, and thereafter, the electric signals are converted into optical signals and the optical signals are output to the optical distributing switch network.

In the receiving interfaces with buffers, in case that the optical signals are input through the second input optical transmission lines, the headers of the ATM cells are processed, which are taken out from the transmission frames by converting these optical signals into electric signals, and the electric signals are converted into optical signals, and the optical signals are output to the optical distributing switch network.

The optical distributing switch network switches and sends the optical signals input from the wavelength-multiplex receiving interfaces with the buffers and the receiving interfaces with the buffers to the predetermined first and second optical switch networks, and the first and second optical switch networks set the respective predetermined optical circuits, or exchange the optical signals cell by cell under control by the wavelength-multiplex receiving interfaces with the buffers and the receiving interfaces with the buffers, and output the optical signals to the wavelength-multiplex receiving interfaces and the receiving interfaces.

The wavelength-multiplex transmitting interfaces convert the optical signals into an optical signal having a predetermined wavelength, or after storing the ATM cells in the transmission frames, which are taken out by converting each of optical signals into electric signals, convert the electric signals into optical signals having the predetermined wavelength, combine the plurality of optical signals and output wavelength-multiplex optical signals to the wavelength-multiplex output optical transmission lines.

In the transmitting interfaces, after the ATM cells are stored in the transmission frames, which are taken out by converting the optical signals from the second optical switch network into electric signals, the electric signals are converted into optical signals, and the optical signals are output to the output optical transmission lines.

In accordance with the optical communication network node of the fifth invention, the wavelength-multiplex optical signals input to the wavelength-multiplex receiving interfaces with buffers through the first input optical transmission lines are output as optical signals as it is, which are separated into a plurality of optical signals having different wavelengths, or the ATM cells are temporarily stored in the buffers, which are taken out from the transmission frames by converting these optical signals into electric signals, and after the headers of the ATM cells output from the buffers is processed, the electric signals are converted into optical signals, and the optical signals are output to the optical distributing switch network.

Also, the optical signals input to the receiving interfaces with buffers through the second input optical transmission lines are converted into electric signals, and after the headers of the ATM cells, which are taken out from the transmission frames are processed, the electric signals are converted into optical signals, and the optical signals are output to the optical distributing switch network.

The optical distributing switch network switches and distributes the optical signals input from the wavelength-multiplex receiving interfaces with the buffers and the receiving interfaces with the buffers to the predetermined first and second optical selective switch networks, and in the first and second optical selective switch networks, the optical signals are selected and output to the first optical switches and the second optical switches, respectively.

The first optical switches and the second optical switches set predetermined optical circuits, or exchange the optical signals cell by cell under control by the wavelength-multiplex receiving interfaces with the buffers and the receiving interfaces with the buffers, and transmit the optical signals to the wavelength-multiplex transmitting interfaces and the transmitting interfaces.

The wavelength-multiplex transmitting interfaces convert the optical signals input from the first optical switches into an optical signal having a predetermined wavelength, or after storing the ATM cells in the transmission frames, which are taken out by converting each of the optical signals into electric signals, convert the electric signals into optical signals having the predetermined wavelength, and thereafter, output the optical signals to wavelength-multiplex output optical transmission lines.

In the transmitting interfaces, after the ATM cells are stored in the transmission frames, which are taken out by converting the optical signals input from the second optical switches into electric signals, the electric signals are converted into optical signals, and the optical signals are transmitted to the second output optical transmission lines.

In accordance with the optical communication network node of the sixth invention, the wavelength-multiplex optical signals input to the wavelength-multiplex receiving interfaces with buffers through the first input optical transmission lines are separated into a plurality of optical signals having different wavelengths, and the plurality of optical signals are output from the first output ends to the first optical switch network, or the ATM cells are temporarily stored in the buffers, which are taken out from the transmission frames by converting the plurality of optical signals into electric signals, and after the headers of the ATM cells output from the buffers are processed, the electric signals are converted into optical signals, and the optical signals are output from the second output ends to the second optical switch network.

In case that the optical signals are input to the receiving interfaces with buffers through the second input optical transmission lines, these optical signals are converted into electric signals, and the ATM cells which are taken out from the transmission frames are temporarily stored in the buffers, and after the headers of the ATM cells taken out from the buffers are processed, the electric signals are converted into optical signals, and the optical signals are output to the third and fourth optical switch networks through the optical separator.

In the first optical switch network, predetermined optical circuits are set, and the optical signals input from the wavelength-multiplex receiving interfaces with the buffer are transmitted to the wavelength-multiplex transmitting interfaces.

The optical signals output from the receiving interfaces with the buffer are input to the fourth optical switch network through the optical separator, and in the fourth optical switch network, the optical signals are exchanged cell by cell and output to the wavelength-multiplex transmitting interfaces.

The wavelength-multiplex transmitting interfaces convert the optical signals from the first optical switch network into an optical signal having a predetermined wavelength, or after storing the ATM cells in the transmission frames, which are taken out by converting the optical signals from the fourth optical switch network into electric signals, convert the electric signals into optical signals having the predetermined wavelength, combine the optical signals, and transmit wavelength-multiplex signals to the first output optical transmission lines.

Also, the optical signals input to the second optical switch network from the second output ends of the wavelength-multiplex receiving interfaces with buffers are exchanged cell by cell and are input to the transmitting interfaces through the optical combiner, and the optical signals input to the third optical switch network from the receiving interfaces with buffers through the optical separator are exchanged cell by cell and in the optical combiner, the optical signals are joined to the optical signals from the second optical switch network, and are input to the transmitting interfaces.

In the transmitting interfaces, after the ATM cells are stored in the transmission frames, which are taken out by converting the input optical signals into electric signals, the electric signals are converted into optical signals, and the optical signals are output to the second output optical transmission lines.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Figure 1:
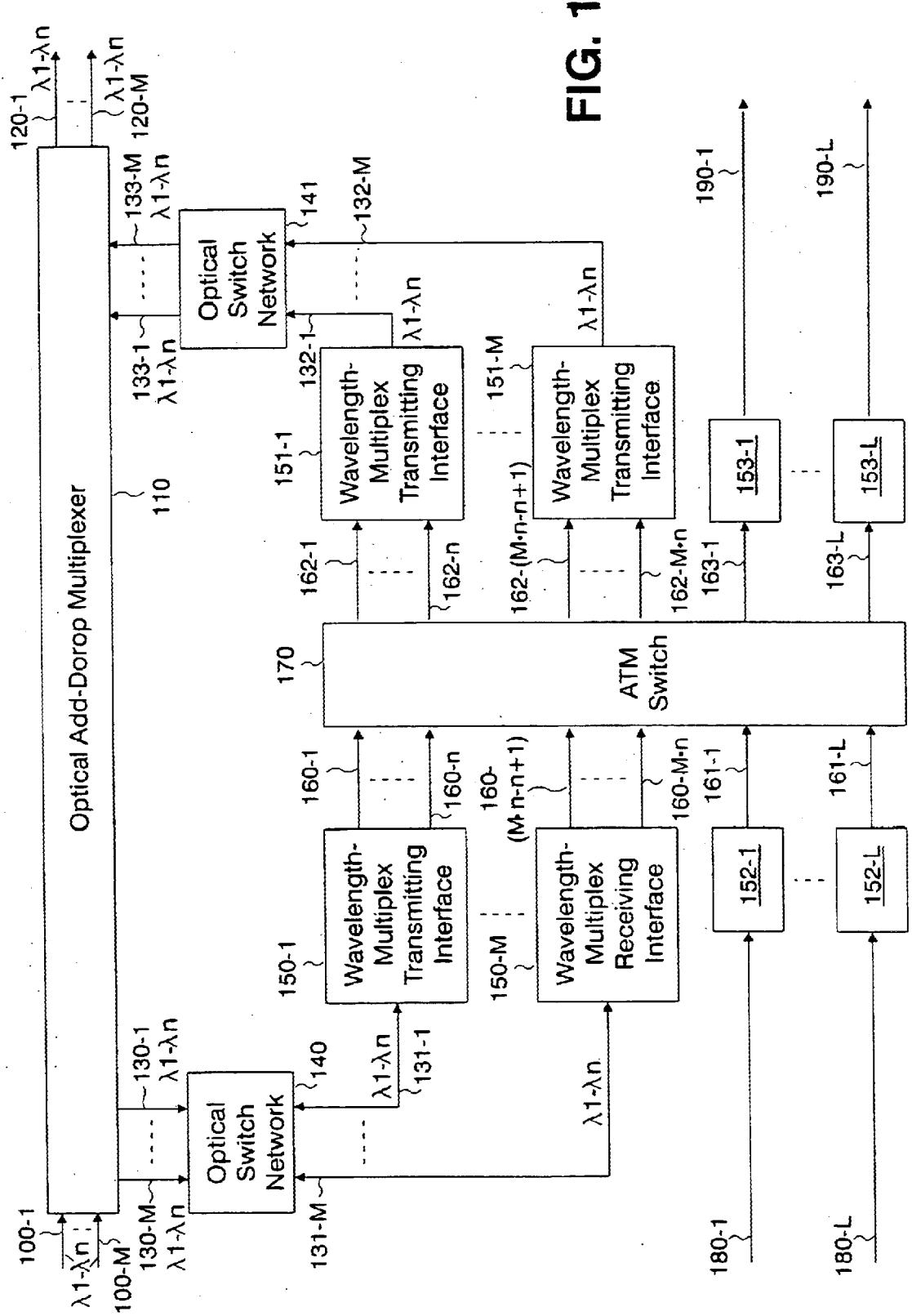
FIG. 1 is a block diagram showing an arrangement of an optical communication network node in accordance with a first embodiment of the present invention.

Next, embodiments of the present invention will be explained by referring to the drawings.

FIG. 1 is a block diagram showing an optical communication network node in accordance with a first embodiment of the present invention.

The network node shown in FIG. 1 is constructed to include wavelength-multiplex input optical transmission lines 100-x (wherein x is 1 to M, which is the same hereinafter), input optical transmission lines 180-y (wherein y is 1 to L, which is the same hereinafter), wavelength-multiplex output optical transmission lines 120-x, output optical transmission lines 190-y, an optical add-dorop multiplexer 110 for outputting an optical signal having a desired wavelength of wavelength-multiplex optical signals that are input from the wavelength-multiplex input optical transmission lines 100-x to either the wavelength-multiplex output optical transmission lines 120-x or optical transmission lines 130-x within the node, and outputting an optical signal having a desired wavelength of a plurality of wavelength-multiplex optical signals that are input from optical transmission lines 133-x within the node to the wavelength-multiplex output optical transmission lines 120-x, an optical switch network 140 for converting an optical signal having a desired wavelength into an optical signal having an arbitrary wavelength between the optical transmission lines 130-x within the node and optical transmission lines 131-x within the node, an optical switch network 141 for converting an optical signal having a desired wavelength into an optical signal having an arbitrary wavelength between optical transmission lines 132-x within the node and the optical transmission lines 133-x within the node, wavelength-multiplex receiving interfaces 150-x for outputting ATM cells from each of a plurality of output ends after separating wavelength-multiplex optical signals input from the optical transmission lines 131-x within the node into a plurality of optical signals having different wavelengths and converting the optical signals into electric signals, receiving interfaces 152-y for outputting ATM cells after converting optical signals input from the input optical transmission lines 180-y into electric signals, an ATM switch 170 for outputting the ATM cells input from the wavelength-multiplex receiving interfaces 150-x and the receiving interfaces 152-y to wavelength-multiplex receiving interfaces 150-x and 153-y in accordance with headers, wavelength-multiplex transmitting interfaces 151-x for, after converting the ATM cells input from the ATM switch 170 into optical signals having different wavelengths, respectively, and combining the optical signals, outputting wavelength-multiplex optical signals to the optical transmission lines 132-x within the node, and transmitting interfaces 153-y for, after converting the ATM cells input from the ATM switch 170 into optical signals, outputting the optical signals to output optical transmission lines 190-y.

The optical add-dorop multiplexer 110, in case of receiving the wavelength-multiplex optical signals from the wavelength-multiplex input optical transmission lines 100-x and making them pass, sends the signals to the wavelength-multiplex output optical transmission lines 120-x. The optical add-dorop multiplexer 110 receives the wavelength-multiplex optical signals from the wavelength-multiplex input optical transmission lines 100-x, and drops them into the optical transmission lines 130-x within the node. In such a manner, the optical add-dorop multiplexer 110 is used in case of making the optical signals on the wavelength-multiplex input optical transmission lines 100-x pass through this node as it is without switching a wavelength and an output transmission line (the wavelength-multiplex output optical transmission lines 120-x). Furthermore, the optical add-dorop multiplexer 110 can be also used as a wavelength-multiplex and separating function necessary for conducting maintenance, use or control of the optical signals on the wavelength-multiplex input optical transmission lines 100-x for every optical signal which has different wavelengths.

The optical switch network 140, when receiving the wavelength-multiplex optical signals dropped from the optical transmission lines 130-x within the node, converts optical signals having a predetermined wavelength on the optical transmission lines 130-x within the node into optical signals having a desired wavelength, and outputs the optical signals to the optical transmission lines 131-x within the node.

The wavelength-multiplex optical signals output from the optical switch network 140 are sent, respectively, to the wavelength-multiplex receiving interfaces 150-x by the optical transmission lines 131-x within the node.

Each of the wavelength-multiplex receiving interfaces 150-x is connected to the ATM switch 170 by each of the number n of input ports 160-(x·n-n+1) to 160-x·n. Each of the wavelength-multiplex receiving interfaces 150-x, after separating the input wavelength-multiplex optical signals into optical signals having n wavelengths, takes out the ATM cells from transmission frames signal by signal of the n optical signals, and sends the cells to the ATM switch 170 by way of the input ports 160-(x·n-n+1) to 160-x·n.

On the other hand, each of the receiving interfaces 152-y takes out the ATM cells from the transmission frames after receiving the optical signals from the input optical transmission lines 180-y, and sends the cells to the ATM switch 170 by way of the input ports 161-1 to 161-1M.

The ATM switch 170 switches the cells to predetermined output ports 162-1 to 162-M·n and 163-y cell by cell in accordance with headers of the cells input from the input ports 160-1 to 160-M·n and 161-y.

Each of the wavelength-multiplex transmitting interfaces 151-x is also connected to the ATM switch 170 by each of the number n of output ports 162-(x·n-n+1) to 162-x·n. Each of the wavelength-multiplex transmitting interfaces 151-x, after inserting the cells input from the ATM switch 170 by way of the output ports 162-(x·n-n+1) to 162-x·n into the transmission frames every n cells, and converting the cells into optical signals having the n wavelengths, combines them and sends created wavelength-multiplex optical signals to the optical switch network 141.

When the wavelength-multiplex optical signals are input, respectively, from the wavelength-multiplex transmitting interfaces 151-x by way of the optical transmission lines 132-x within the node, the optical switch network 141 converts optical signals having a predetermined wavelength on the optical transmission lines 132-x within the node into optical signals having a desired wavelength, and outputs the optical signals to the desired optical transmission lines 133-x within the node.

The optical add-dorop multiplexer 110 receives the wavelength-multiplex optical signals from the optical transmission lines 133-x within the node, and inserts them into the wavelength-multiplex output optical transmission lines 120-x. On the other hand, each of the transmitting interfaces 153-y, after inserting the cells input from the ATM switch 170 by way of the output ports 163-y into the transmission frames, converts the cells into optical signals, and sends the optical signals to the output optical transmission lines 190-y.

Figure 2:
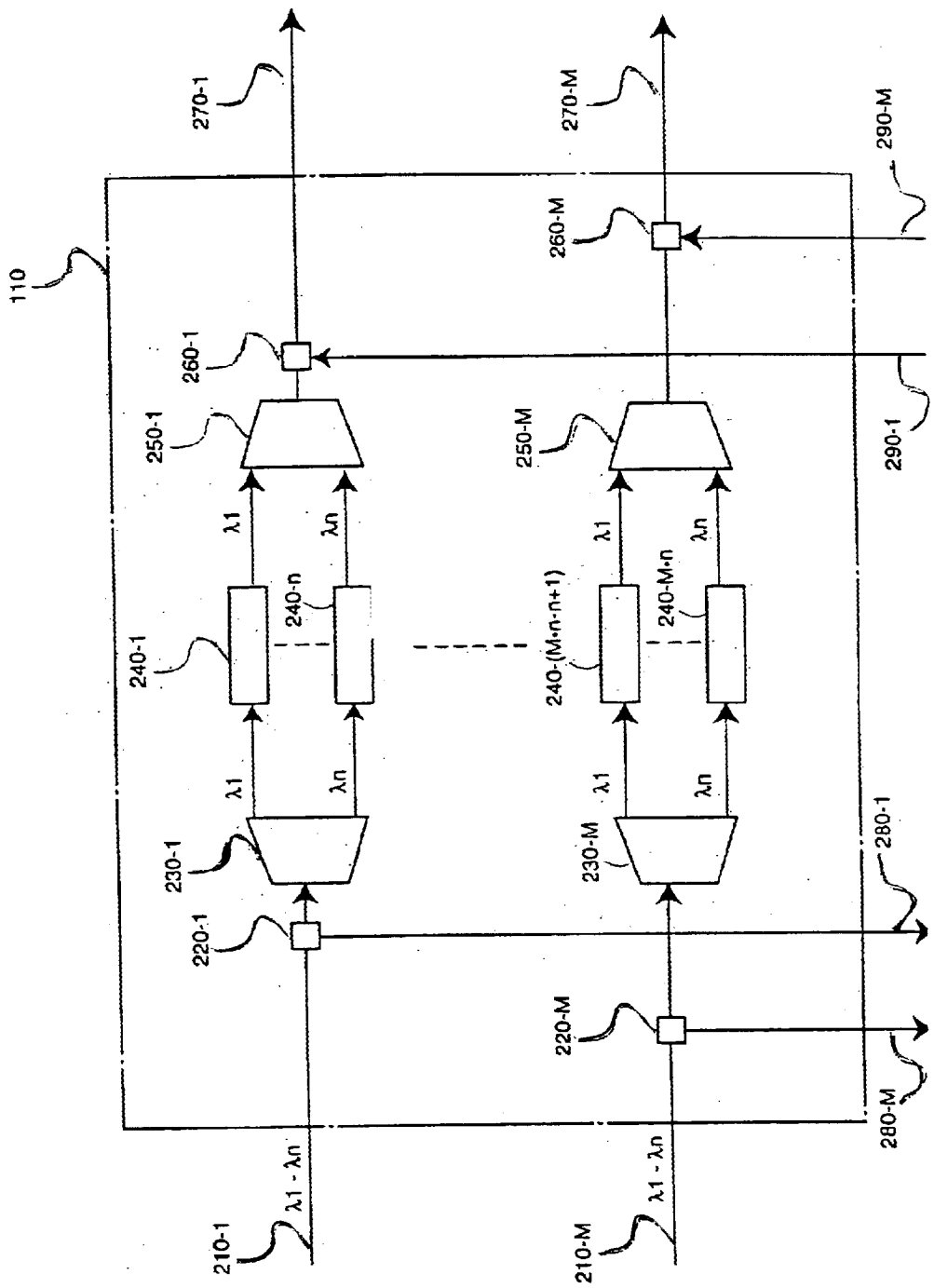
FIG. 2 is a block diagram showing an example of an internal arrangement of an optical add-dorop multiplexer in FIG. 1.

A detailed arrangement of the optical add-dorop multiplexer 110 in FIG. 1 is shown in FIG. 2.

In the optical add-dorop multiplexer 110 in FIG. 2, the wavelength-multiplex input optical transmission lines 100-x in FIG. 1 and input terminals 210-x are respectively connected to each other, the wavelength-multiplex output optical transmission lines 120-x in FIG. 1 and output terminals 270-x are respectively connected to each other, the optical transmission lines 130-x within the node in FIG. 1 and output terminals 280-x are respectively connected to each other, and the optical transmission lines 133-x within the node in FIG. 1 and input terminals 290-x are respectively connected to each other.

At optical separators 220-x, the wavelength-multiplex signals which are respectively input from the input terminals 210-x are separately sent to wavelength de-multiplexers 230-x and the output terminals 280-x.

The wavelength de-multiplexers 230-x divide the wavelength-multiplex signals from the optical separators 220-x into signals having n wavelengths, and send the respective signals to optical gate elements 240-1 to 240-M·n.

In case of making the input optical signals having a predetermined wavelength pass to the output terminals 270-x as it is, the optical gate elements 240-1 to 240-M·n outputs the optical signals to wavelength-multiplexers 250-x. Or, in case of making the input optical signals having a predetermined wavelength to be dropped into the output terminals 280-x without making them pass to the output terminals 270-x as it is, the optical gate elements 240-1 to 240-M·n interrupt the pass of the optical signals.

Each of the wavelength-multiplexers 250-x applies wavelength-multiplex to the optical signals which have passed through the optical gate elements 240-1 to 240-M·n, and outputs the optical signals to optical combiners 260-x.

Each of the optical combiners 260-x combines the wavelength-multiplex signals from the wavelength-multiplexers 250-x with the wavelength-multiplex signals inserted from the input terminals 290-x, and sends the combined signals to the output terminals 270-x.

As explained above, by means of the optical add-dorop multiplexer 110 shown in FIG. 2, it is possible to output the respective optical signals having an arbitrary wavelength $\lambda z$ (wherein z is 1 to n, which is the same hereinafter), which are multiplied by the wavelength-multiplex signals input from the input terminals 210-x, to the output terminals 270-x, or to drop the respective optical signals having the arbitrary wavelength $\lambda z$, which are multiplied by the wavelength-multiplex signals input from the input terminals 210-x, into the output terminals 280-x, and further, to insert the respective optical signals having the arbitrary wavelength $\lambda z$, which are multiplied by the wavelength-multiplex signals input from the input terminals 290-x, into the output terminals 270-x.

Figure 3:
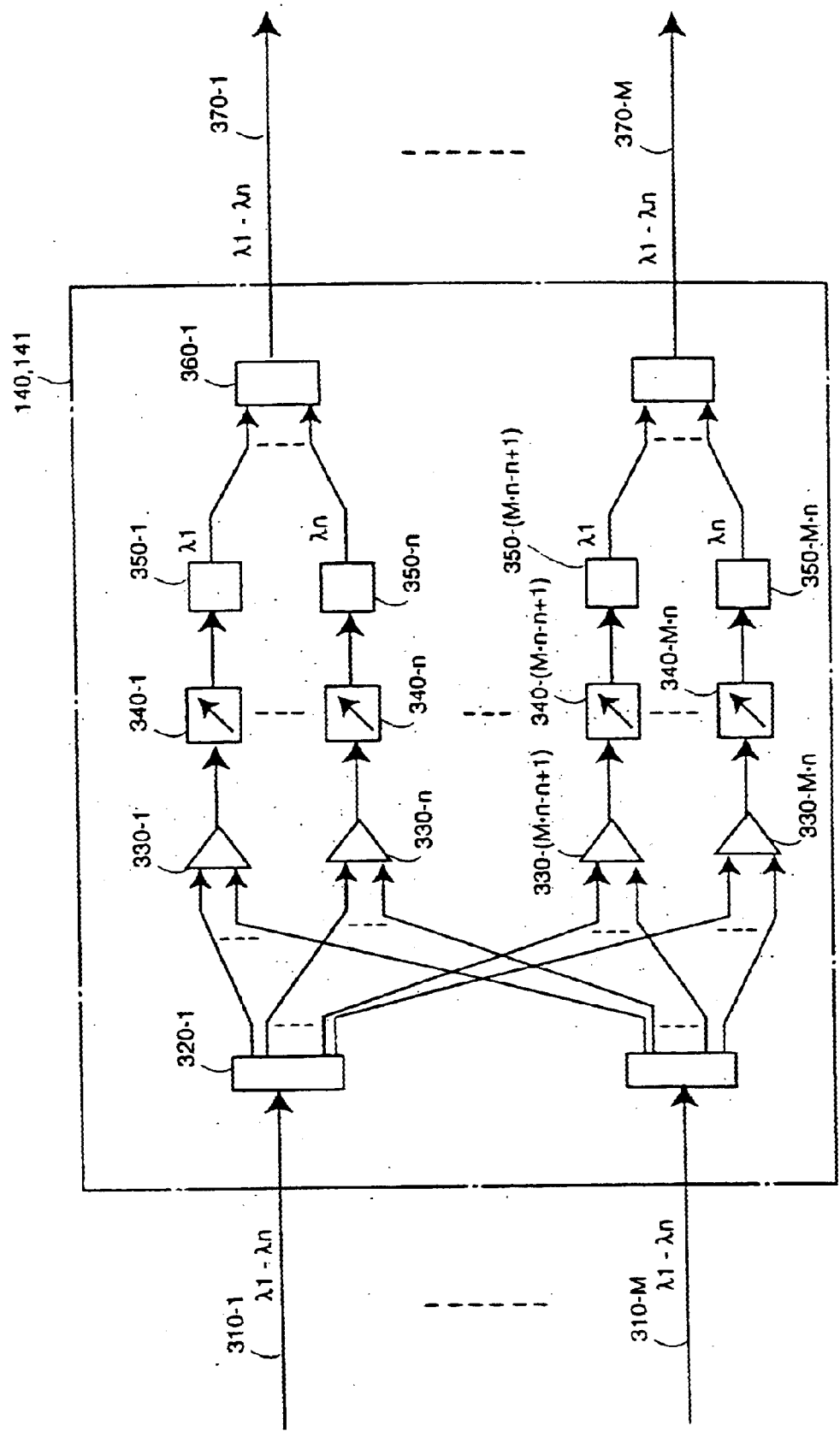
FIG. 3 is a block diagram showing an example of an internal arrangement of an optical switch network in FIG. 1.

An detailed arrangement of the optical switch network 140 in FIG. 1 is shown in FIG. 3.

In the optical switch network 140 in FIG. 3, the optical transmission lines 130-x within the node in FIG. 1 and input terminals 310-x are respectively connected to each other, and the optical transmission lines 131-x within the node in FIG. 1 and output terminals 370-x are respectively connected to each other.

In addition, the optical switch network 141 also has the same arrangement. In the case of the optical switch network 141, the optical transmission lines 132-x within the node in FIG. 1 and input terminals 310-x are respectively connected to each other, and the optical transmission lines 133-x within the node in FIG. 1 and output terminals 370-x are respectively connected to each other.

Each of optical separator 320-x separates the wavelength-multiplex signals from the input terminals 310-x into M·n wavelength-multiplex signals, and sends each of the wavelength-multiplex signals to the optical switches 330-1 to 330-M·n.

The optical switches 330-(x·n-n+1) to 330-x·n select one of M wavelength-multiplex signals from the optical separator 320-x, and output the selected signal to variable wavelength filters 340-(x·n-n+1) to 340-x·n.

The variable wavelength filters 340-(x·n-n+1) to 340-x·n select optical signals having a desirable wavelength from the input wavelength-multiplex signals, and send the selected signal to wavelength converters 350-(x·n-n+1) to 350-x·n.

The wavelength converters 350-(x·n-n+1) to 350-x·n fixedly convert a wavelength of the input wavelength-multiplex signals into a predetermined wavelength $\lambda z$. The optical signals of which wavelength has been converted by the wavelength converters 350-(x·n-n+1) to 350-x·n are combined by the optical combiner 360-x, and the wavelength-multiplex signals from the optical combiner 360-x are output to the output terminals 370-x, respectively.

As explained above, by means of the optical switch networks 140 and 141 shown in FIG. 3, it is possible to exchange the optical signals having an arbitrary wavelength $\lambda z$, which are multiplied by the wavelength-multiplex signals input from the arbitrary input terminals 310-x for the optical signals having the arbitrary wavelength $\lambda z$, which are multiplied by the wavelength-multiplex signals of the arbitrary output terminals 370-x.

In addition, the detail of the optical switch networks shown in FIG. 3 is mentioned in a known publication (M. Nishio and S. Suzuki, Photonic Wavelength-Division Switching Network Using a Parallel $\lambda$-switch, Springer series in Electronics and photonics, vol. 29, Photonic Switching II, Editor: K. Tada, H. S. Hinton, pp.287, 1990.).

Figure 4:
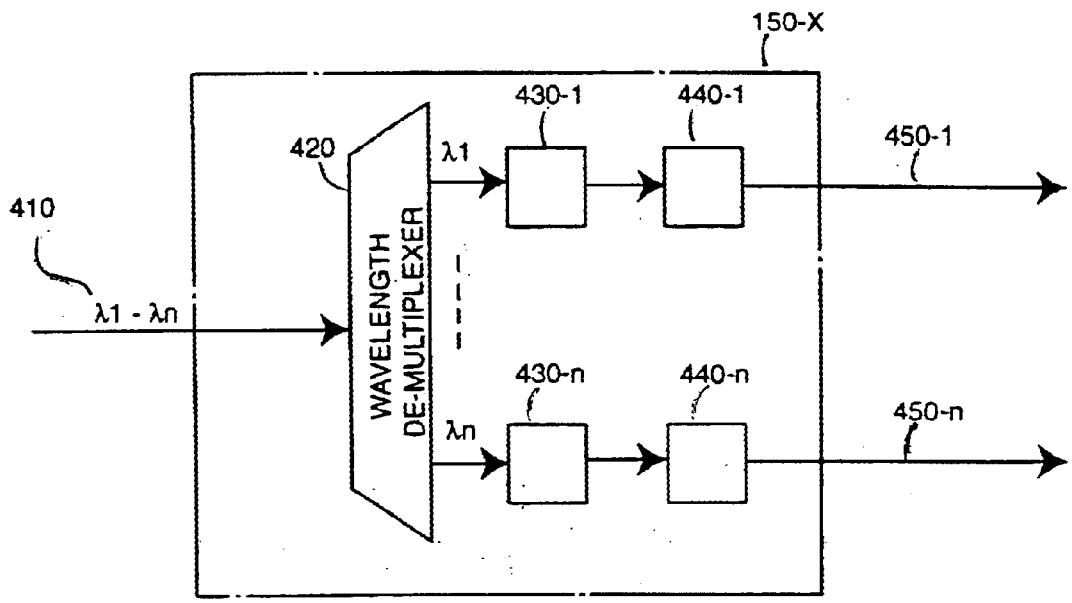
FIG. 4 is a block diagram showing an example of an internal arrangement of a wavelength-multiplex receiving interface in FIG. 1.
Figure 5:
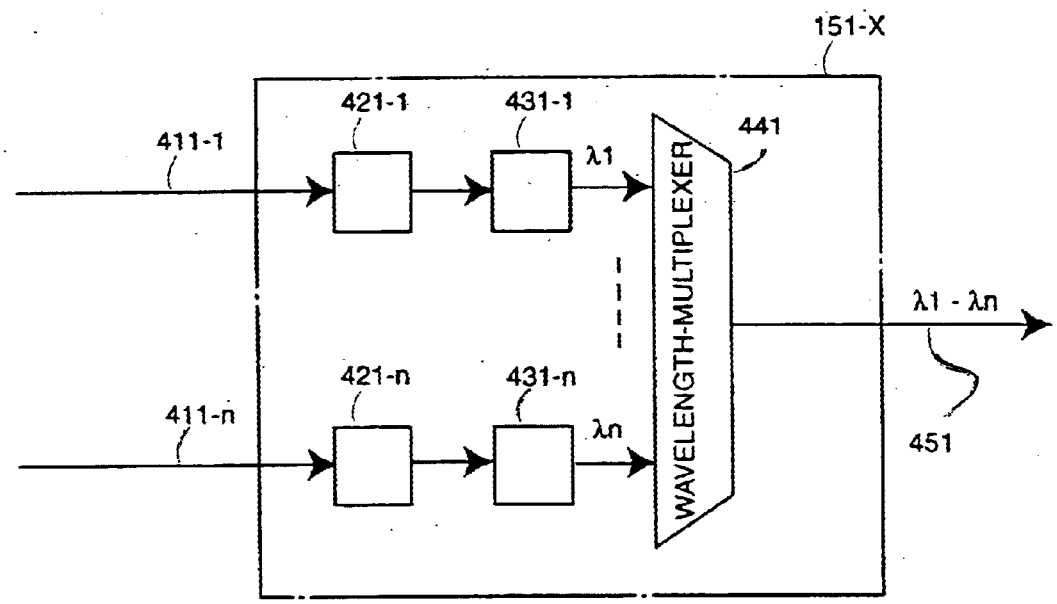
FIG. 5 is a block diagram showing an example of an internal arrangement of a wavelength-multiplex transmitting interface in FIG. 1.

Detailed arrangements of the wavelength-multiplex receiving interfaces 150-x and the wavelength-multiplex transmitting interfaces 151-x in FIG. 1 are shown in FIG. 4 and FIG. 5.

At first, as shown in FIG. 4, in the wavelength-multiplex receiving interfaces 150-x, the optical transmission lines 131-x within the node in FIG. 1 and an input terminal 410 are connected to each other, and each of the input ports 160-(x·n-n+1) to 160-x·n of the ATM switch 170 is connected to output terminals 450-x.

A wavelength de-multiplexer 420 in FIG. 4 separates wavelength-multiplex signals from the input terminal 410 into optical signals having n wavelengths, and outputs each of the optical signals to opto-electro converters 430-z.

The opto-electro converters 430-z convert the optical signals having a predetermined wavelength $\lambda z$, which are input from the wavelength de-multiplexer, respectively, into electric signals once, and output the electric signals to flaming circuits 440-z.

The flaming circuits 440-z receive the electric signals from the opto-electro converters 430-z, take out cells from the transmission frames, and send the cells to the output terminals 450-z, respectively.

In this way, after converting the n optical signals that are multiplied by the wavelength-multiplex signals from the input terminal 410 into the electric signals, the wavelength-multiplex receiving interfaces 150-x take out the cells from the transmission frames, and output the cells to the output terminals 450-z.

On the other hand, as shown in FIG. 5, in the wavelength-multiplex transmitting interfaces 151-x, each of the output ports 162-(x·n-n+1) to 162-x·n of the ATM switch 170 in FIG. 1 is connected to input terminals 411-z, and the optical transmission lines 132-x within the node and an output terminal 451 are connected to each other. Cell inserting circuits 421-z receive the cells from the input terminals 411-z, insert the cells into the transmission frames, and send them to electro-opto converters 431-z.

The electro-opto converters 431-z convert electric signals, which are input from the cell inserting circuits 421-z, respectively, into optical signals having a predetermined wavelength, and send the optical signals to a wavelength-multiplexer 441.

The wavelength-multiplexer 441 combines the optical signals having n wavelengths from the electro-opto converters 431-z, and sends wavelength-multiplex signals to the output terminal 451.

In this way, the wavelength-multiplex transmitting interfaces 151-x insert the cells from the input terminals 411-z into the transmission frames and convert the cells into the optical signals having predetermined n wavelengths, respectively, and thereafter, apply wavelength-multiplex to the optical signals, and send the wavelength-multiplex signals to the output terminal 451.

Figure 6:
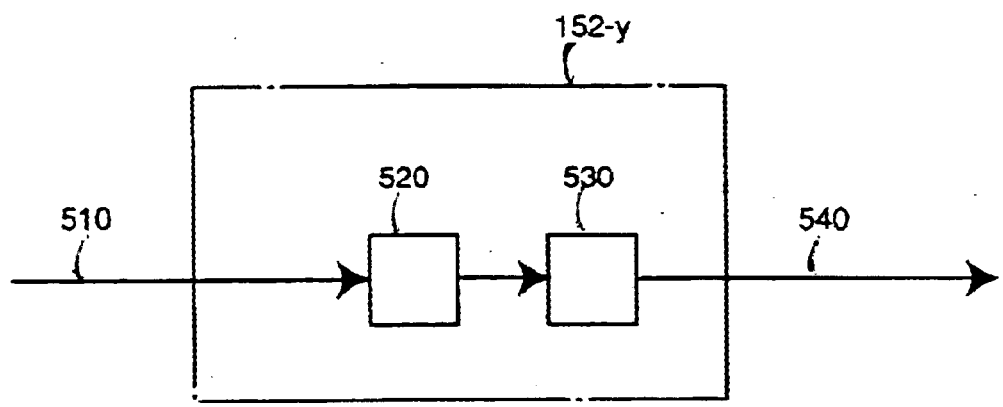
FIG. 6 is a block diagram showing an example of an internal arrangement of a receiving interface in FIG. 1.
Figure 7:
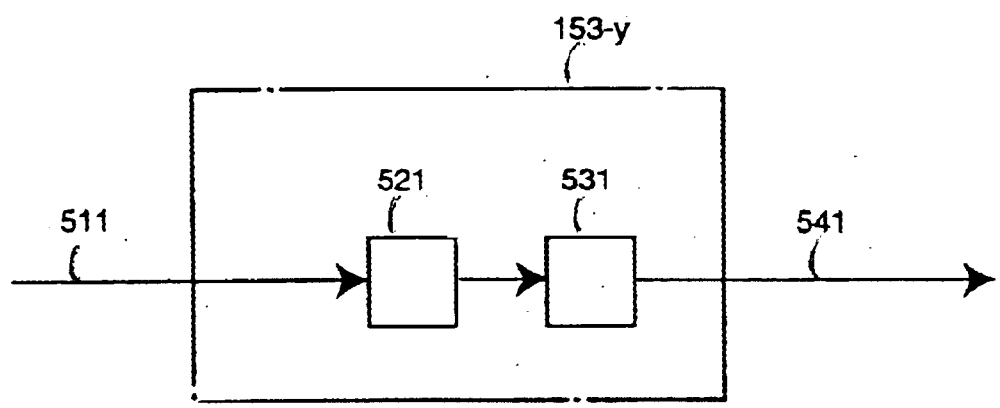
FIG. 7 is a block diagram showing an example of an internal arrangement of a transmitting interface in FIG. 1.

Detailed arrangements of the receiving interface 152 and the transmitting interface 153 in FIG. 1 are shown in FIG. 6 and FIG. 7.

As shown in FIG. 6, in the receiving interface 152, the input optical transmission lines 180-y in FIG. 1 and an input terminal 510 are connected to each other, and each of the input ports 161-y of the ATM switch 170 is connected to an output terminal 540. A opto-electro converter 520 converts optical signals from the input terminal 510 into electric signals once, and output the electric signals to a flaming circuit 530.

The flaming circuit 530 receives the electric signals from the opto-electro converter 520, takes out cells from the transmission frames, and sends the cells to the output terminal 540.

In this way, after converting the optical signals from the input terminal 510 into the electric signals, respectively, the receiving interface 152 takes out the cells from the transmission frames, and outputs the cells to the output terminal 540.

On the other hand, as shown in FIG. 7, in the transmitting interface 153, each of the output ports 163-y of the ATM switch 170 in FIG. 1 is connected to an input terminal 511, and the output optical transmission lines 190-y and an output terminal 541 are connected to each other. A cell inserting circuit 521 receives cells from the input terminal 511, inserts the cells into the transmission frames, and sends them to an electro-opto converter 531.

The electro-opto converter 531 converts electric signals from the cell inserting circuit 521 into optical signals, and sends the optical signals to the output terminal 541.

In this way, the transmitting interface 153 inserts the cells from the input terminal 511 into the transmission frames and converts the cells into the optical signals, and thereafter, sends the optical signals to the output terminal 541.

As explained above, the optical communication network node of the first embodiment of the present invention shown in FIG. 1 can drop the cells which are multiplied by the optical signals having an arbitrary wavelength transmitted in the arbitrary wavelength-multiplex input optical transmission lines 100-x into the arbitrary output optical transmission lines 190-y.

Also, the optical communication network node shown in FIG. 1 can convert the cells from the arbitrary input optical transmission lines 180-y into optical signals having an arbitrary wavelength, and insert the optical signals into the arbitrary wavelength-multiplex output optical transmission lines 120-x.

Moreover, the optical communication network node shown in FIG. 1 converts the cells which are multiplied by the optical signals having an arbitrary wavelength transmitted in the arbitrary wavelength-multiplex input optical transmission lines 100-x into the optical signals having an arbitrary wavelength, and inserts the optical signals into the arbitrary wavelength-multiplex output optical transmission lines 120-x, and thereby, conducts the pass of the signals between the wavelength-multiplex input optical transmission lines 100-x and the wavelength-multiplex output optical transmission lines 120-x.

And, the optical communication network node shown in FIG. 1 can make the wavelength-multiplex optical signals transmitted in the wavelength-multiplex input optical transmission lines 100-x pass to the wavelength-multiplex output optical transmission lines 120-x, respectively, without the conversion of a wavelength.

Here, required scales of the optical communication network node of the first embodiment of the present invention shown in FIG. 1 and the conventional optical communication network node are compared with each other. However, it is assumed that all traffics transmitted in the wavelength-multiplex input optical transmission lines 100-x and the wavelength-multiplex output optical transmission lines 120-x can be dropped or inserted.

If the optical add-dorop multiplexer 110 and the optical switch networks 140 and 141 are analyzed by a space dividing equivalent circuit, $(2 \cdot (M \cdot n)2 + (M \cdot n))$ cross points are necessary for the optical communication network node shown in FIG. 1. On the contrary, since M1=M in the conventional optical communication network node shown in FIG. 30, $(2 \cdot M \cdot n)2$ cross points are necessary for the optical switch network 4130. Also, the number of the cross points necessary for the ATM switches 170 and 4170 is the same in the arrangement of FIG. 1 and the conventional arrangement. Therefore, compared with the conventional optical communication network node, the optical communication network node shown in FIG. 1 reduces the required number of the cross points for the optical switch networks, and can realize a small-sized node.

Figure 8:
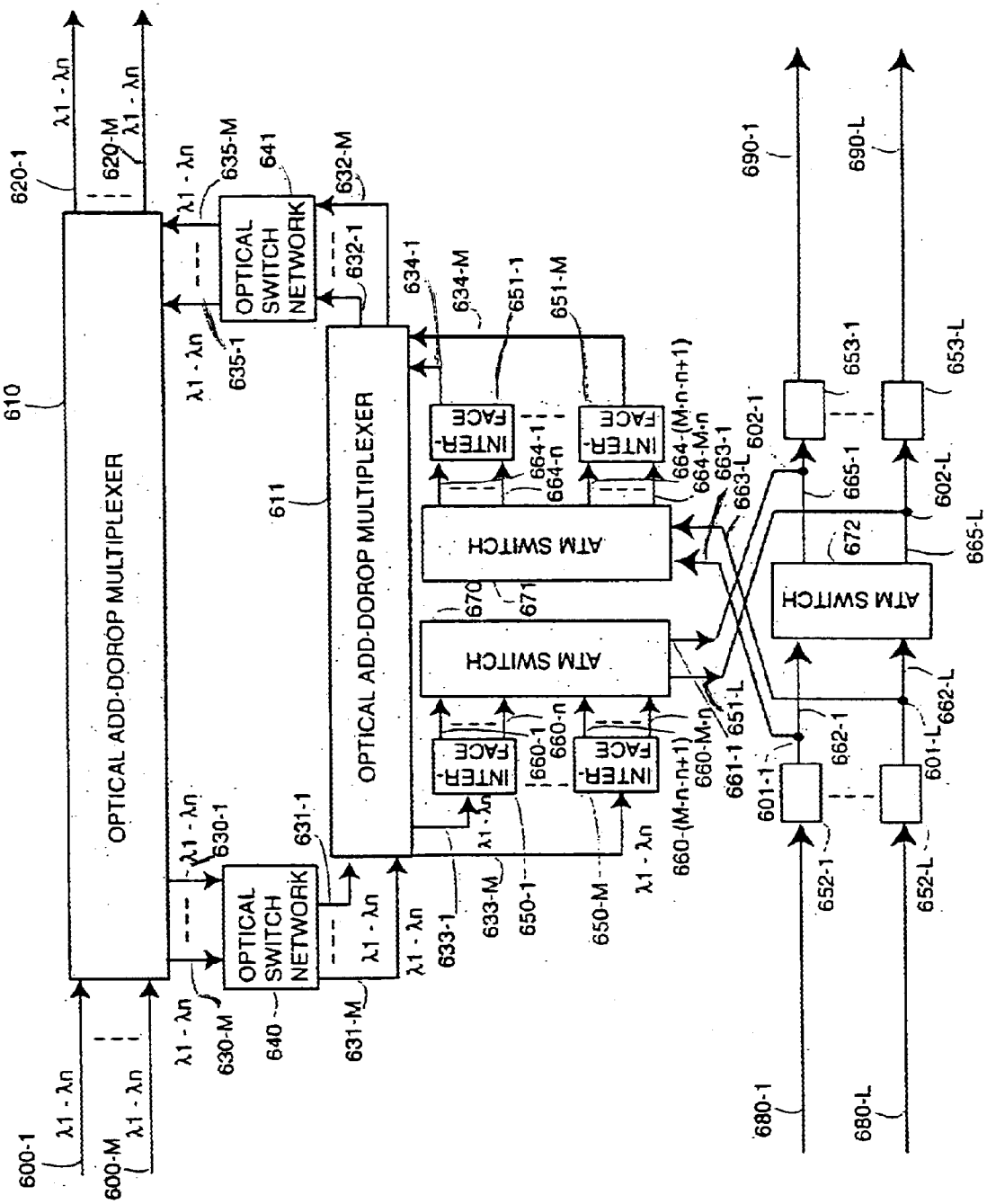
FIG. 8 is a block diagram showing an arrangement of an optical communication network node in accordance with a second embodiment of the present invention.

In FIG. 8, an optical communication network node of a second embodiment of the present invention is shown.

The optical communication network node shown in FIG. 8 is constructed to include wavelength-multiplex input optical transmission lines 600-x, input optical transmission lines 680-y, wavelength-multiplex output optical transmission lines 620-x, output optical transmission lines 690-y, an optical add-dorop multiplexer 610 for outputting an optical signal having a desired wavelength of wavelength-multiplex optical signals that are input from the wavelength-multiplex input optical transmission lines 600-x to either the wavelength-multiplex output optical transmission lines 620-x or optical transmission lines 630-x within the node, and outputting an optical signal having a desired wavelength of a plurality of wavelength-multiplex optical signals that are input from optical transmission lines 635-x within the node to the wavelength-multiplex output optical transmission lines 620-x, an optical switch network 640 for converting an optical signal having a desired wavelength into an optical signal having an arbitrary wavelength between the optical transmission lines 630-x within the node and optical transmission lines 631-x within the node, an optical switch network 641 for converting an optical signal having a desired wavelength into an optical signal having an arbitrary wavelength between optical transmission lines 632-x within the node and the optical transmission lines 635-x within the node, an optical add-dorop multiplexer 611 for outputting an optical signal having a desired wavelength of wavelength-multiplex optical signals that are input from the optical transmission lines 631-x within the node to either the wavelength-multiplex output optical transmission lines 632-x or optical transmission lines 633-x within the node, and outputting an optical signal having a desired wavelength of a plurality of wavelength-multiplex optical signals that are input from optical transmission lines 634-x within the node to the wavelength-multiplex output optical transmission lines 632-x, wavelength-multiplex receiving interfaces 650-x for outputting ATM cells from each of a plurality of output ends after separating wavelength-multiplex optical signals input from the optical transmission lines 633-x within the node into a plurality of optical signals having different wavelengths and converting the optical signals into electric signals, receiving interfaces 652-y for outputting ATM cells after converting optical signals input from the input optical transmission lines 680-y into electric signals, an ATM switch 670 for outputting the ATM cells input from the wavelength-multiplex receiving interfaces 650-x to transmitting interfaces 653-y in accordance with headers, ATM switches 672 and 671 for switching the ATM cells input from the receiving interfaces 652-y to the transmitting interfaces 653-y and transmitting interfaces 651-x in accordance with headers, wavelength-multiplex transmitting interfaces 651-x for, after converting the ATM cells input from the ATM switch 671 into optical signals having different wavelengths, respectively, and combining the optical signals, outputting wavelength-multiplex optical signals to the optical transmission lines 634-x within the node, and transmitting interfaces 653-y for, after converting the ATM cells input from the ATM switches 670 and 672 into optical signals, outputting the optical signals to output optical transmission lines 690-y.

The optical add-dorop multiplexer 610, in case of receiving the wavelength-multiplex optical signals from the wavelength-multiplex input optical transmission lines 600-x and making them pass, sends the signals to the wavelength-multiplex output optical transmission lines 620-x. Also, the optical add-dorop multiplexer 610 receives the wavelength-multiplex optical signals from the wavelength-multiplex input optical transmission lines 600-x, and drops them into the optical transmission lines 630-x within the node.

In such a manner, like the optical add-dorop multiplexer 110 in FIG. 1, the optical add-dorop multiplexer 610 is used in case of making the optical signals on the wavelength-multiplex input optical transmission lines 600-x pass through this node as it is without switching a wavelength and an output transmission line (the wavelength-multiplex output optical transmission lines 620-x). Furthermore, the optical add-dorop multiplexer 610 can be also used as a wavelength-multiplex and separating function necessary for conducting maintenance, use or control of the optical signals on the wavelength-multiplex input optical transmission lines 600-x for every optical signal which has different wavelengths.

The optical switch network 640, when receiving the wavelength-multiplex optical signals dropped from the optical transmission lines 630-x within the node, converts optical signals having a predetermined wavelength on the optical transmission lines 630-x within the node into optical signals having a desired wavelength, and outputs the optical signals to the optical transmission lines 631-x within the node.

The wavelength-multiplex optical signals output from the optical switch network 640 are input to the optical add-dorop multiplexer 611 by the optical transmission lines 631-x within the node.

The optical add-dorop multiplexer 611 receives the wavelength-multiplex optical signals from the optical transmission lines 631-x within the node, and in case of making them pass, sends them to the optical transmission lines 632-x within the nodes.

The optical add-dorop multiplexer 611 receives the wavelength-multiplex optical signals from the optical transmission lines 631-x within the node, and drops them into the optical transmission lines 633-x within the nodes.

The wavelength-multiplex optical signals dropped from the optical add-dorop multiplexer 611 are sent to the wavelength-multiplex receiving interfaces 650-x by the optical transmission lines 633-x within the nodes, respectively. In this way, the optical add-dorop multiplexer 611 makes a plurality of wavelength-multiplex signals from the optical switch network 640 pass to the optical switch network 641 as optical signals as it is without interposing the ATM switches 670–672.

Each of the wavelength-multiplex receiving interfaces 650-x is connected to the ATM switch 670 by each of the number n of input ports 660-(x·n-n+1) to 660-x·n.

Each of the wavelength-multiplex receiving interfaces 650-x, after separating the input wavelength-multiplex optical signals into optical signals having n wavelengths, takes out the ATM cells from transmission frames signal by signal of the n optical signals, and sends the cells to the ATM switch 670 by way of the input ports 660-(x·n-n+1) to 660-x·n.

The ATM switch 670 conducts the switching of predetermined output ports 661-y cell by cell in accordance with headers of the cells input from the input ports 660-1 to 660-M·n.

On the other hand, each of the receiving interfaces 652-y sends the cells to the switches 672 or 671 from input ports 662-y or input ports 663-y by way of distributors 601-y after receiving the optical signals from the input optical transmission lines 680-y.

The ATM switch 671 switches the cells to predetermined output ports 664-y cell by cell in accordance with headers of the cells input from the input ports 663-y.

The cells from the output ports 661-y of the ATM switch 670 and the cells from the output ports 665-y of the ATM switch 672 are sent to the transmitting interfaces 653-y by way of combiners 602-y, respectively.

Each of the transmitting interfaces 653-y inserts the cells which are input through the combiners 602-y, respectively, into transmission frames, and thereafter, converts the cells into optical signals and sends the optical signals to the output optical transmission lines 690-y.

The ATM switch 672 switches the cells to predetermined output ports 665-y cell by cell in accordance with headers of the cells input from the input ports 662-y.

Each of the wavelength-multiplex transmitting interfaces 651-x is connected to the ATM switch 671 by each of the number n of output ports 664-(x·n-n+1) to 664-x·n.

Each of the wavelength-multiplex transmitting interfaces 651-x, after inserting the cells input from the ATM switch 671 by way of the output ports 664-(x·n-n+1) to 664-x·n into the transmission frames every n cells, and converting the cells into optical signals having the n wavelengths, combines them and inserts created wavelength-multiplex optical signals into the optical add-dorop multiplexer 611 through the optical transmission lines 634-x within the node.

The optical add-dorop multiplexer 611 receives the wavelength-multiplex optical signals from the optical transmission lines 634-x within the node, and sends the wavelength-multiplex optical signals to the optical transmission lines 632-x within the nodes.

When the wavelength-multiplex optical signals are input from the optical transmission lines 631-x within the node or the optical transmission lines 634-x within the node by way of the optical transmission lines 632-x within the node, the optical switch network 641 converts optical signals having a predetermined wavelength on the optical transmission lines 632-x within the node into optical signals having a desired wavelength, and outputs the optical signals to the desired optical transmission lines 635-x within the node.

The optical add-dorop multiplexer 610 receives the wavelength-multiplex optical signals from the optical transmission lines 635-x within the node, and inserts them into the wavelength-multiplex output optical transmission lines 620-x.

The optical add-dorop multiplexer shown in FIG. 2 can be applied to the optical add-dorop multiplexers 610 and 611 of FIG. 8, like the optical add-dorop multiplexer 110 in FIG. 1.

The optical switch network shown in FIG. 3 can be applied to the optical switch networks 640 and 641 shown in FIG. 8, like the optical switch networks 140 and 141 of FIG. 1.

The arrangements shown in FIG. 4 and FIG. 5 can be applied to the wavelength-multiplex receiving interfaces 650 and the wavelength-multiplex transmitting interfaces 651 shown in FIG. 8, like the wavelength-multiplex receiving interfaces 150 and the wavelength-multiplex transmitting interfaces 151 of FIG. 1.

The arrangements shown in FIG. 6 and FIG. 7 can be applied to the receiving interfaces 652 and the transmitting interfaces 653 shown in FIG. 8, like the receiving interfaces 152 and the transmitting interfaces 153 of FIG. 1.

As explained above, the optical communication network node of the second embodiment of the present invention shown in FIG. 8 can operate in the same manner as the optical communication network node of the first embodiment of the present invention shown in FIG. 1. In other words, the optical communication network node of FIG. 8 can drop the cells which are multiplied by the optical signals having an arbitrary wavelength transmitted in the arbitrary wavelength-multiplex input optical transmission lines 600-x into the arbitrary output optical transmission lines 690-y.

Also, the optical communication network node shown in FIG. 8 can convert the cells from the arbitrary input optical transmission lines 680-y into optical signals having an arbitrary wavelength, and insert the optical signals into the arbitrary wavelength-multiplex output optical transmission lines 620-x.

The optical communication network node shown in FIG. 8 can make the wavelength-multiplex optical signals transmitted in the wavelength-multiplex input optical transmission lines 600-x pass to the wavelength-multiplex output optical transmission lines 620-x, respectively.

Moreover, the optical communication network node in accordance with the arrangement of FIG. 8 converts the cells which are multiplied by the optical signals having an arbitrary wavelength transmitted in the arbitrary wavelength-multiplex input optical transmission lines 600-x into the optical signals having an arbitrary wavelength, and inserts the optical signals into the arbitrary wavelength-multiplex output optical transmission lines 620-x, and thereby, conducts the pass of the signals between the wavelength-multiplex input optical transmission lines 600-x and the wavelength-multiplex output optical transmission lines 620-x.

Here, required scales of the optical communication network node of the second embodiment of the present invention shown in FIG. 8 and the conventional optical communication network node are compared with each other. However, a condition is assumed that all traffics transmitted in the wavelength-multiplex input optical transmission lines 600-x and the wavelength-multiplex output optical transmission lines 620-x can be dropped or inserted.

If the optical add-dorop multiplexers 610 and 611, and the optical switch networks 640 and 641 are analyzed by a space dividing equivalent circuit, $(2(M \cdot n)2+2(M \cdot n))$ cross points are necessary for the optical communication network node shown in FIG. 8. On the contrary, in the conventional optical communication network node, $(2M \cdot n)2$ cross points are necessary for the optical switch network 4130.

Also, in the conventional optical communication network node, $(M \cdot n+L)2$ cross points are necessary for the ATM switch. On the contrary, in the arrangement shown in FIG. 8, since the introduction of the optical add-dorop multiplexer 611 reduces the pass of the signals by the ATM switches, the number of the cross points necessary for the ATM switches can be reduced to $(2 \cdot ((M \cdot n) L)+L2)$.

Therefore, compared with the conventional optical communication network node, the optical communication network node shown in FIG. 8 can realize a small-sized node.

Figure 9:
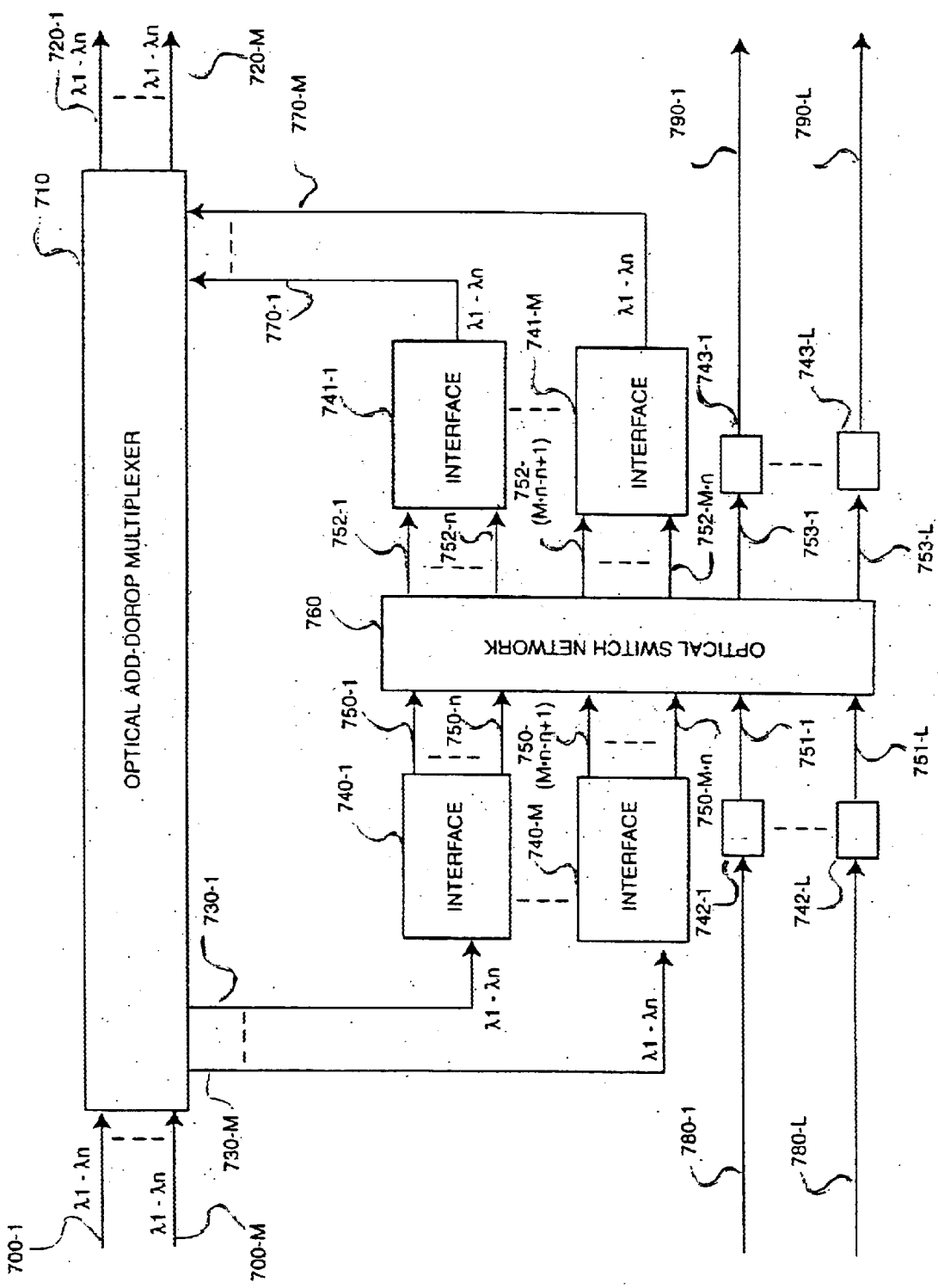
FIG. 9 is a block diagram showing an arrangement of an optical communication network node in accordance with a third embodiment of the present invention.

An optical communication network node of a third embodiment of the present invention is shown in FIG. 9.

The optical communication network node shown in FIG. 9 is constructed to include wavelength-multiplex input optical transmission lines 700-x, input optical transmission lines 780-y, wavelength-multiplex output optical transmission lines 720-x, output optical transmission lines 790-y, an optical add-dorop multiplexer 710 for outputting an optical signal having a desired wavelength of wavelength-multiplex optical signals that are input from the wavelength-multiplex input optical transmission lines 700-x to either the wavelength-multiplex output optical transmission lines 720-x or optical transmission lines 730-x within the node, and outputting an optical signal having a desired wavelength of a plurality of wavelength-multiplex optical signals that are input from optical transmission lines 770-x within the node to the wavelength-multiplex output optical transmission lines 720-x, wavelength-multiplex receiving interfaces 740-x with buffers for separating wavelength-multiplex optical signals input from the optical transmission lines 730-x within the node into a plurality of optical signals having different wavelengths, outputting the optical signals to an optical switch network 760 as it is, or after converting the optical signals into electric signals, temporarily storing ATM cells in the buffers, processing headers of the ATM cells output from the buffers, converting the electric signals into optical signals, and outputting the optical signals to the optical switch network 760, receiving interfaces 742-y with buffers for, after converting optical signals input from the input optical transmission lines 780-y into electric signals, temporarily storing ATM cells in the buffers, processing headers of the ATM cells output from the buffers, converting the electric signals into optical signals, and outputting the optical signals to the optical switch network 760, an optical switch network 760 for setting predetermined optical circuits between the wavelength-multiplex receiving interfaces 740-x with buffers and the wavelength-multiplex transmitting interfaces 751-y, or for exchanging the optical signals cell by cell under control by the wavelength-multiplex receiving interfaces 740-x with buffers and the receiving interfaces 742-y with buffers, wavelength-multiplex transmitting interfaces 741-x for, after conducting either to convert the optical signals on optical circuits, which are input from the optical switch network 760, into optical signals having a predetermined wavelength as it is, or to reconvert the optical signals into electric signals, process ATM cells and convert the electric signals into optical signals having a predetermined wavelength, combining the plurality of converted optical signals having the predetermined wavelength, and outputting wavelength-multiplex optical signals to optical transmission lines 770-x within the node, transmitting interfaces 743-y for, after reconverting the optical signals input from the optical switch network 760 into electric signals, converting the electric signals into optical signals and outputting the optical signals from the output optical transmission lines 790-y.

The optical add-dorop multiplexer 710, in case of receiving the wavelength-multiplex optical signals from the wavelength-multiplex input optical transmission lines 700-x and making them pass, sends the signals to the wavelength-multiplex output optical transmission lines 720-x. The optical add-dorop multiplexer 710 receives the wavelength-multiplex optical signals from the wavelength-multiplex input optical transmission lines 700-x, and drops them into the optical transmission lines 730-x within the node.

The wavelength-multiplex optical signals output from the optical add-dorop multiplexer 710 are sent, respectively, to the wavelength-multiplex receiving interfaces 740-x with the buffers by the optical transmission lines 730-x within the node.

Each of the wavelength-multiplex receiving interfaces 740-x with the buffers is connected to the optical switch network 760 by each of the number n of input ports 750(x·n-n+1) to 750-x·n. Each of the wavelength-multiplex receiving interfaces 740-x with the buffers, after separating the input wavelength-multiplex optical signals into optical signals having n wavelengths, takes out the ATM cells from transmission frames signal by signal of the N optical signals, and sends the optical cells to the optical switch network 760 from the input ports 750-(x·n-n+1) to 750-x·N by way of the buffers, respectively. Or, each of the wavelength-multiplex receiving interfaces 740-x with the buffers, after separating the input wavelength-multiplex optical signals into optical signals having n wavelengths, sends these n optical signals to the optical switch network 760 as it is from the input ports 750-(x·n-n+1) to 750-x·n.

On the other hand, each of the receiving interfaces 742-y takes out the ATM cells from the transmission frames after receiving the optical signals from the input optical transmission lines 780-y, and sends the optical cells to the optical switch network 760 from the input ports 750-y by way of the buffers.

When receiving the optical cells by way of the buffers within the wavelength-multiplex receiving interfaces 740-x with the buffers, the optical switch network 760 switches the cells to predetermined output ports 752-1 to 752-M·n and 753-y cell by cell in accordance with switching control signals notified from the wavelength-multiplex receiving interfaces 740-x with the buffers.

Also, when receiving the optical signals which do not pass through the buffers within the wavelength-multiplex receiving interfaces 740-x with the buffers, the optical switch network 760 switches the optical signals to the predetermined output ports 752-1 to 752-M·n in a circuit switching manner.

Moreover, when receiving the optical cells from receiving interfaces 742-y with the buffers, the optical switch network 760 switches the cells to the predetermined output ports 752-1 to 752-M·n and 753-y cell by cell in accordance with headers of the cells which are notified through control lines (not shown) from the receiving interfaces 742-y with the buffers.

Each of the wavelength-multiplex transmitting interfaces 741-x is also connected to the optical switch network 760 by each of the number n of the output ports 752-(x·n-n+1) to 752-x·n. When receiving the optical cells switched cell by cell from the optical switch network by way of the output ports 752-(x·n-n+1) to 752-x·n, each of the wavelength-multiplex transmitting interfaces 741-x, after inserting these cells into the transmission frames every n cells and converting the cells into optical signals having n wavelengths, combines them and sends created wavelength-multiplex optical signals to the optical transmission lines 770-x within the node.

Also, when receiving the optical cells switched in a circuit switching manner from the optical switch network by way of the output ports 752-(x·n-n+1) to 752-x·n, each of the wavelength-multiplex transmitting interfaces 741-x, after converting these cells into optical signals having n wavelengths, combines them and sends created wavelength-multiplex optical signals to the optical transmission lines 770-x within the node.

The optical add-dorop multiplexer 710 receives the wavelength-multiplex optical signals from the optical transmission lines 770-x within the node, and inserts them into the wavelength-multiplex output optical transmission lines 720-x.

On the other hand, when receiving the optical cells switched cell by cell from the optical switch network by way of the output ports 753-y, each of the transmitting interfaces 743-y, after inserting the cells into the transmission frames, converts the cells into optical signals and sends the optical signals to the output optical transmission lines 790-y.

Figure 10:
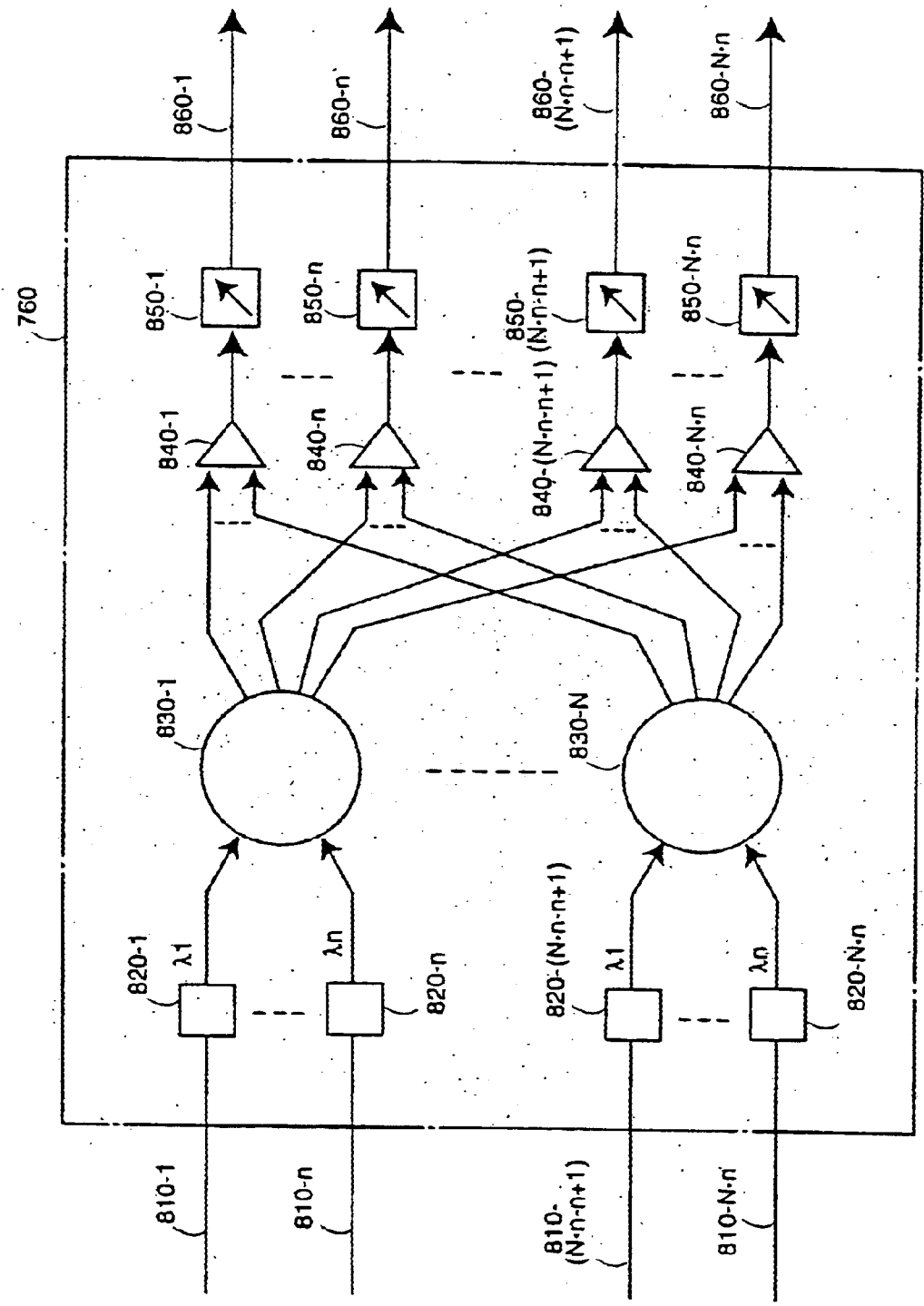
FIG. 10 is a block diagram showing an example of an internal arrangement of an optical switch network in FIG. 9.

The arrangement of the optical add-dorop multiplexer shown in FIG. 2 can be applied to the optical add-dorop multiplexer 710 in FIG. 9. A detailed arrangement of the optical switch network 760 in FIG. 9 is shown in FIG. 10.

In the optical switch network 760, the input ports 750-x and 751-y shown in FIG. 9 correspond to input terminals 810-1 to 810-N·n (wherein N·n=M·n+L, which is the same hereinafter).

Each of wavelength converters 820-(s·n-n+1) to 820-s·n (wherein s is 1 to N, which is the same hereinafter) converts optical signals from the input terminals 810-(s·n-n+1) to 810-s·n into optical signals having a wavelength $\lambda z$, and sends the optical signals to star couplers 830-s. Here, the wavelength $\lambda z$ may be the same as or different from a wavelength $\lambda z$ on the wavelength-multiplex transmission lines 700 and 720 shown in FIG. 9.

Each of the star couplers 830-s, after applying wavelength-multiplex to the optical signals from the input terminals 810-(s·n-n+1) to 810-s·n, separately sends wavelength-multiplex signals to optical switches 840-1 to 840-N·n.

The optical switches 840-1 to 840-N·n select one of M wavelength-multiplex signals from the star couplers 830-s, and output the selected signal to variable wavelength filters 850-1 to 850-N·n.

The variable wavelength filters 850-1 to 850-N·n select optical signals having a desirable wavelength from the input wavelength-multiplex signals, and send the selected signal to output terminals 850-1 to 850-N·n.

The optical switches 840-1 to 840-N·n and the variable wavelength filters 850-1 to 850-N·n, in case of switching the optical signals input from the input terminals 810-1 to 810-N·n cell by cell, switch the optical signals cell by cell by means of switching control signals in accordance with the headers of the cells which are processed by the wavelength-multiplex receiving interfaces 740-x with the buffers in FIG. 9.

Otherwise, the optical switches 840-1 to 840-N·n and the variable wavelength filters 850-1 to 850-N·n, in case of switching the optical signals input from the input terminals 810-1 to 810-N·n in a circuit switching manner without the necessity of switching the optical signals cell by cell, are controlled to set predetermined circuits between the input terminals 810-1 to 810-N·n and the output terminals 860-1 to 860-N·n. Such circuits are semi-fixedly set by a network management system, for example, or are set on demand using a connection control protocol that is started up between the nodes.

As explained above, by means of the optical switch network 760 shown in FIG. 10, it is possible to conduct a cell exchange or a circuit exchange of the optical signals, which are input from the arbitrary input terminals 810-1 to 810-N·n, to the arbitrary output terminals 860-1 to 860-N·n. In addition, the detail of the optical switch network shown in FIG. 10 is mentioned in a publication "Study of A Wavelength-Division/Space-Division Composite Optical Network" (Nishio and Suzuki, Exchange Society for the Study of the Electronic Information Communication Society, SSE92-148, pp. 31–36, 1992).

Figure 11:
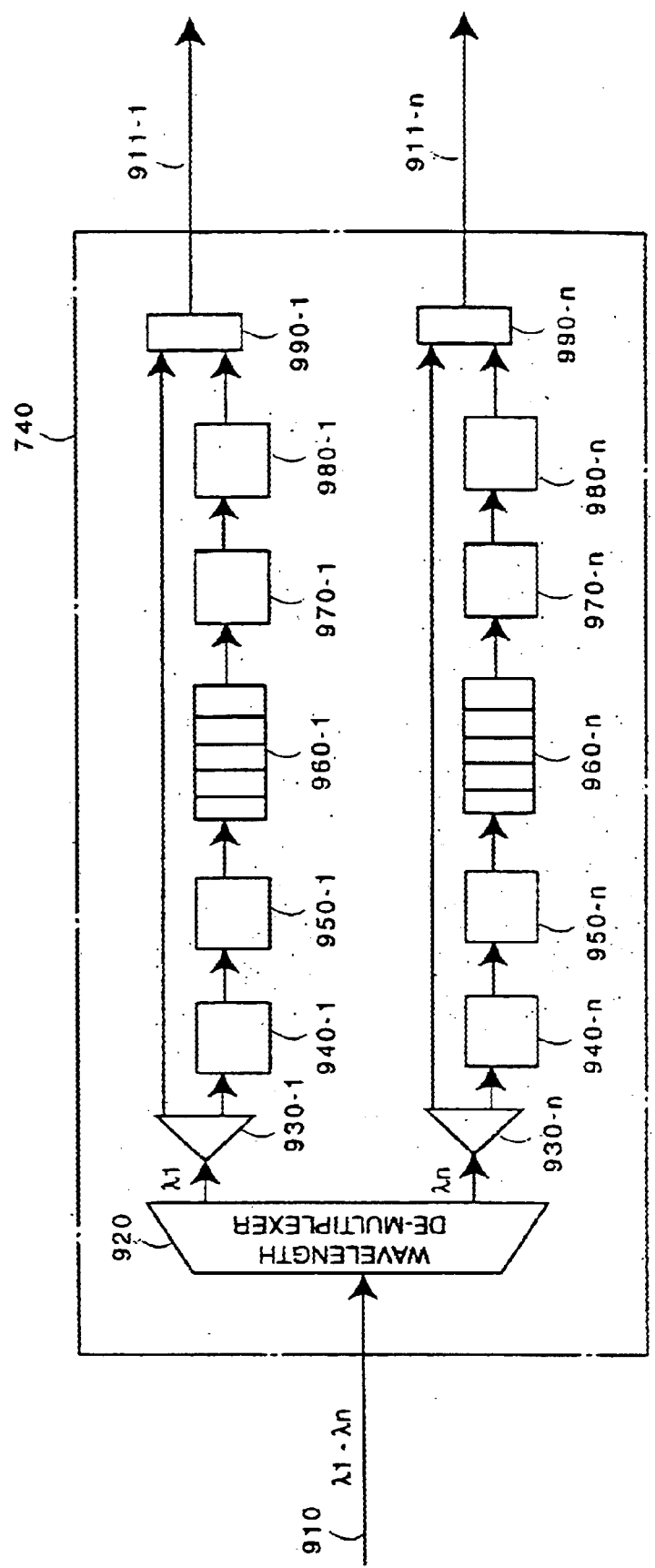
FIG. 11 is a block diagram showing an example of an internal arrangement of a wavelength-multiplex receiving interface with a buffer in FIG. 9.
Figure 12:
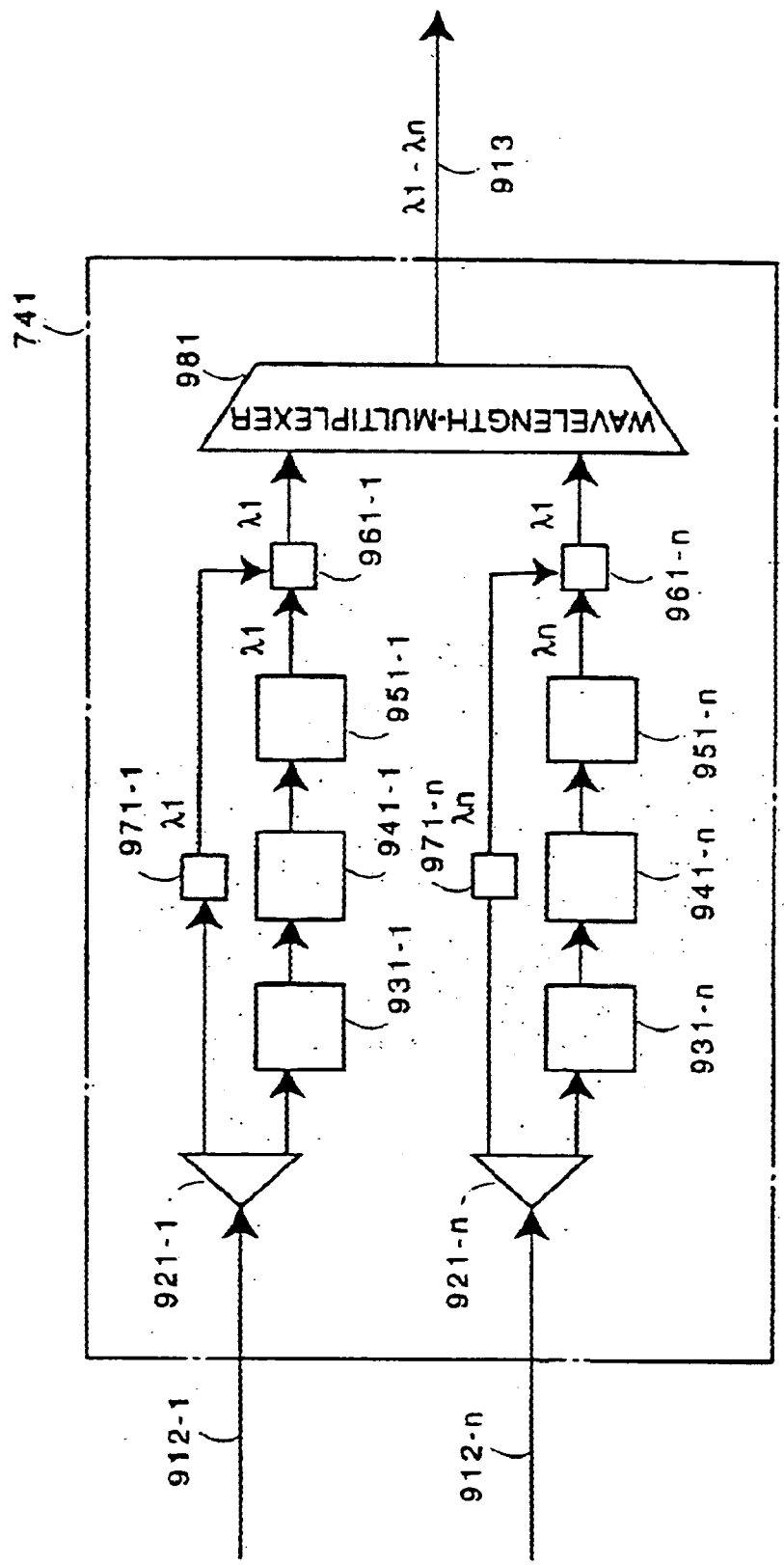
FIG. 12 is a block diagram showing an example of an internal arrangement of a wavelength-multiplex transmitting interface in FIG. 9.

Detailed arrangements of the wavelength-multiplex receiving interfaces 740 with the buffers and the wavelength-multiplex transmitting interfaces 741 in FIG. 9 are shown in FIG. 11 and FIG. 12.

At first, as shown in FIG. 11, in the wavelength-multiplex receiving interfaces 740 with the buffers, the optical transmission lines 730-x within the node in FIG. 9 and an input terminal 910 are connected to each other, and each of the input ports 750-(x·n-n+1) to 750-x·n of the optical switch network 760 is connected to output terminals 911-z.

A wavelength de-multiplexer 920 separates wavelength-multiplex signals from the input terminal 910 into optical signals having n wavelengths, and outputs each of the optical signals to optical switches 930-z.

The optical switches 930-z, in case of exchange the input optical signals in an ATM between buffers 960-z and the optical switch network 760, switch the optical signals to opto-electro converters 940-z. Otherwise, the optical switches 930-z, in case of applying a circuit exchange to the input optical signals by the optical switch network 760, switch the optical signals to optical combiners 990-z in order to take a shortcut around the opto-electro converters 940-z, flaming circuits 950-z, the buffers 960-z, routing tables 970-z and electro-opto converters 980-z.

The opto-electro converters 940-z convert the optical signals having predetermined wavelengths, which are input from the wavelength de-multiplexer 920, respectively, into electric signals once, and output the electric signals to the flaming circuits 950-z.

The flaming circuits 950-z receive the electric signals from the opto-electro converters 940-z, take out cells from the transmission frames, and send the cells to the buffers 960-z, respectively. The buffers 960-z temporally store the input cells, and send the cells to the routing tables 970-z in a first-in/first-out manner, for example.

The routing tables 970-z analyze headers of the cells from the buffers 960-z, and thereby, determine the output ports 752-1 to 752-M·n or 753-y of the optical switch network 760, from which the cells are output, rewrite values in the headers to predetermined values, and send them to the electro-opto converters 980-z.

Furthermore, for switching control of the optical switches 840-1 to 840-N·n and the variable wavelength filters 850-1 to 850-N·n in the optical switch network 760, the routing tables 970-z notify the optical switch network 760 of the output ports of the optical cells. The electro-opto converters 980-z convert the cells from the routing tables 970-z into optical cells and send the optical cells to the optical combiners 990-z, respectively.

The optical combiners 990-z send the optical signals from the optical switches 930-z or the optical signals from the electro-opto converters 980-z to the output terminals 911-z, respectively.

In this way, after outputting the n optical signals that are multiplied by the wavelength-multiplex signals from the input terminal 910 to the output terminals 911-z as it is without passing the buffers, or converting the n optical signals into electric signals, respectively, the wavelength-multiplex receiving interfaces 740 with the buffers take out the cells from the transmission frames, and after temporally storing the cells in the buffers, can output the cells to the output terminals 911-z.

On the other hand, as shown in FIG. 12, in the wavelength-multiplex transmitting interfaces 741, each of the output ports 752-(x·n-n+1) to 752-x·n of the optical switch network 760 in FIG. 9 is connected to input terminals 912-z, and the optical transmission lines 770-x within the node and an output terminal 913 are connected to each other.

Optical switches 921-z, in case of applying a cell exchange to the input optical signals between the buffers 960-z of the wavelength-multiplex receiving interfaces 740 with the buffers and the optical switch network 760, switch the optical signals to opto-electro converters 931-z.

Otherwise, the optical switches 921-z, in case of applying a circuit exchange to the input optical signals by the optical switch network 760, switch the optical signals to wavelength converters 971-z (z is 1 to n) as it is.

The opto-electro converters 931-z convert the input optical cells into electric signals, and send the electrical signals to cell inserting circuits 941-z.

The cell inserting circuits 941-z receive the cells from the opto-electro converters 931-z, insert them into the transmission frames, and send them to electro-opto converters 951-z, respectively.

The electro-opto converters 951-z convert electric signals, which are input from the cell inserting circuits 941-z, respectively, into optical signals having predetermined wavelengths λ1 to λn, and send the optical signals to a wavelength-multiplexer 981 by way of the optical combiners 961-z.

The wavelength converters 971-z convert the optical signals, which are input from the optical switches, respectively, into optical signals having predetermined wavelengths λz, and send the optical signals to the wavelength-multiplexer 981 by way of the optical combiners 961-z.

The wavelength-multiplexer 981 combines the optical signals having n wavelengths from the electro-opto converters 951-z or the optical signals from the wavelength converters 971-z, and sends wavelength-multiplex signals to the output terminal 913.

In this way, the wavelength-multiplex transmitting interfaces 741 convert the optical signals from the input terminals 912-z into electric signals, and thereafter, insert the respective cells into the transmission frames and convert the cells into optical signals having predetermined n wavelengths, or convert the optical signals from the input terminals 912-z into optical signals having the predetermined n wavelengths as it is, and send the wavelength-multiplex signals to the output terminal 913.

Figure 13:
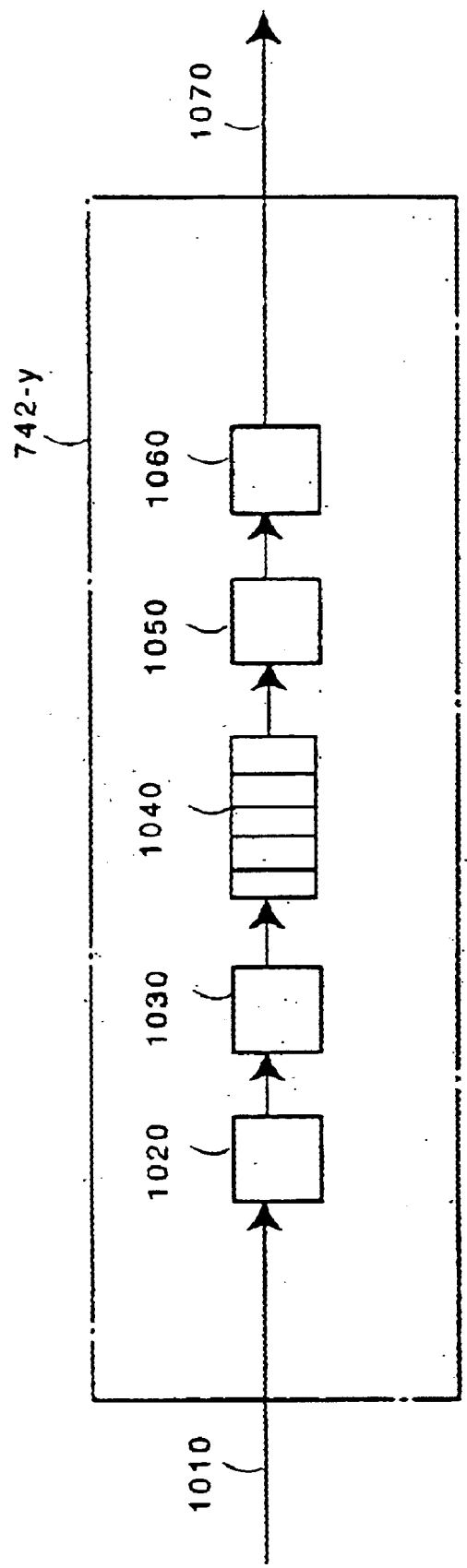
FIG. 13 is a block diagram showing an example of an internal arrangement of a receiving interface with a buffer in FIG. 9.
Figure 14:
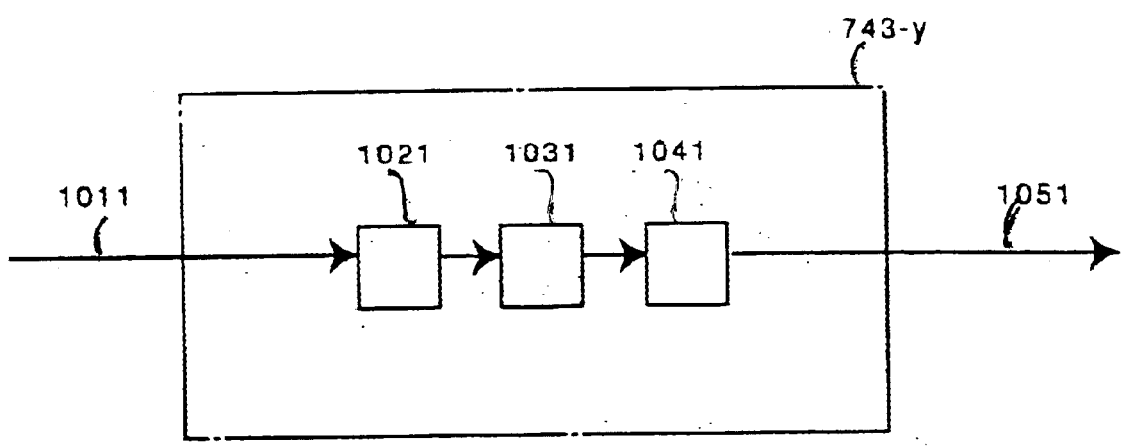
FIG. 14 is a block diagram showing an example of an internal arrangement of a transmitting interface in FIG. 9.

Detailed arrangements of the receiving interface 742 with the buffers and the transmitting interface 743 shown in FIG. 9 are shown in FIG. 13 and FIG. 14.

At first, as shown in FIG. 13, in the receiving interface 742-y with the buffers, the input optical transmission lines 780-y in FIG. 9 and an input terminal 1010 are connected to each other, and each of the input ports 751-y of the optical switch network 760 is connected to an output terminal 1070.

In order to exchange optical signals in an ATM by buffers 1040 and the optical switch network 760, which are input from the input terminal 1010, a opto-electro converter 1020 converts the optical signals into electric signals once, and outputs the electric signals to a flaming circuit 1030. The flaming circuit 1030 receives the electric signals from the opto-electro converter 1020, takes out cells from transmission frames, and sends the cells to the buffers 1040.

The buffers 1040 temporally store the input cells, and send the cells to a routing table 1050 in a first-in/first-out manner, for example.

The routing table 1050 analyzes headers of the cells from the buffers 1040, and thereby, determines the output ports 752-1 to 752-M·n or 753-y of the optical switch network 760, from which the cells are output, rewrites values in the headers to predetermined values, and sends them to an electro-opto converter 1060.

Furthermore, for switching control of the optical switches 840-1 to 840-N·n and the variable wavelength filters 850-1 to 850-N·n in the optical switch network 760, the routing table 1050 notifies the optical switch network 760 of the output ports of the optical cells.

The electro-opto converter 1060 converts the cells from the routing table 1050 into optical cells, and sends the optical cells to the output terminal 1070.

In this way, after converting the optical signals from the input terminal 1010 into the electric signals, respectively, the receiving interfaces 742-y with the buffers take out the cells from the transmission frames, and after temporally storing the cells in the buffers, output the cells to the output terminal 1070.

On the other hand, as shown in FIG. 14, in the transmitting interfaces 743-y, each of the output ports 753-y of the optical switch network 760 in FIG. 9 is connected to an input terminal 1011, and the output optical transmission lines 790-y and an output terminal 1051 are connected to each other. A opto-electro converter 1021 converts optical signals from the input terminal 1011 into electric signals, and sends the electrical signals to a cell inserting circuit 1031.

The cell inserting circuit 1031 receives cells from the opto-electro converter 1021, inserts them into the transmission frames, and sends them to an electro-opto converter 1041.

The electro-opto converter 1041 converts electric signals from the cell inserting circuit 1031 into optical signals, and sends the optical signals to the output terminal 1051.

In this way, the transmitting interfaces 743-y convert the optical signals from the input terminal 1011 into the electric signals, and thereafter, insert the cells into the transmission frames, respectively, and output the optical signals to the output terminal 1051.

As explained above, the optical communication network node of the third embodiment of the present invention shown in FIG. 9 can also operate in the same manner as the optical communication network node of the first embodiment of the present invention shown in FIG. 1.

Here, required scales of the optical communication network node of the third embodiment of the present invention shown in FIG. 9 and the conventional optical communication network node are compared with each other. However, a condition is assumed that all traffics transmitted in the wavelength-multiplex input optical transmission lines 700-x and the wavelength-multiplex output optical transmission lines 720-x can be dropped or inserted.

With regard to the optical communication network node of FIG. 9, if the optical add-dorop multiplexer 710 is analyzed by a space dividing equivalent circuit, $((M \cdot n+L)2+(M \cdot n))$ cross points are necessary in totality for the optical switch network 760 and the optical add-dorop multiplexer 710. Also, with regard to the ATM switch, the optical switch network 760 is commonly used, and $(M \cdot n+L)2$ cross points are necessary.

However, in the arrangement shown in FIG. 9, the optical switch network 760 in FIG. 9 concurrently performs the operation of the optical switch network in the conventional optical communication network node and the operation of the switch network for self-routing within the ATM switch. Accordingly, $((M \cdot n+L)2+(M \cdot n))$ cross points become to be necessary in totality for the optical switch network and the ATM switch. Therefore, it is possible to especially reduce the number of the cross points, compared with the conventional cross points $((2 M \cdot n)2+(M \cdot n+L)2)$.

Therefore, according to the optical communication network node shown in FIG. 9, with regard to the required ATM switch, it is possible to realize a small-sized node while maintaining the same capacity as the conventional node.

As explained above, in accordance with the optical communication network node of the first embodiment of the present invention, in case of conducting the wavelength-conversion between the wavelength-multiplex input optical transmission lines and the wavelength-multiplex output optical transmission lines, and making arbitrary optical signals pass, since the pass of the signals is conducted only by converting the optical signals from the optical switch network into electric signals, and thereafter, switching the electric signals by the ATM switch, and applying the wavelength-conversion again in the optical switch network, the number of the cross points necessary for the optical switch network is reduced, and an advantage is effected that it is possible to realize a small-sized node and to reduce a cost.

Also, in accordance with the optical communication network node of the second embodiment of the present invention, in case of conducting the wavelength-conversion between the wavelength-multiplex input optical transmission lines and the wavelength-multiplex output optical transmission lines, and making arbitrary optical signals pass, since the pass of the signals is conducted only by the optical switch network and the optical add-dorop multiplexer without interposing the ATM switches, the number of the cross points necessary for the optical switch network and the ATM switches is reduced, and an advantage is effected that it is possible to realize a small-sized node and to reduce a cost.

Moreover, in accordance with the optical communication network node of the third embodiment of the present invention, since one optical switch network is used for both a circuit exchange and a self-routing switch of the ATM switch, a circuit exchange function of the optical switch network and a cell exchange function of the ATM switch are conducted in combination with each other, and an advantage is effected that it is possible to realize a small-sized node and to reduce a cost.

Next, a forth embodiment will be explained.

Figure 15:
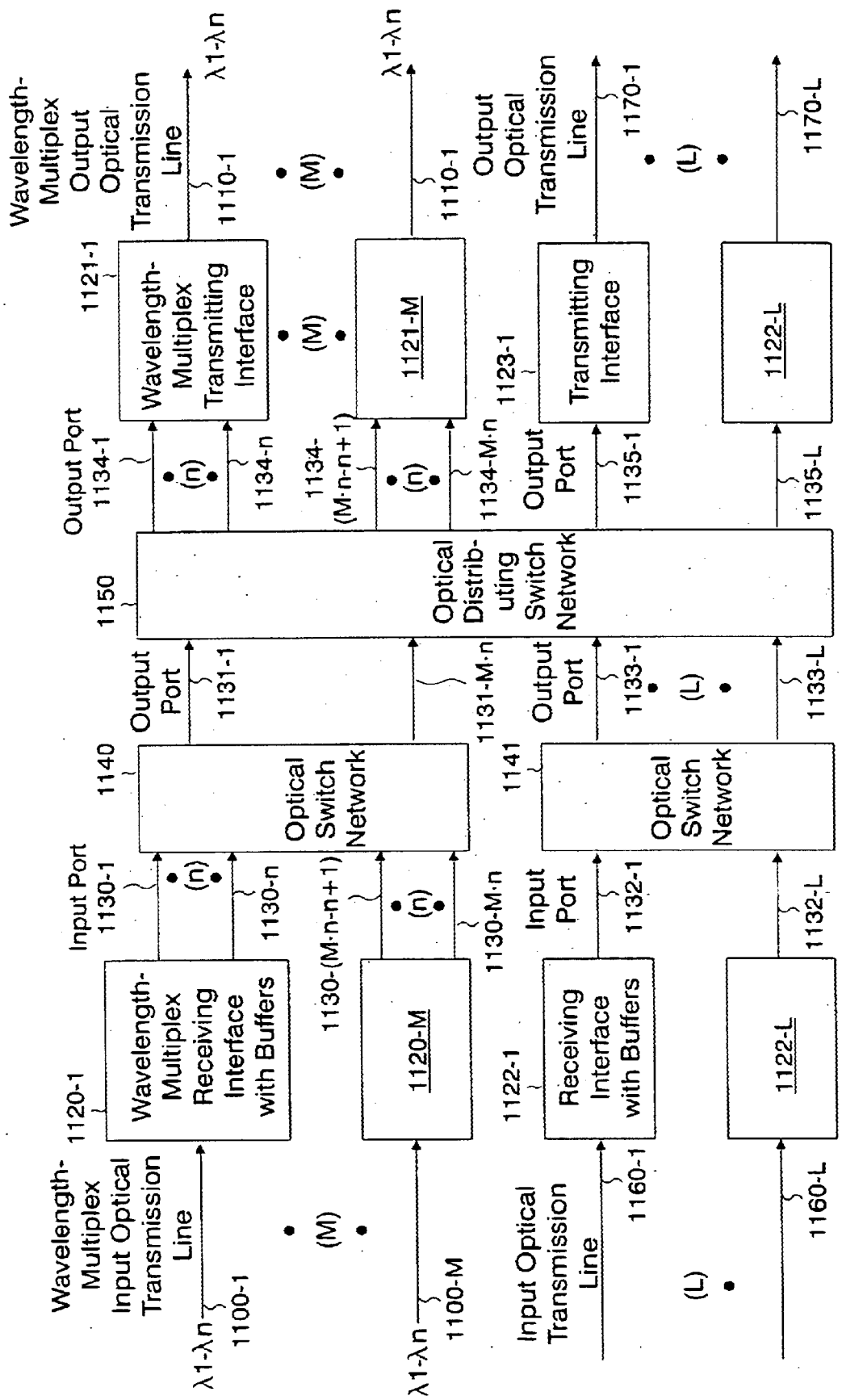
FIG. 15 is a block diagram showing an arrangement of a fourth embodiment of the optical communication network node of the present invention.

FIG. 15 is a block diagram showing an arrangement of the fourth embodiment.

In FIG. 15, a plurality of input optical transmission lines 1100-X (X is 1 to M) to which wavelength-multiplex optical signals are input are connected to respective input ends of a plurality of wavelength-multiplex receiving interfaces 1120-X (X is 1 to M) with buffers, respectively.

Also, a plurality of input optical transmission lines 1160-Y (Y is 1 to L) are connected to respective input ends of a plurality of receiving interfaces 1122-Y (Y is 1 to L) with the buffers, respectively.

The above-described plurality of wavelength-multiplex receiving interfaces 1120-X (X is 1 to M) with the buffers, after separating wavelength-multiplex optical signals input from one input end into a plurality of optical signals having different wavelengths, output these plurality of optical signals as it is from each of a plurality of output ends, or convert the plurality of optical signals into electric signals, temporarily store ATM cells in the buffers, which are taken out from transmission frames, and after processing headers of the ATM cells output from the buffers, convert the electric signals into optical signals and output the optical signals from each of the plurality of output ends.

The respective output ends of the plurality of wavelength-multiplex receiving interfaces 1120-X (X is 1 to M) with the buffers are connected to input ends of optical switch network 1140 by each of the number n of input ports 1130-(X·n-n+1) to 1130-X·n (X is 1 to M) of the optical switch network 1140.

Also, the above-described plurality of receiving interfaces 1122-Y (Y is 1 to L) with the buffers have one input end and one output end, respectively, and convert optical signals input from the input end through the plurality of input optical transmission lines 1160-Y (Y is 1 to L) into electric signals, temporarily store ATM cells in the buffers, which are taken out from transmission frames, and after processing headers of the ATM cells output from the buffers, convert the electric signals into optical signals and output the optical signals from the output end.

The respective output ends of the plurality of receiving interfaces 1122-Y (Y is 1 to L) with the buffers are connected to input ends of optical switch network 1141 through input ports 1132-Y (Y is 1 to L) of the optical switch network 1141.

The above-described optical switch network 1140 has a plurality of input ends and a plurality of output ends, and sets predetermined optical circuits between the plurality of predetermined input ends and output ends, or exchanges optical signals cell by cell under control by the plurality of wavelength-multiplex receiving interfaces 1120-X (X is 1 to M) with the buffers.

The output ends of the optical switch network 1140 are connected to input ends of an optical distributing switch network 1150 through output ports 1131-1 to 1131-M·n of the optical switch network 1140.

Also, the optical switch network 1141 has a plurality of input ends and a plurality of output ends, and exchanges optical signals cell by cell under control by the plurality of wavelength-multiplex receiving interfaces 1122-Y (Y is 1 to L) with the buffers.

The output ends of the optical switch network 1141 are connected to input ends of the optical distributing switch network 1150 through output ports 1133-1 to 1133-L of the optical switch network 1141.

The optical distributing switch network 1150 has a plurality of input ends and a plurality of output ends, and switches optical signals from the plurality of input ends to the predetermined output ends.

The output ends of the optical distributing switch network 1150 are connected to input ends of wavelength-multiplex transmitting interfaces 1121-1 to 1121-M through output ports 1134-1 to 1134-M·n of the optical distributing switch network 1150.

Also, the output ends of the optical distributing switch network 1150 are connected to input ends of transmitting interfaces 1123-1 to 1123-L through output ports 1135-1 to 1135-L of the optical distributing switch network 1150.

The above-described wavelength-multiplex transmitting interfaces 1121-X (X is 1 to M) have a plurality of input ends and one output end, respectively, and convert each of optical signals on optical circuits, which are input from the plurality of input ends, into optical signals having predetermined wavelengths as it is, or after storing ATM cells in transmission frames, which are taken out by converting each of the optical signals from the plurality of input ends into electric signals, convert the electric signals into optical signals having the predetermined wavelengths, combine the plurality of converted optical signals having the predetermined wavelengths, and output wavelength-multiplex optical signals from the one output end.

The output end of the wavelength-multiplex transmitting interfaces 1121-X (X is 1 to M) is connected to a plurality of output optical transmission lines 1110-X (X is 1 to M) to which the wavelength-multiplex optical signals are output.

The plurality of transmitting interfaces 1123-Y (Y is 1 to L) have one input end and one output end, respectively, and after storing ATM cells in transmission frames, which are taken out by converting each of optical signals input from the input end into electric signals, convert the electric signals into optical signals, and output the optical signals from the output end.

The output end of the transmitting interfaces 1123-Y (Y is 1 to L) is connected to a plurality of output optical transmission lines 1170-Y (Y is 1 to L).

In the fourth embodiment constructed in this manner, the optical switch network 1140 is provided for pass and drop connection and the optical switch network 1141 is provided for inserting and folded connection, and each of the optical signals which are passed and dropped or which are inserted and folded is separately sent to a predetermined output by the optical distributing switch network. As a result, unnecessary hardware can be reduced, and it is possible to realize a small-sized optical node.

Next, operation of this fourth embodiment will be explained. Also in the explanation hereinafter, as a matter of convenience, it is referred to a drop of a signal that a signal from a optical communication network constructed of nodes is sent to other local networks and area networks contained in a node of its own. To the contrary, it is referred to an insert of a signal that a signal from these local networks and area networks is sent to an optical communication network. Moreover, it is referred to a pass of a signal that an optical signal from an adjacent node in an optical communication network is transferred to other nodes.

The wavelength-multiplex optical signals created by being multiplied by optical signals having n different wavelengths ($\lambda 1$ to $\lambda n$) are sent to the wavelength-multiplex receiving interfaces 1120-X (X is 1 to M) with the buffers by the wavelength-multiplex input optical transmission lines 1100-X (X is 1 to M), respectively.

Each of the wavelength-multiplex receiving interfaces 1120-X (X is 1 to M) with the buffers is connected to the optical switch network 1140 by each of the number n of the input ports 1130-(X·n-n+1) to 1130-X·n (X is 1 to M) of the optical switch network 1140.

The respective wavelength-multiplex receiving interfaces 1120-X (X is 1 to M) with the buffers, after separating the input wavelength-multiplex optical signals into optical signals having n different wavelengths, send these n optical signals to the optical switch network 1140 from the input ports 1130-(X·n-n+1) to 1130-X·n (X is 1 to M).

Otherwise, the respective wavelength-multiplex receiving interfaces 1120-X (X is 1 to M) with the buffers, after separating the input wavelength-multiplex optical signals into optical signals having n different wavelengths, take out ATM cells from transmission frames every n optical signals, also send optical cells to the optical switch network 1140 from the input ports 1130-(X·n-n+1) to 1130-X·n (X is 1 to M) by way of the buffers which are not shown in FIG. 15.

On the other hand, the respective receiving interfaces 1122-Y (Y is 1 to L) with the buffers receive optical signals from the input optical transmission lines 1160-Y (Y is 1 to L), take out ATM cells from transmission frames, store the ATM cells in the buffers, and thereafter, send optical cells to the optical switch network 1141 through the input ports 1132-Y (Y is 1 to L).

When the optical switch network 1140 receives optical signals which have not passed through the buffers in the wavelength-multiplex receiving interfaces 1120-X (X is 1 to M) with the buffers, the optical signals are transmitted to the predetermined output ports 1131-1 to 1131-M·n by switching circuits in a circuit switching manner.

Also, when receiving the optical cells by way of the buffers within the wavelength-multiplex receiving interfaces 1120-X (X is 1 to M) with the buffers, the optical switch network 1140 switches the cells to the predetermined output ports 1131-1 to 1131-M·n cell by cell in accordance with switching control signals notified through control lines (not shown) from the wavelength-multiplex receiving interfaces 1120-X (X is 1 to M) with the buffers.

On the other hand, when receiving the optical cells from the receiving interfaces 1122-Y (Y is 1 to L) with the buffers, the optical switch network 1141 switches the cells to the predetermined output ports 1131-1 to 1131-L cell by cell in accordance with headers of the cells which are notified through control lines (not shown) from the receiving interfaces 1122-Y (Y is 1 to L) with the buffers.

The optical distributing switch network 1150 switches the optical signals from the output ports 1131-1 to 1131-M·n of the optical switch network 1140 and the optical signals from the output ports 1133-1 to 1133-L of the optical switch network 1141 to the output ports 1134-1 to 1134-M·n and the output ports 1135-1 to 1135-L.

The respective wavelength-multiplex transmitting interfaces 1121-X (X is 1 to M) are also connected to the optical distributing switch network 1150 by each of the number n of the output ports 1134-(X·n-n+1) to 1134-X·n.

When receiving the optical signals switched in a circuit switching manner by the optical switch network 1140 by way of the output ports 1134-(X·n-n+1) to 1134-X·n, the respective wavelength-multiplex transmitting interfaces 1121-X (X is 1 to M), after converting these signals into optical signals having n wavelengths, combine them and send created wavelength-multiplex optical signals to the wavelength-multiplex output optical transmission lines 1110-X (X is 1 to M).

Also, when receiving the optical cells switched cell by cell by means of the optical switch networks 1140 and 1141 by way of the output ports 1134-(X·n-n+1) to 1134-X·n, the respective wavelength-multiplex transmitting interfaces 1121-X (X is 1 to M), after inserting these cells into the transmission frames every n cells and converting the cells into optical signals having n wavelengths, combine them and send created wavelength-multiplex optical signals to the wavelength-multiplex output optical transmission lines 1110-X (X is 1 to M).

Each of the input ends of the transmitting interfaces 1123-Y (Y is 1 to L) is connected to the optical distributing switch network 1150 through the output ports 1135-Y (Y is 1 to L) of the optical distributing switch network 1150.

Therefore, when receiving the optical cells switched cell by cell by means of the optical switch networks 1140 and 1141 by way of the output ports 1135-Y (Y is 1 to L), the respective transmitting interfaces 1123-Y (Y is 1 to L), after inserting the cells into the transmission frames, convert the cells into optical signals, and send the optical signals to the output optical transmission lines 1170-Y (Y is 1 to L).

Next, a detailed arrangement of each section of the fourth embodiment of the present invention of FIG. 15 will be explained.

Figure 16:
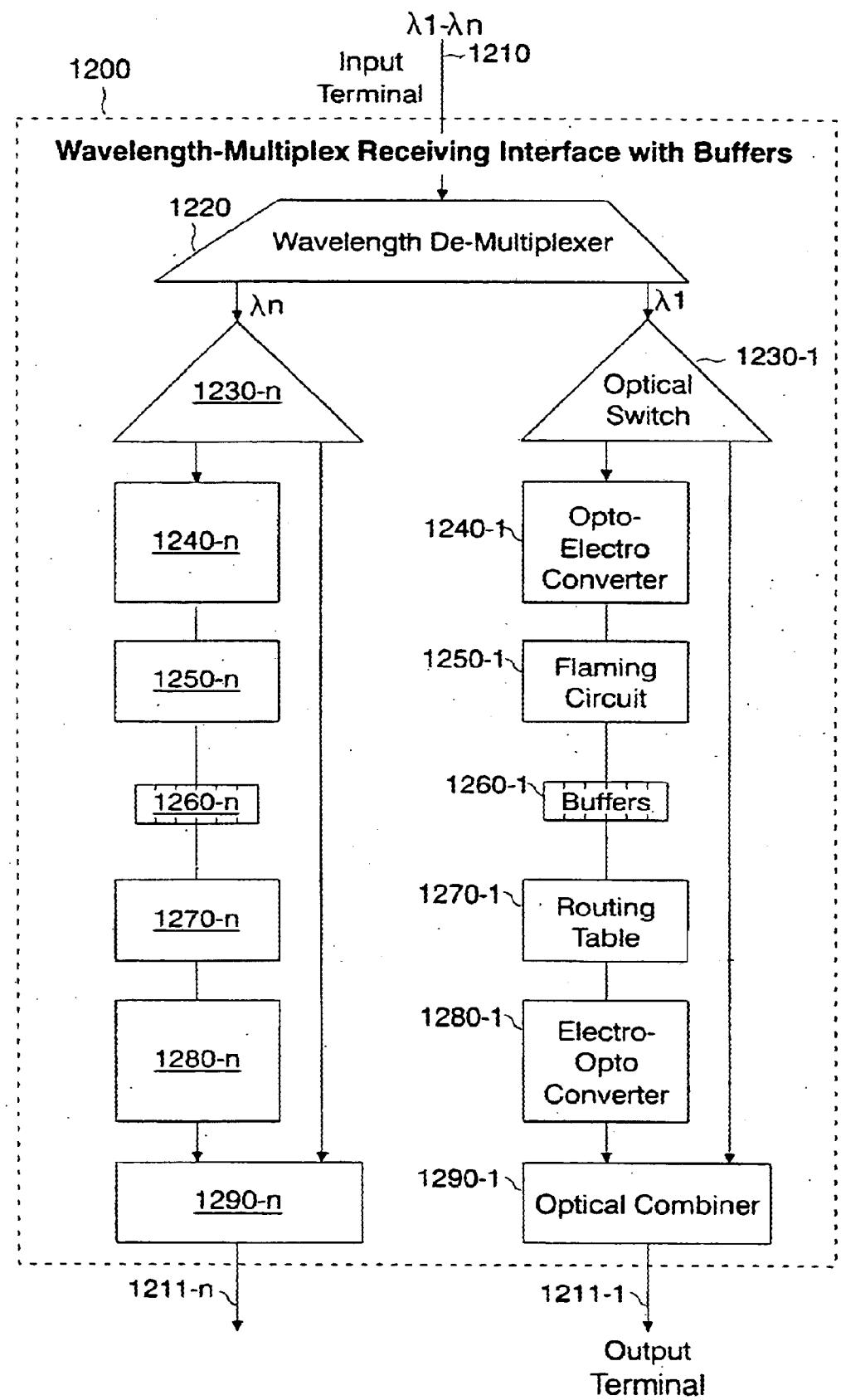
FIG. 16 is a block diagram showing an arrangement of a wavelength-multiplex receiving interface with a buffer used in fourth and fifth embodiments of the optical communication network node of the present invention.
Figure 17:
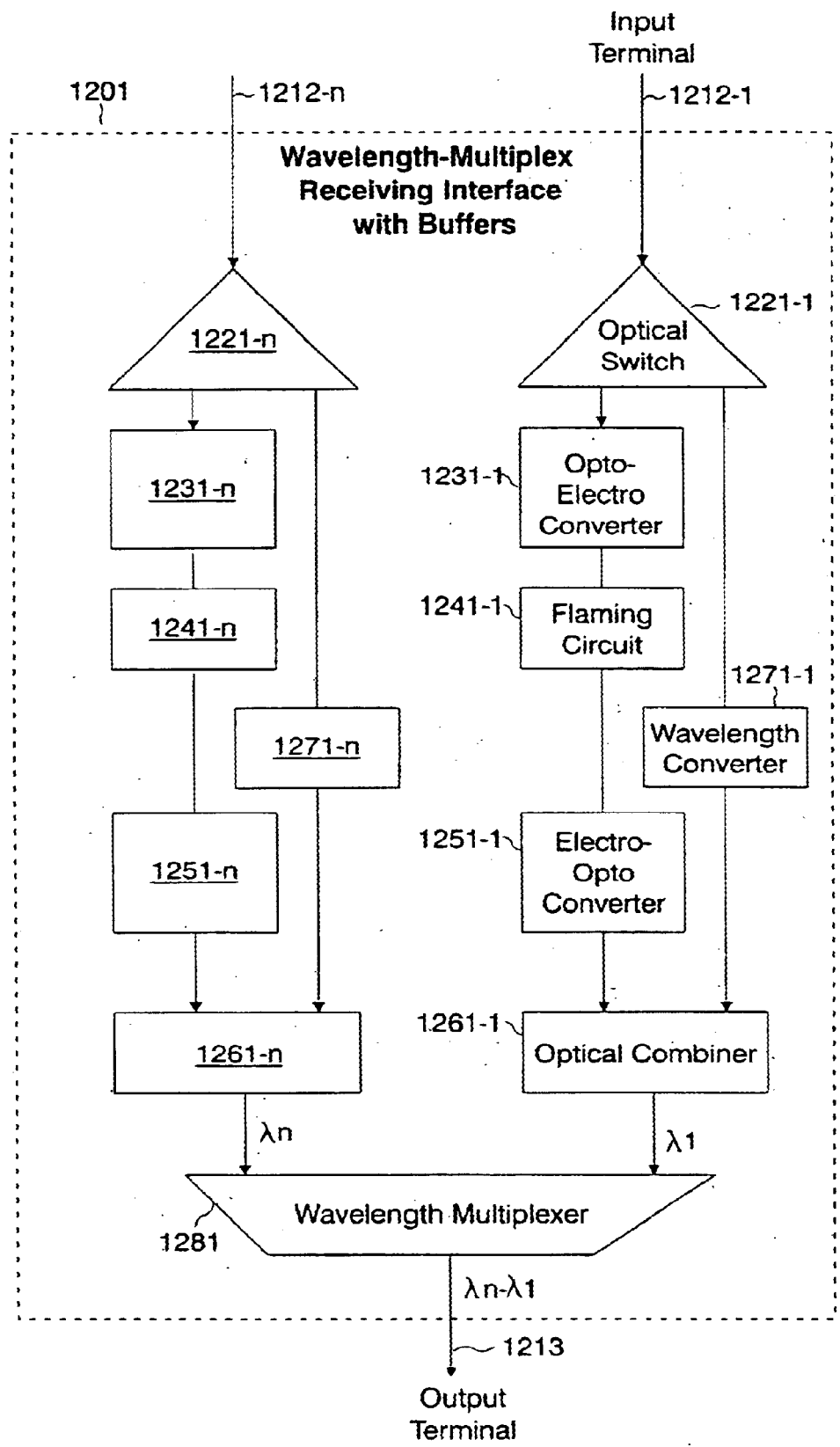
FIG. 17 is a block diagram showing an arrangement of a wavelength-multiplex transmitting interface used in the fourth and fifth embodiments of the optical communication network node of the present invention.

Detailed arrangements of the wavelength-multiplex receiving interfaces 1120 with the buffers and the wavelength-multiplex transmitting interfaces 1121 in FIG. 15 are shown in FIG. 16 and FIG. 17, respectively.

In addition, the wavelength-multiplex receiving interface 1200 with the buffers having the arrangement shown in FIG. 16 and the wavelength-multiplex transmitting interface 1201 of FIG. 17 can be applied to the wavelength-multiplex receiving interfaces 1120 with the buffers and the wavelength-multiplex transmitting interfaces 1121 of the optical communication network node shown in FIG. 15.

As shown in FIG. 16, in the wavelength-multiplex receiving interface 1200 with the buffers, the wavelength-multiplex input optical transmission lines 1100-X (X is 1 to M) of FIG. 15 and an input terminal 1210 are connected to each other, and each of the input ports 1130-(X·n-n+1) to 1130-X·n (X is 1 to M) of the optical switch network 1140 is connected to output terminals 1211-Z (Z is 1 to n).

A wavelength de-multiplexer 1220 separates wavelength-multiplex signals from the input terminal 1210 into optical signals having n wavelengths, and sends each of the optical signals to optical switches 1230-Z (Z is 1 to n).

The optical switches 1230-Z (Z is 1 to n), in case of applying a circuit exchange to the input optical signals by the optical switch network 1140, switch the optical signals to optical combiners 1290-Z (Z is 1 to n) in order to take a shortcut around opto-electro converters 1240-Z, flaming circuits 1250-Z, buffers 1260-Z, routing tables 1270-Z and electro-opto converters 1280-Z (Z is 1 to n), which is a photoelectric and electrooptical conversion system.

Otherwise, the optical switches 1230-Z (Z is 1 to n), in case of exchanging the input optical signals in an ATM by the buffers 1260-Z (Z is 1 to n) and the optical switch network 1140 of FIG. 15, switch the optical signals to the opto-electro converters 1240-Z (Z is 1 to n).

The opto-electro converters 1240-Z (Z is 1 to n) convert the optical signals having predetermined wavelengths, which are input from the wavelength de-multiplexer 1220, respectively, into electric signals once, and output the electric signals to the flaming circuits 1250-Z (Z is 1 to n).

The flaming circuits 1250-Z (Z is 1 to n) receive the electric signals from the opto-electro converters 1240-Z (Z is 1 to n), take out cells from the transmission frames, and send the cells to the buffers 1260-Z (Z is 1 to n), respectively.

The buffers 1260-Z (Z is 1 to n) temporally store the input cells, and send the cells to the routing tables 1270-Z (Z is 1 to n) in a first-in/first-out manner, for example.

The routing tables 1270-Z (Z is 1 to n) analyze headers of the cells from the buffers 1260-Z (Z is 1 to n), and thereby, determine the output ports 1131-1 to 1131-M·n of the optical switch network 1140, from which the cells are output, rewrite values in the headers to predetermined values, and send them to the electro-opto converters 1280Z (Z is 1 to n).

Furthermore, for switching control of the optical switch network 1140, the routing tables 1270-Z (Z is 1 to n) notify the optical switch network 1140 of the output ports of the optical cells.

The electro-opto converters 1280-Z (Z is 1 to n) convert the cells from the routing tables 1270-Z (Z is 1 to n) into optical cells and send the optical cells to the optical combiners 1290-Z (Z is 1 to n), respectively.

The optical combiners 1290-Z (Z is 1 to n) send the optical signals from the optical switches 1230-Z (Z is 1 to n) or the optical signals from the electro-opto converters 1280-Z (Z is 1 to n) to the output terminals 1211-Z (Z is 1 to n), respectively.

In this way, after outputting the n optical signals that are multiplied by the wavelength-multiplex signals from the input terminal 1210 to the output terminals 1211-Z (Z is 1 to n) as it is without passing the buffers, or converting the n optical signals into electric signals, respectively, the wavelength-multiplex receiving interface 1200 with the buffers takes out the cells from the transmission frames, and after temporally storing the cells in the buffers, can output the cells to the output terminals 1211-Z (Z is 1 to n).

On the other hand, as shown in FIG. 17, in the wavelength-multiplex transmitting interface 1201, the output ports 1134-(X·n-n+1) to 1134-X·n (X is 1 to M) of the optical distributing switch network 1150 of FIG. 15 are connected to input terminals 1212-Z (Z is 1 to n), respectively, and the wavelength-multiplex output optical transmission lines 1110-X (X is 1 to M) and an output terminal 1213 are connected to each other.

Optical switches 1221-Z (Z is 1 to n), in case of applying a circuit exchange to the input optical signals by the optical switch network 1140, switch the optical signals to wavelength converters 1271-Z (Z is 1 to n) as it is.

The wavelength converters 1271-Z (Z is 1 to n) convert the optical signals, which are input from the optical switches 1221-Z (Z is 1 to n), respectively, into optical signals having predetermined wavelengths λz (Z is 1 to n), and output the optical signals to the wavelength-multiplexer 1281 by way of the optical combiners 1261-Z (Z is 1 to n).

Otherwise, the optical switches 1221-Z (Z is 1 to n), in case of exchanging the input optical signals in an ATM by the buffers 1260-Z (Z is 1 to n) of the wavelength-multiplex receiving interface 1200 with the buffers and the optical switch network 1140, switch the optical signals to the opto-electro converters 1231-Z (Z is 1 to n) which is a photoelectric and electrooptical conversion system.

The opto-electro converters 1231-Z (Z is 1 to n) convert the input optical cells into electric signals, and send the electrical signals to cell inserting circuits 1241-Z (Z is 1 to n).

The cell inserting circuits 1241-Z (Z is 1 to n) receive the cells from the opto-electro converters 1231-Z (Z is 1 to n), insert them into the transmission frames, and send them to electro-opto converters 1251-Z (Z is 1 to n), respectively.

The electro-opto converters 1251-Z (Z is 1 to n) convert electric signals, which are input from the cell inserting circuits 1241-Z (Z is 1 to n), respectively, into optical signals having predetermined wavelengths λ1 to λn, and send the optical signals to a wavelength-multiplexer 1281 by way of the optical combiners 1261-Z (Z is 1 to n).

The wavelength-multiplexer 1281 combines the optical signals having n wavelengths from the electro-opto converters 1251-Z (Z is 1 to n) or the optical signals from the wavelength converters 1271-Z (Z is 1 to n), and sends wavelength-multiplex signals to the output terminal 1213.

In this way, the wavelength-multiplex transmitting interface 1201 converts the optical signals from the input terminals 1212-Z (Z is 1 to n) into electric signals, and thereafter, inserts the respective cells into the transmission frames and converts the cells into optical signals having predetermined n wavelengths, or converts the optical signals from the input terminals 1212-Z (Z is 1 to n) into optical signals having the predetermined n wavelengths as it is, and sends the wavelength-multiplex signals to the output terminal 1213.

Figure 18:
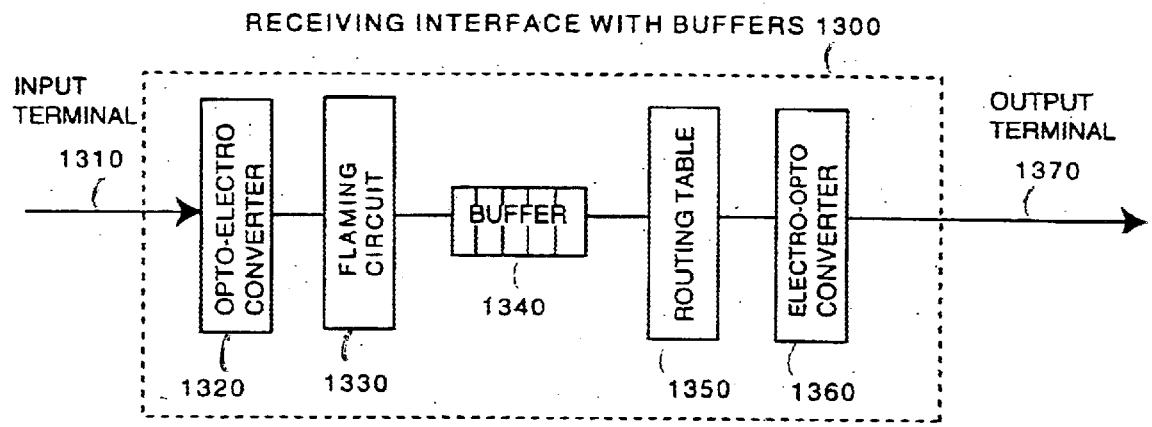
FIG. 18 is a block diagram showing an arrangement of a receiving interface with a buffer used in the fourth and fifth embodiments of the optical communication network node of the present invention.
Figure 19:
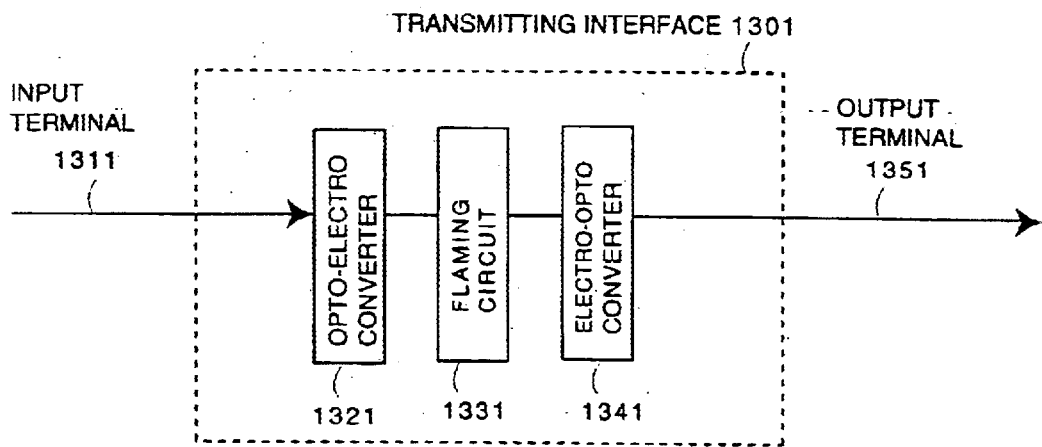
FIG. 19 is a block diagram showing an arrangement of a transmitting interface used in the fourth and fifth embodiments of the optical communication network node of the present invention.

Next, detailed arrangements of the receiving interfaces 1122 with the buffers and the transmitting interfaces 1123 of FIG. 15 are shown in FIG. 18 and FIG. 19, respectively.

In addition, the wavelength-multiplex receiving interface 1300 with the buffers having the arrangement shown in FIG. 18 and the wavelength-multiplex transmitting interface 1301 having the arrangement shown in FIG. 19 can be applied to the wavelength-multiplex receiving interfaces 1122 with the buffers and the wavelength-multiplex transmitting interfaces 1123 of the optical communication network node shown in FIG. 15.

As shown in FIG. 18, in the receiving interface 1300 with the buffers, the input optical transmission lines 1160-Y (Y is 1 to L) in FIG. 15 and an input terminal 1310 are connected to each other, and each of the input ports 1132-Y (Y is 1 to L) of the optical switch network 1141 is connected to an output terminal 1370.

In order to exchange optical signals in an ATM by buffers 1340 and the optical switch network 1141, which are input from the input terminal 1310, a opto-electro converter 1320 converts the optical signals into electric signals once, and outputs the electric signals to a flaming circuit 1330.

The flaming circuit 1330 receives the electric signals from the opto-electro converter 1320, takes out cells from transmission frames, and sends the cells to the buffers 1340.

The buffers 1340 temporally store the input cells, and send the cells to a routing table 1350 in a first-in/first-out manner, for example.

The routing table 1350 analyzes headers of the cells from the buffers 1340, and thereby, determines the output ports 1133-Y (Y is 1 to L) of the optical switch network 1141, from which the cells are output, rewrites values in the headers to predetermined values, and sends them to an electro-opto converter 1360.

Furthermore, for switching control of the optical switch network 1141, the routing table 1350 notifies the optical switch network 1141 of the output ports of the optical cells.

The electro-opto converter 1360 converts the cells from the routing table 1350 into optical cells, and sends the optical cells to the output terminal 1370.

In this way, after converting the optical signals from the input terminal 1310 into the electric signals, respectively, the receiving interface 1300 with the buffers takes out the cells from the transmission frames, and after temporally storing the cells in the buffers, outputs the cells to the output terminal 1370.

On the other hand, as shown in FIG. 19, in the transmitting interface 1301, each of the output ports 1135-Y (Y is 1 to L) of the optical distributing switch network 1150 in FIG. 15 is connected to an input terminal 1311, and the output optical transmission lines 1170-Y (Y is 1 to L) and an output terminal 1351 are connected to each other.

A opto-electro converter 1321 converts optical signals from the input terminal 1311 into electric signals, and sends the electrical signals to a cell inserting circuit 1331.

The cell inserting circuit 1331 receives cells from the opto-electro converter 1321, inserts them into the transmission frames, and sends them to an electro-opto converter 1341.

The electro-opto converter 1341 converts electric signals from the cell inserting circuit 1331 into optical signals, and sends the optical signals to the output terminal 1351.

In this way, the transmitting interface 1301 converts the optical signals from the input terminal 1311 into the electric signals, and thereafter, inserts the cells into the transmission frames, respectively, and outputs the optical signals to the output terminal 1351.

Figure 20:
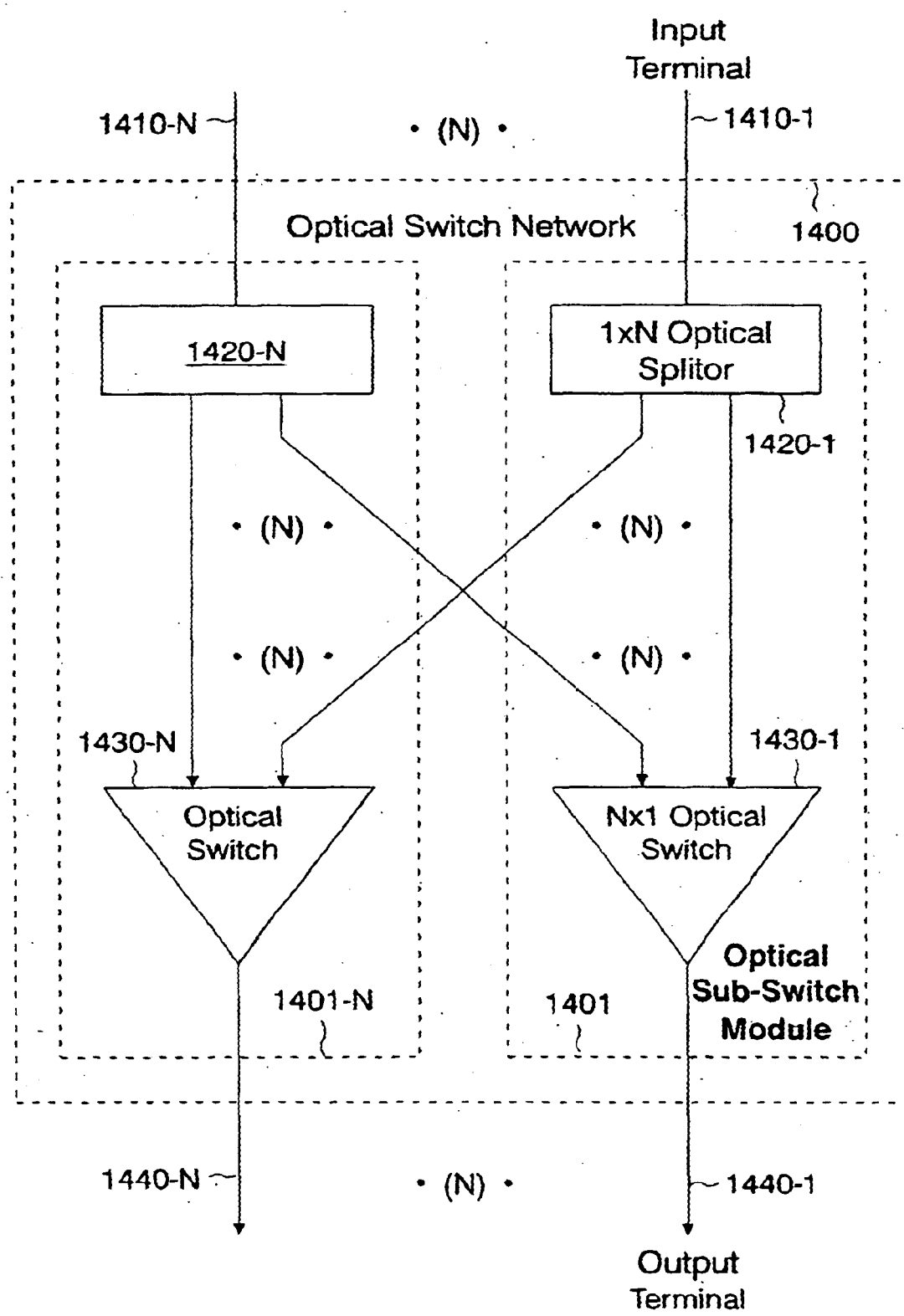
FIG. 20 is a block diagram showing an arrangement of an optical switch network used in the fourth embodiment of the optical communication network node of the present invention.

An optical switch network 1400 shown in FIG. 20, for example, can be applied to the optical switch networks 1140 and 1141 of FIG. 15. Also, the optical switch network 1400 having an arrangement shown in FIG. 20 can be applied to the optical switch network 4130 of the conventional optical communication network node shown in FIG. 30.

In the optical switch network 1400, the input ports 1130-X (X is 1 to M) or 1132-Y (Y is 1 to L) of FIG. 15 correspond to input terminals 1410-1 to 1410-N (wherein N=M·n or N=L), and the output ports 1131-X (X is 1 to M) or 1133-Y (Y is 1 to L) of FIG. 15 correspond to output terminals 1440-1 to 1440-N (wherein N=M·n or N=L), respectively.

Also, the optical switch network 1400 is constructed of N optical sub-switch modules 1401-K (K is 1 to N), each of which is constructed of one 1×N optical splitor 1420 and one N×1 optical switch 1430.

The respective 1×N optical splitor 1420-K (K is 1 to N) drop optical signals from the input terminals 1410-K (K is 1 to N) into N optical signals, and thereafter, drop each of the optical signals into the N×1 optical switches 1430-K (K is 1 to N).

Since switching operation for every cell is required for the optical switch networks 1140 and 1141 of FIG. 15, a small-sized semiconductor optical switch capable of conducting high speed switching is appropriate for the N×1 optical switches 1430-K (K is 1 to N).

Each of the N×1 optical switches 1430-1 to 1430-N selects one of the N optical signals from the 1×N optical splitor 1420-K (K is 1 to N), and outputs the selected signal to the output terminals 1440-1 to 1440-N.

The N×1 optical switches 1430-1 to 1430-N of FIG. 20, in case of switching the optical signals input from the input terminals 1410-1 to 1410-N in a circuit switching manner, are controlled to set predetermined circuits between the input terminals 1410-1 to 1410-N and the output terminals 1440-1 to 1440-N.

Such a set of the circuits is semi-fixedly conducted by a network management system, for example, or realized on demand using a connection control protocol that is started up between the nodes.

Otherwise, the N×1 optical switches 1430-1 to 1430-N, in case of switching the optical signals input from the input terminals 1410-1 to 1410-N cell by cell, switch the optical signals cell by cell by means of switching control signals in accordance with the headers of the cells which are processed by the wavelength-multiplex receiving interfaces 1120-X (X is 1 to M) with the buffers in FIG. 15.

As explained above, by means of the optical switch network 1400 having the arrangement shown in FIG. 20, it is possible to conduct a circuit exchange or a cell exchange of the optical signals, which are input from the arbitrary input terminals 1410-1 to 1410-N, to the arbitrary output terminals 1440-1 to 1440-N·n.

Moreover, it is possible to increase or reduce the optical switch network 1400 of FIG. 20 as a unit of the optical sub-switch modules 1401-K (K is 1 to N), following the increase or reduction of the input terminals 1410 and the output terminals 1440.

For example, if both the wavelength-multiplex input optical transmission lines 1100-X (X is 1 to M) and the wavelength-multiplex output optical transmission lines 1110-X (X is 1 to M) are increase by one, respectively, the optical sub-switch modules 1401 become to be increased by one.

In addition, the optical switch networks 1140 and 1141 of FIG. 15 are not limited to the optical switch network 1400 shown in FIG. 20, and as other examples, an arrangement can be applicable, which is mentioned in a publication "Study of A Wavelength-Division/Space-Division Composite Optical Network" (Nishio and Suzuki, Exchange Society for the Study of the Electronic Information Communication Society, SSE92-148, pp. 31–36, 1992), and a network can be applicable, which is described in FIG. 6 of a publication (Atsushi WATANABE, Satoru OKAMOTO, Ken-ichi SATO, "Optical Path Cross-Connect Node Architecture with High Modularity for Photonic Transport Networks", IEICE TRAS. COMMUN. VOL. E77-B, NO. 10 OCTOBER 1994).

Also, if N=(M·n+L), the optical switch network 1400 of FIG. 20 can be applied to the optical distributing switch network 1150 of FIG. 15.

In addition, since the optical distributing switch network 1150 semi-fixedly couples the optical signals from the optical switch networks 1140 and 1141 to the wavelength-multiplex transmitting interfaces 1121 with the buffers and the transmitting interfaces 1123, the switching operation cell by cell required for the optical switch networks 1140 and 1141 is unnecessary, and although the arrangement thereof is the same as FIG. 20, a cheap and small-sized mechanical switch can be applicable for the N×1 optical switches 1430 to be used in the arrangement.

As explained above, in the optical communication network node of the fourth embodiment of the present invention, of which arrangement is shown in FIG. 15, cells which are multiplied by the optical signals having arbitrary wavelengths transmitted in the arbitrary wavelength-multiplex input optical transmission lines 1100-X (X is 1 to M) can be dropped into the arbitrary output optical transmission lines 1170-Y (Y is 1 to L).

Also, in accordance with the fourth embodiment of the present invention, the cells from the arbitrary input optical transmission lines 1160-Y (Y is 1 to L) are converted into optical signals having arbitrary wavelengths and the optical signals can be inserted into the wavelength-multiplex output optical transmission lines 1110-X (X is 1 to M).

Moreover, in the optical communication network node of the fourth embodiment of the present invention, by converting the optical signals having arbitrary wavelengths of the arbitrary wavelength-multiplex input optical transmission lines 1100-X (X is 1 to M) into optical signals having arbitrary wavelengths of the arbitrary wavelength-multiplex output optical transmission lines 1110-X (X is 1 to M), the pass of the optical signals between the wavelength-multiplex input and output optical transmission lines can be realized, and folded connection between the arbitrary input optical transmission lines 1160-Y (Y is 1 to L) and the arbitrary output optical transmission lines 1170-Y (Y is 1 to L) can be made.

In case that the optical communication network node of the fourth embodiment of the present invention is analyzed by a space dividing equivalent circuit, it is possible to reduce cross points necessary for the optical switch network, compared with the prior art.

This is because while in the conventional arrangement, one optical switch network which is used therein realizes each connecting function for the drop and insertion of a signal and the pass and fold of a signal, the optical switch networks are divided for each connecting function in the optical communication network node of the fourth embodiment of the present invention.

Figure 30:
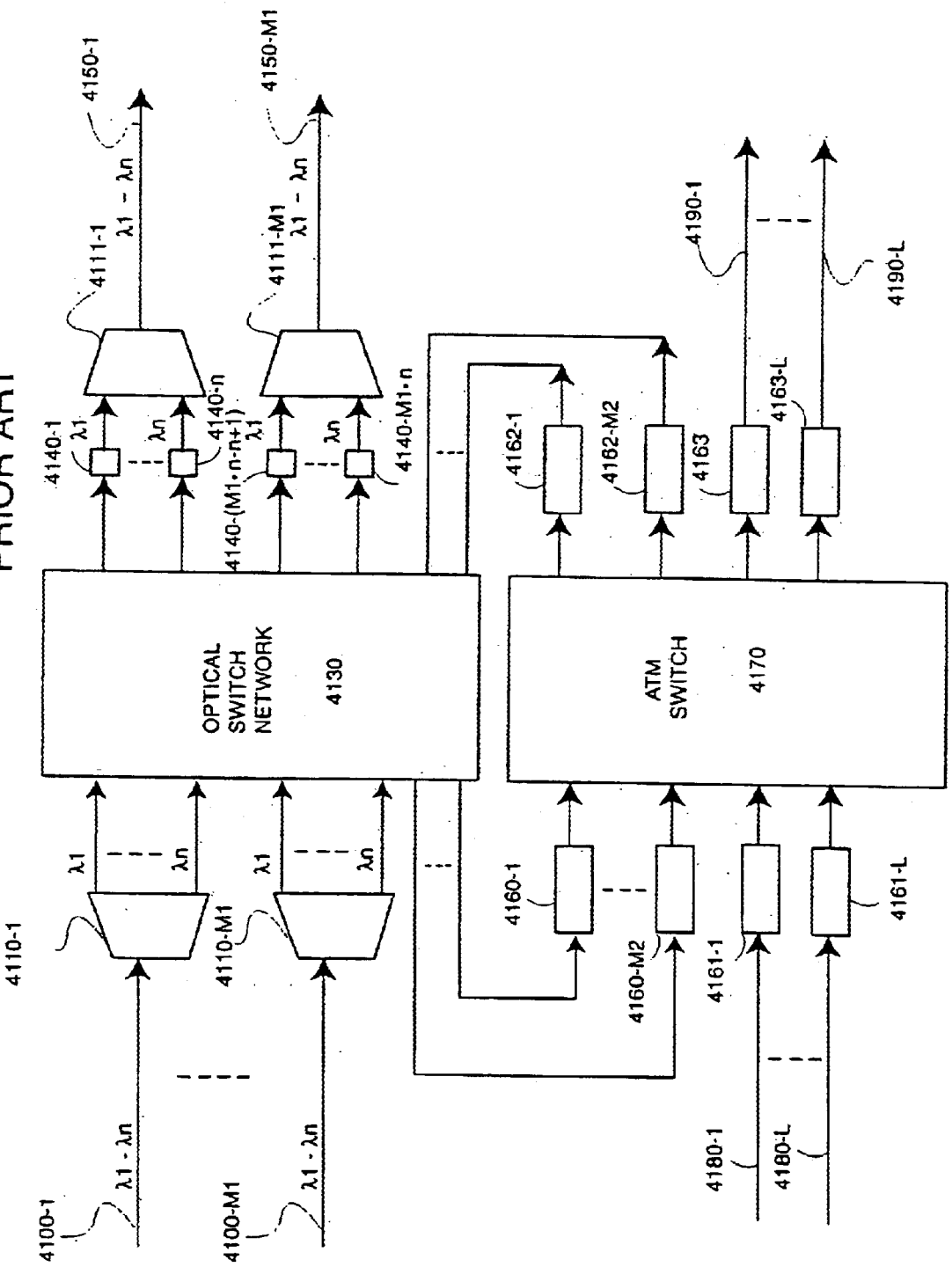
FIG. 30 is a block diagram showing an arrangement of a conventional optical communication network node.

For example, in case of M=8, n=8 and L=64, in the conventional arrangement of FIG. 30, a space dividing equivalent circuit of the optical switch network 4130 always needs cross points of (M·n+L)2=1282=16384

On the contrary, in the optical communication network node of the fourth embodiment of the present invention, since the optical switch network 1140 is used for pass and drop connections and the optical switch network 1141 is used for inserting and folded connections, the number of cross points necessary for each of the optical switch networks is (M·n)2=4096, L2=4096, and the total required number of the cross points is 8192, which can be reduced to the half of the prior art.

Therefore, the optical communication network node of the fourth embodiment of the present invention reduces the number of the cross points unnecessary for the optical switch networks under the comparison in the space dividing equivalent circuit, and as a result, the hardware corresponding to the unnecessary cross points can be reduced and it is possible to realize a small-sized node.

Next, a fifth embodiment of the optical communication network node of the present invention will be explained.

Figure 21:
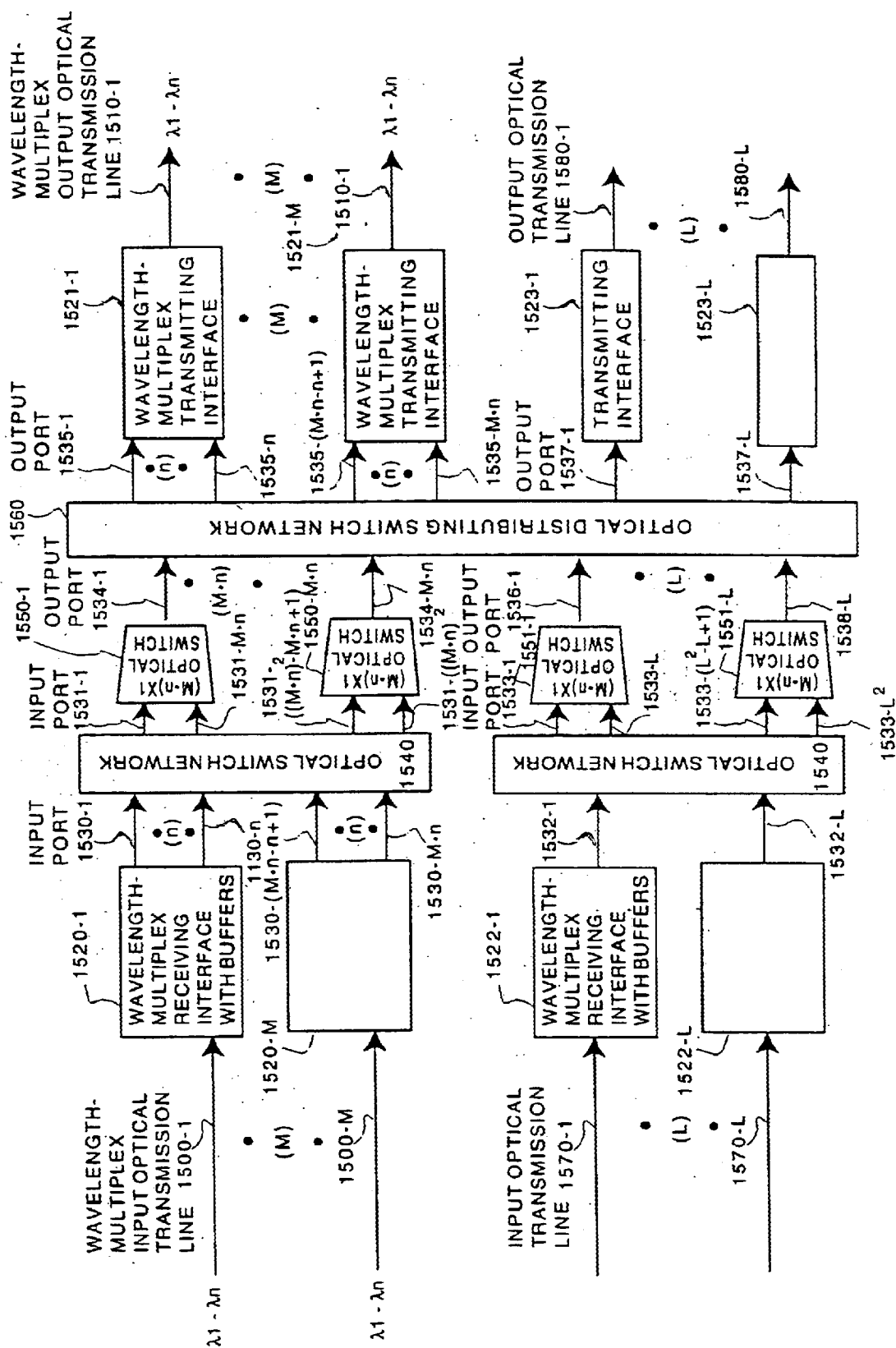
FIG. 21 is a block diagram showing an arrangement of the fifth embodiment of the optical communication network node of the present invention.

FIG. 21 is a block diagram showing an arrangement of the fifth embodiment.

The arrangement of the fifth embodiment will be explained by referring to FIG. 21. In FIG. 21, a plurality of wavelength-multiplex receiving interfaces 1520-X (X is 1 to M) with buffers have one input end and a plurality of output ends, respectively, and a plurality of input optical transmission lines 1500-X (X is 1 to M) to which wavelength-multiplex optical signals are input are respectively connected to the one end of each of the plurality of wavelength-multiplex receiving interfaces 1520-X (X is 1 to M) with buffers.

The plurality of wavelength-multiplex receiving interfaces 1520-X (X is 1 to M) with the buffers, after separating wavelength-multiplex optical signals input through each of a plurality of input optical transmission lines 1500-X (X is 1 to M) into a plurality of optical signals having different wavelengths, output these plurality of optical signals as it is from each of the plurality of output ends, or convert the plurality of optical signals into electric signals, temporarily store ATM cells in the buffers, which are taken out from transmission frames, and after processing headers of the ATM cells output from the buffers, convert the electric signals into optical signals and output the optical signals from each of the plurality of output ends.

The respective output ends of the wavelength-multiplex receiving interfaces 1520-X (X is 1 to M) with the buffers are connected to input ends of optical selective switch network 1540 through input ports 1530-(X·n-n+1) to 1530-X·n (X is 1 to M) of the optical selective switch network 1540.

The optical selective switch network 1540 has a plurality of input ends and a plurality of output ends, and selectively drops optical signals from the plurality of input ends into the predetermined one or more than one output ends.

The output ends of the optical selective switch network 1540 are connected to input ends of the optical switches 1550-P (P is 1 to M) to 1550-M·n through input ports 1531-(P·M·n-M·n+1) to 1531-P·M·n (P is 1 to M·n) of the optical switches 1550-P (P is 1 to M) to 1550-M·n.

The output ends of the optical switches 1550-P (P is 1 to M) to 1550-M·n are connected to input ends of an optical distributing switch network 1560 through output ports 1534-P (P is 1 to M·n) of the optical switches 1550-P (P is 1 to M) to 1550-M·n.

The optical switches 1550-P (P is 1 to M) to 1550-M·n have a plurality of input ends and one output end, respectively, and set predetermined optical circuits between the plurality of predetermined input ends and one output end, or exchange the optical signals cell by cell under control by the plurality of wavelength-multiplex receiving interfaces 1520-X (X is 1 to M) with the buffers.

Also, the plurality of receiving interfaces 1522-Y (Y is 1 to L) with the buffers have one input end and one output end, respectively, and each input optical transmission lines 1570-Y (Y is 1 to L) is connected to the input end.

The plurality of receiving interfaces 1522-Y (Y is 1 to L) with the buffers convert optical signals input through the respective of input optical transmission lines 1570-Y (Y is 1 to L) into electric signals, temporarily store ATM cells in the buffers, which are taken out from transmission frames, and after processing headers of the ATM cells output from the buffers, convert the electric signals into optical signals and output the optical signals from the output end.

The respective output ends of the receiving interfaces 1522-Y (Y is 1 to L) with the buffers are connected to input ends of optical selective switch network 1541 through input ports 1532-Y (Y is 1 to L) of the optical selective switch network 1541.

Like the optical selective switch network 1540, the optical selective switch network 1541 has a plurality of input ends and a plurality of output ends, and selectively drops optical signals from the plurality of input ends into the predetermined one or more than one output ends.

The output ends of the optical selective switch network 1541 are connected to input ends of the optical switches 1551-Y (Y is 1 to L) through input ports 1533-Y (Y is 1 to L) of the optical switches 1551-Y (Y is 1 to L).

Output ports 1536-Y (Y is 1 to L) of the optical switches 1551-Y (P is 1 to L) are connected to input ends of the optical distributing switch network 1560.

The optical distributing switch network 1560 has a plurality of input ends and a plurality of output ends, and switches optical signals from the plurality of input ends to the predetermined output ends.

Output ports 1535-1 to 1535-M·n of the above-described optical distributing switch network 1560 are connected to input ends of wavelength-multiplex transmitting interfaces 1521-1 to 1521-M.

The wavelength-multiplex transmitting interfaces 1521-1 to 1521-M have a plurality of input ends and one output end, respectively, and each of wavelength-multiplex output optical transmission lines 1510-X (X is 1 to M) is connected to the output end.

The wavelength-multiplex transmitting interfaces 1521-1 to 1521-M convert each of optical signals on optical circuits, which are input from the plurality of input ends, into optical signals having predetermined wavelengths as it is, or after storing ATM cells in transmission frames, which are taken out by converting each of the optical signals from the plurality of input ends into electric signals, convert the electric signals into optical signals having the predetermined wavelengths, combine the plurality of converted optical signals having the predetermined wavelengths, and output wavelength-multiplex optical signals from the one output end.

Furthermore, the above-described optical distributing switch network 1560 is connected to input ends of transmitting interfaces 1523-Y (Y is 1 to L) through output ports 1537-Y (Y is 1 to L).

Output ends of the transmitting interfaces 1523-Y (Y is 1 to L) are connected to output transmission lines 1580-Y (Y is 1 to L).

The transmitting interfaces 1523-Y (Y is 1 to L) have one input end and one output end, respectively, and after storing ATM cells in transmission frames, which are taken out by converting each of optical signals input from the input end into electric signals, convert the electric signals into optical signals, and transmit the optical signals to output transmission lines 1580-Y (Y is 1 to L) from the output end.

In the fifth embodiment, by means of the optical selective switch network 1540 and the M·n×1 optical switches 1550-P (P is 1 to M·n) or the optical selective switch network 1541 and the L×1 optical switches 1551-Y (Y is 1 to L), an optical switch network for the pass and drop connection and an optical switch network for the insertion and folded connection are realized, respectively, and thereby, the number of cross points is reduced, and also, since the optical selective switch networks 1540 and 1541 drop the optical signals only into the predetermined M·n×1 optical switches 1550-P (P is 1 to M·n) and the L×1 optical switches 1551-Y (Y is 1 to L), respectively, it becomes to be possible to reduce an unnecessary optical drop.

Next, operation of this fifth embodiment will be explained. When explaining the operation of the fifth embodiment also, in the explanation hereinafter, as a matter of convenience, it is referred to a drop of a signal that a signal from an optical communication network constructed of nodes is sent to other local networks and area networks contained in a node of its own. To the contrary, it is referred to an insert of a signal that a signal from these local networks and area networks is sent to an optical communication network. Moreover, it is referred to a pass of a signal that an optical signal from an adjacent node in an optical communication network is transferred to other nodes.

The wavelength-multiplex optical signals created by being multiplied by optical signals having n different wavelengths (λ1 to λn) are sent to the wavelength-multiplex receiving interfaces 1520-X (X is 1 to M) with the buffers by the wavelength-multiplex input optical transmission lines 1500-X (X is 1 to M), respectively.

Each of the wavelength-multiplex receiving interfaces 1520-X (X is 1 to M) with the buffers is connected to the optical selective switch network 1540 by each of the number n of the input ports 1530-(X·n-n+1) to 1530-X·n (X is 1 to M).

The respective wavelength-multiplex receiving interfaces 1520-X (X is 1 to M) with the buffers, after separating the input wavelength-multiplex optical signals into optical signals having n different wavelengths, send these n optical signals to the optical selective switch network 1540 from the input ports 1530-(X·n-n+1) to 1530-X·n (X is 1 to M).

Otherwise, the respective wavelength-multiplex receiving interfaces 1520-X (X is 1 to M) with the buffers, after separating the input wavelength-multiplex optical signals into optical signals having n different wavelengths, take out ATM cells from transmission frames every n optical signals, also send optical cells to the optical selective switch network 1540 from the input ports 1530-(X·n-n+1) to 1530-X·n (X is 1 to M) by way of the buffers.

On the other hand, the respective receiving interfaces 1522-Y (Y is 1 to L) with the buffers receive optical signals from the input optical transmission lines 1570-Y (Y is 1 to L) into electric signals, take out ATM cells from transmission frames, store the ATM cells in the buffers, and thereafter, send optical cells to the optical selective switch network 1541 through the input ports 1532-Y (Y is 1 to L).

The optical selective switch networks 1540 and 1541 drop the input optical signals only into the predetermined (M·n)×1 optical switches 1550-P (P is 1 to M·n) of the (M·n) optical switches or only into the predetermined L×1 optical switches 1551-Y (Y is 1 to L) of L optical switches.

The (M·n)×1 optical switches 1550-P (P is 1 to M·n) switch one of the optical signals input from the input ports 1531-(P·M·n-M·n+1) to 1531-P·M·n (P is 1 to M·n), which have not passed through the buffers within the wavelength-multiplex receiving interfaces 1520-X (X is 1 to M) with the buffers, to the output ports 1534-P (P is 1 to M·n) in a circuit exchange manner.

Also, the (M·n)×1 optical switches 1550-P (P is 1 to M·n) switch optical cells cell by cell, which are input from the input ports 1531-(P·M·n-M·n+1) to 1531-P M·n (P is 1 to M·n) by way of the buffers within the wavelength-multiplex receiving interfaces 1520-X (X is 1 to M) with the buffers, to the output ports 1534-P (P is 1 to M·n) in accordance with switching control signals notified by control lines (not shown) from the wavelength-multiplex receiving interfaces 1520-X (X is 1 to M).

On the other hand, the L×1 optical switches 1551-Y (Y is 1 to L) switch optical cells cell by cell, which are input from the input ports 1533-(Y·L-L+1) to 1533-Y·L (Y is 1 to L) by way of the buffers within the receiving interfaces 1522-Y (Y is 1 to L) with the buffers, to the output ports 1536-Y (Y is 1 to L) in accordance with switching control signals notified by control lines (not shown) from the receiving interfaces 1522-Y (Y is 1 to L).

The optical distributing switch network 1560 switches the optical signals from the output ports 1534-P (P is 1 to M·n) of the (M·n)×1 optical switches 1550-P (P is 1 to M·n) and the optical signals from output ports 1536-Y (Y is 1 to L) of the L×1 optical switches 1551-Y (Y is 1 to L) to the output ports 1535-1 to 1535-M·n and the output ports 1537-1 to 1537-L.

The respective wavelength-multiplex transmitting interfaces 1521-X (X is 1 to M) are connected to the optical distributing switch network 1560 by each of the number n of the output ports 1535-(X·n-n+1) to 1535-X·n.

When receiving the optical signals switched in a circuit switching manner by the (M·n)×1 optical switches 1550-P (P is 1 to M·n) by way of the output ports 1535-(X·n-n+1) to 1535-X·n, the respective wavelength-multiplex transmitting interfaces 1521-X (X is 1 to M), after converting these signals into optical signals having n wavelengths, combine them and send created wavelength-multiplex optical signals to the wavelength-multiplex output optical transmission lines 1510-X (X is 1 to M).

Also, when receiving the optical cells switched cell by cell by means of the (M·n)×1 optical switches 1550-P (P is 1 to M·n) and the L×1 optical switches 1551-Y (Y is 1 to L) by way of the output ports 1535-(X·n-n+1) to 1535-X·n, the respective wavelength-multiplex transmitting interfaces 1521-X (X is 1 to M), after inserting these cells into the transmission frames every n cells and converting the cells into optical signals having n wavelengths, combine them and send created wavelength-multiplex optical signals to the wavelength-multiplex output optical transmission lines 1510-X (X is 1 to M).

The respective transmitting interfaces 1523-Y (Y is 1 to L) are connected to the optical distributing switch network 1560 through the output ports 1537-Y (Y is 1 to L). When receiving the optical cells switched cell by cell by means of the (M·n)×1 optical switches 1550-P (P is 1 to M·n) and the L×1 optical switches 1551-Y (Y is 1 to L) by way of the output ports 1537-Y (Y is 1 to L), the respective transmitting interfaces 1523-Y (Y is 1 to L), after inserting the cells into the transmission frames, convert the cells into optical signals, and send the optical signals to the output optical transmission lines 1580-Y (Y is 1 to L).

Next, a detailed arrangement of each section of the fifth embodiment of the present invention of FIG. 21 will be explained.

The wavelength-multiplex receiving interface 1200 with the buffers shown in FIG. 16 and the wavelength-multiplex transmitting interface 1201 shown in FIG. 17 can be applied to the wavelength-multiplex receiving interfaces 1520 with the buffers and the wavelength-multiplex transmitting interfaces 1521 of FIG. 21.

Also, the receiving interface 1300 with the buffers shown in FIG. 18 and the transmitting interface 1301 shown in FIG. 19 can be applied to the receiving interfaces 1522 with the buffers and the transmitting interfaces 1523 of FIG. 21.

Figure 22:
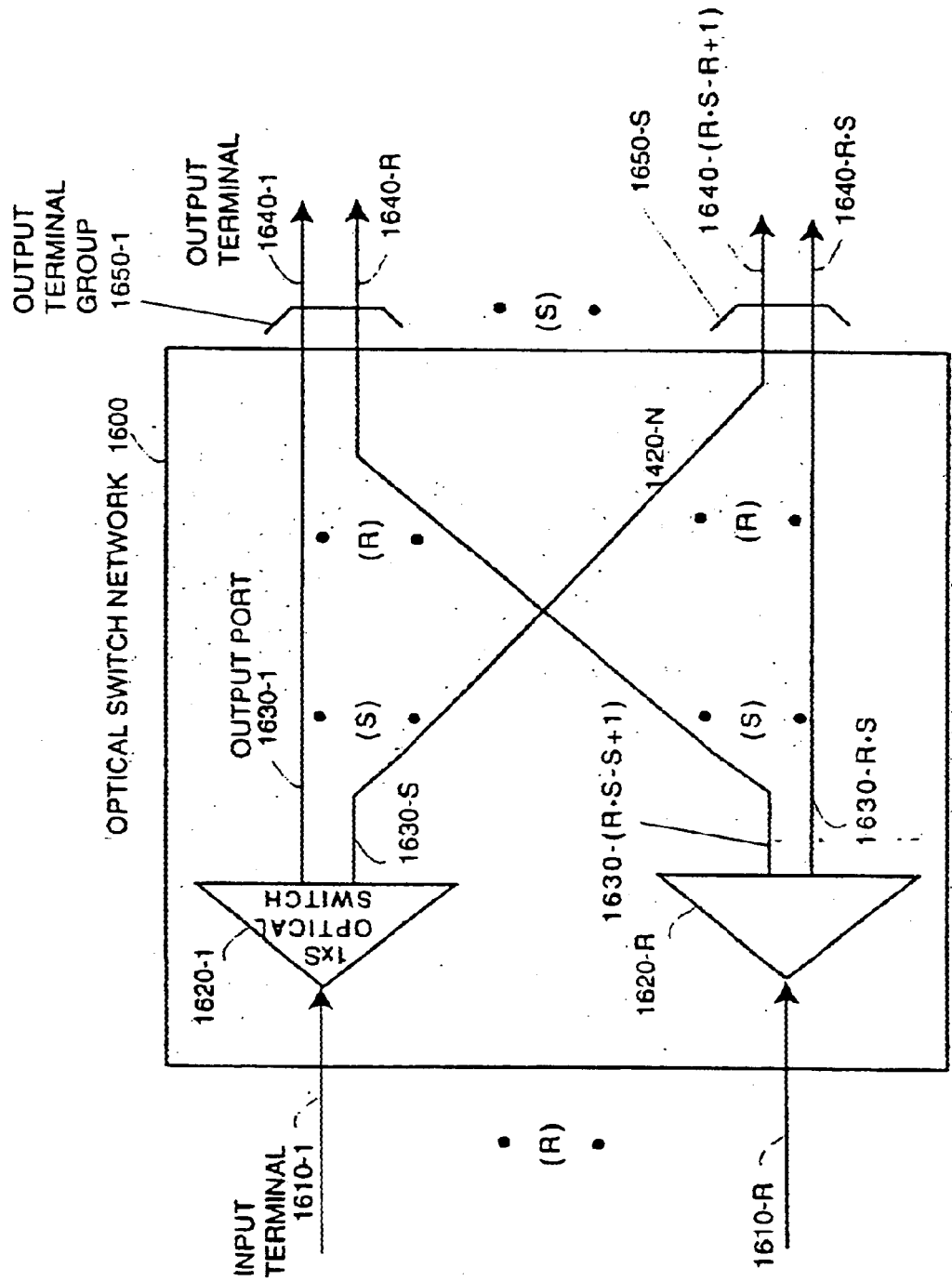
FIG. 22 is a block diagram showing an arrangement of an optical selective switch network used in the fifth embodiment of the optical communication network node of the present invention.

The same arrangement as the optical distributing switch network 1150 of FIG. 15 can be applied to the optical distributing switch network 1560 of FIG. 21. Furthermore, an optical selective switch network 1600 having R input terminals and R·S output terminals of FIG. 22 can be applied to each of the optical selective switch networks 1540 and 1541.

However, in case that the optical selective switch network 1600 can be applied to the optical selective switch network 1540, R=M·n, S=M·n, and the output terminals of the wavelength-multiplex receiving interfaces 1520-X (X is 1 to M) with the buffers are connected to the input terminals 1610-1 to 1610-R by each of the number n of the output ports of the wavelength-multiplex receiving interfaces 1520-X (X is 1 to M), and the M·n input ports 1531-(P·M·n-M·n+1) to 1531-P·M·n (P is 1 to M·n) of the (M·n)×1 optical switches 1550-P (P is 1 to M·n) are connected to output terminal groups 1650-W (W is 1 to S) which are constructed of R output terminals.

On the other hand, in case that the optical selective switch network 1600 can be applied to the optical selective switch network 1541, R=L, S=L, and the output terminals of the receiving interfaces 1522-Y (Y is 1 to L) with the buffers are connected to the input terminals 1610-1 to 1610-R, and the L input ports 1533(Y·L-L+1) to 1533-Y·L (Y is 1 to L) of the L×1 optical switches 1551-Y (Y is 1 to L) are connected to the output terminal groups 1650-W (W is 1 to S) which is constructed of R output terminals.

Each of 1×S optical switches 1620-V (V is 1 to R) drops the optical signals from the input terminals 1610-V (V is 1 to R) only into a predetermined output port of the S output ports 1630-(V·S-S+1) to 1630-V·S (V is 1 to R). Since each of the S output ports 1630-(V·S-S+1) to 1630-V·S (V is 1 to R) of the 1×S optical switches 1620-V (V is 1 to R) is connected to the S output terminal groups 1650-W (W is 1 to S), each of the output terminal groups 1650-W (W is 1 to S) is constructed of every R of the output terminals 1650-1 to 1650-R·S.

Therefore, the 1×S optical switches 1620-V (V is 1 to R) selectively drop the optical signals from the input terminals 1610-V (V is 1 to R) into an arbitrary output terminal group of the S output terminal groups 1650-W (W is 1 to S) one by one, and can output the signals from the output terminals 1650-1 to 1650-R·S.

Like the optical distributing switch network 1560, since the optical selective switch networks 1540 and 1541 semi-fixedly couple the optical signals from the wavelength-multiplex receiving interfaces 1520-X (X is 1 to M) with the buffers or the receiving interfaces 1522-Y (Y is 1 to L) with the buffers to the (M·n)×1 optical switches 1550-P (P is 1 to M·n) or the L×1 optical switches 1551-Y (Y is 1 to L), the switching operation cell by cell is not necessary for the optical selective switch networks 1540 and 1541, and a cheap and small-sized mechanical switch can be used for the 1×S optical switches 1620-V (V is 1 to R).

Next, operation of the fifth embodiment shown in FIG. 21 will be explained using FIG. 23 and FIG. 24.

Figure 23:
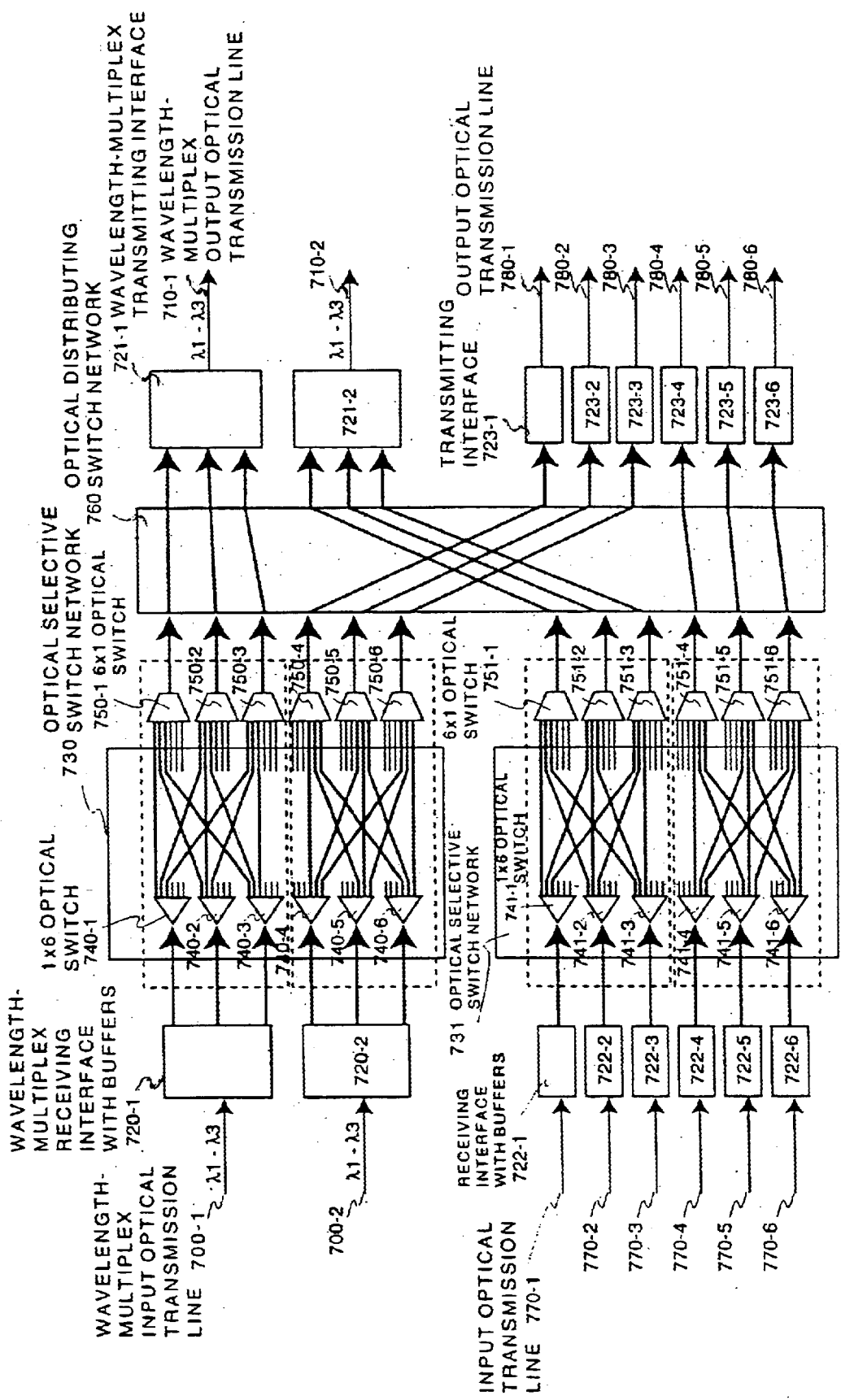
FIG. 23 is a block diagram for explaining one example of operation of the fifth embodiment of the optical communication network node of the present invention.
Figure 24:
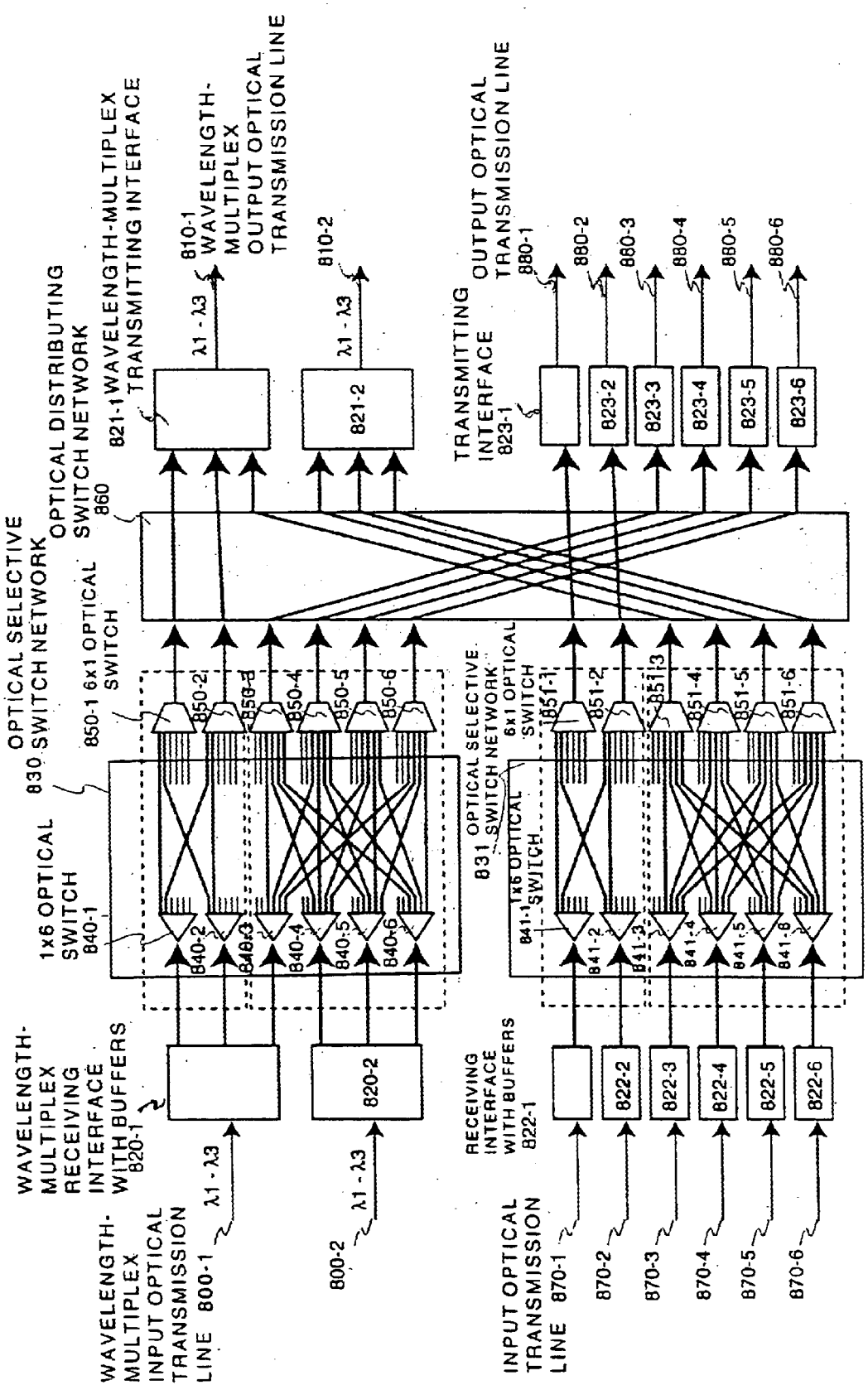
FIG. 24 is a block diagram for explaining another operation of the fifth embodiment of the optical communication network node of the present invention.

As a matter of convenience, in FIG. 23 and FIG. 24, an arrangement is shown in which with regard to M, n and L of FIG. 21, M=2, N=3 and L=6.

In FIG. 23, wavelength-multiplex optical signals having wavelengths λ1 to λ3, which are input from a wavelength-multiplex input optical transmission line 1700-1, are separated by a wavelength-multiplex receiving interface 1720-1 with a buffer, and the separated signal is input to 1×6 optical switches 1740-1 to 1740-3 without passing the buffer.

A 3×3 optical switch network is equivalently constructed of the 1×6 optical switches 1740-1 to 1740-3 and 6×1 optical switches 1750-1 to 1750-3, and optical signals which have been input to this network are separated into three by the 1×6 optical switches 1740-1 to 1740-3, each separated signal is exchanged in a circuit switching manner by the 6×1 optical switches 1750-1 to 1750-3 and sent to optical distributing switch network 1760.

Wavelength-multiplex optical signals having wavelengths λ1 to λ3, which are input from a wavelength-multiplex input optical transmission line 1700-2, are separated by a wavelength-multiplex receiving interface 1720-2 with a buffer, and the separated signal is input to 1×6 optical switches 1740-4 to 1740-6 by way of the buffer.

Similarly, a 3×3 optical switch network is equivalently constructed of the 1×6 optical switches 1740-4 to 1740-6 and 6×1 optical switches 1750-4 to 1750-6, and optical signals which have been input to this network are separated into three by the 1×6 optical switches 1740-4 to 1740-6, each separated signal is exchanged cell by cell by means of the 6×1 optical switches 1750-4 to 1750-6 and sent to the optical distributing switch network 1760.

Optical signals from input optical transmission lines 1770-1 to 1770-3 are input to 1×6 optical switches 1741-1 to 1741-3 by way of buffers of receiving interfaces 1722-1 to 1722-3 with buffers.

A 3×3 optical switch network is also equivalently constructed of the 1×6 optical switches 1741-1 to 1741-3 and 6×1 optical switches 1751-1 to 1751-3, and optical signals which have been input to this network are separated into three by the 1×6 optical switches 1741-1 to 1741-3, each separated signal is exchanged cell by cell by means of the 6×1 optical switches 1751-1 to 1751-3 and sent to the optical distributing switch network 1760.

Optical signals from input optical transmission lines 1770-4 to 1770-6 are input to 1×6 optical switches 1741-4 to 1741-6 by way of buffers of receiving interfaces 1722-4 to 1722-6 with buffers.

A 3×3 optical switch network is also equivalently constructed of the 1×6 optical switches 1741-4 to 1741-6 and 6×1 optical switches 1751-4 to 1751-6, and optical signals which have been input to this network are separated into three by the 1×6 optical switches 1741-4 to 1741-6, each separated signal is exchanged cell by cell by means of the 6×1 optical switches 1751-4 to 1751-6 and sent to the optical distributing switch network 1760.

The optical distributing switch network 1760 switches the optical signals from the 6×1 optical switches 1750-1 to 1750-3 to a wavelength-multiplex transmitting interface 1721-1, the optical signals from the 6×1 optical switches 1750-4 to 1750-6 to transmitting interfaces 1723-1 to 1723-3, the optical signals from the 6×1 optical switches 1751-1 to 1751-3 to a wavelength-multiplex transmitting interface 1721-2, and the optical signals from the 6×1 optical switches 1751-4 to 1751-6 to transmitting interfaces 1723-4 to 1723-6, respectively.

As explained above, the optical communication network node of this fifth embodiment shown in FIG. 23 makes the optical signals having wavelengths λ1 to λ3 on the wavelength-multiplex input optical transmission line 1700-1 pass to the wavelength-multiplex input optical transmission line 1710-1, and can drop cells which are carried by the optical signals having wavelengths λ1 to λ3 on the wavelength-multiplex input optical transmission line 1700-2 into the output optical transmission lines 1780-1 to 1780-3.

Also, in the embodiment of FIG. 23, the optical communication network node inserts cells which are carried by the optical signals from the input optical transmission lines 1770-1 to 1770-3 into the wavelength-multiplex output optical transmission line 1710-2, and can make a folded connection of cells which are carried by the optical signals from the input optical transmission lines 1770-4 to 1770-6 to the output optical transmission lines 1780-4 to 1780-6.

Next, a change of the arrangement in case that a ratio of the traffics to be passed, be dropped, be inserted or be connected and folded in the arrangement of FIG. 23, will be explained by FIG. 24.

The wavelength-multiplex optical signals having wavelengths λ1 to λ3 from a wavelength-multiplex input optical transmission line 1800-1 is separated by a wavelength-multiplex receiving interface 1820-1 with a buffer, and a signal corresponding to two wavelengths of the separated signal is input to 1×6 optical switches 1840-1 to 1840-2 without passing through the buffer.

Then, a 2×2 optical switch network is equivalently constructed of the 1×6 optical switches 1840-1 to 1840-2 and 6×1 optical switches 1850-1 to 1850-2, and optical signals which have been input to this network are separated into two by the 1×6 optical switches 1840-1 to 1840-2, each separated signal is exchanged in a circuit switching manner by means of the 6×1 optical switches 1850-1 to 1850-2 and sent to the optical distributing switch network 1860.

The wavelength-multiplex optical signals having wavelengths λ1 to λ3 from a wavelength-multiplex input optical transmission line 1800-2 is separated by a wavelength-multiplex receiving interface 1820-2 with a buffer, and separated signals and a signal corresponding to one wavelength remaining on the previous wavelength-multiplex input optical transmission line 1800-1 are input to the 1×6 optical switches 1840-3 to 1840-6 by way of the buffer.

This time, a 4×4 optical switch network is equivalently constructed of the 1×6 optical switches 1840-3 to 1840-6 and 6×1 optical switches 1850-3 to 1850-6, and optical signals which have been input to this network are separated into four by the 1×6 optical switches 1840-3 to 1840-6, each separated signal is exchanged cell by cell by means of the 6×1 optical switches 1850-3 to 1850-6, and is sent to the optical distributing switch network 1860.

Also, the optical signals from input optical transmission lines 1870-1 to 1870-2 are input to the 1×6 optical switches 1841-1 to 1841-2 by way of buffers of receiving interfaces 1822-1 to 1822-2 with buffers.

A 2×2 optical switch network is equivalently constructed of the 1×6 optical switches 1841-1 to 1841-2 and 6×1 optical switches 1851-1 to 1851-2, and optical signals which have been input to this network are separated into two by the 1×6 optical switches 1841-1 to 1841-2, each separated signal is exchanged cell by cell by means of the 6×1 optical switches 1851-1 to 1851-2, and is sent to the optical distributing switch network 1860.

Furthermore, the optical signals from input optical transmission lines 1870-3 to 1870-6 are input to the 1×6 optical switches 1841-3 to 1841-6 by way of buffers of receiving interfaces 1822-3 to 1822-6 with buffers.

A 4×4 optical switch network is also equivalently constructed of the 1×6 optical switches 1841-3 to 1841-6 and 6×1 optical switches 1851-3 to 1851-6, and optical signals which have been input to this network are separated into four by the 1×6 optical switches 1841-3 to 1841-6, each separated signal is exchanged cell by cell by means of the 6×1 optical switches 1851-3 to 1851-6, and is sent to the optical distributing switch network 1860.

The optical distributing switch network 1860 switches the optical signals from the 6×1 optical switches 1850-1 to 1850-2 and the 6×1 optical switches 1851-3 to a wavelength-multiplex transmitting interface 1821-1, the optical signals from the 6×1 optical switches 1850-3 to 1850-6 to transmitting interfaces 1823-3 to 1823-6, the optical signals from the 6×1 optical switches 1851-1 to 1851-2 to transmitting interfaces 1823-1 to 1823-2, and the optical signals from the 6×1 optical switches 1851-4 to 1851-6 to a wavelength-multiplex transmitting interface 1821-2, respectively.

As explained above, in the example of FIG. 24, the optical communication network node makes the optical signals having two wavelengths of the wavelengths λ1 to λ3 on the wavelength-multiplex input optical transmission line 1800-1 pass to the wavelength-multiplex input optical transmission line 1810-1, and can drop cells which are carried by the optical signals having the remaining one wavelength on the wavelength-multiplex input optical transmission line 1800-1 and three wavelengths of the wavelengths λ1 to λ3 on the wavelength-multiplex input optical transmission line 1800-2 into the output optical transmission lines 1880-3 to 1880-6.

Also, in the embodiment of FIG. 24, the optical communication network node folds cells which are carried by the optical signals from the input optical transmission lines 1870-1 to 1870-2 to the output optical transmission lines 1880-1 to 1880-2, inserts cells which are carried by the optical signals from the input optical transmission line 1870-3 into the wavelength-multiplex output optical transmission line 1810-1, and can insert cells which are carried by the optical signals from the input optical transmission lines 1870-4 to 1870-6 into the output optical transmission lines.

Then, in case that the optical communication network node of the fifth embodiment is analyzed by a space dividing equivalent circuit, it is possible to reduce cross points necessary for the optical switch network, compared with the prior art.

This is because while in the conventional arrangement, one optical switch network which is used therein realizes each connecting function for the drop and insertion of a signal and the pass and fold of a signal, a non-block optical switch network corresponding to each connecting function can be constructed by the optical selective switch networks 1540 and 1541, the (M·n)×1 optical switches 1550 and the L×1 optical switches 1551 in the optical communication network node of the fifth embodiment. Like the example shown before, in case of M=8, n=8 and L=64, in the arrangement of FIG. 9, a space dividing equivalent circuit of the optical switch network 4130 always needs cross points of (M·n+L)2=1282=16384

On the contrary, in the optical communication network node of the fifth embodiment, since the (M·n)×1 optical switches 1550 are used for pass and drop connections and the L×1 optical switches 1551 are used for inserting and folded connections, the number of cross points necessary for each of the (M·n)×1 optical switches 1550 and the L×1 optical switches 1551 is (M·n)2=4096, L2=4096, and the total required number of the cross points is 8192, which can be reduced to the half of the prior art.

However, the reason why the number of the cross points for the optical selective switch networks 1540 and 1541 is not summed up is that since high-speed switching operation cell by cell is not required for optical switches used for these optical selective switch networks, and since electric driving circuits for the optical switches are also realized by simple circuits, a small-sized and cheap optical switch can be applied, compared with the (M·n)×1 optical switches 1550 and the L×1 optical switches 1551.

Furthermore, compared with the optical communication network node of the above-described fourth embodiment, characteristic of the optical communication network node of this fifth embodiment will be mentioned.

For example, the case will be focused in which a drop traffic is handled in the optical communication network node of the fourth embodiment of the present invention of FIG. 15.

In the optical switch network 1140, if the drop traffic is switched between arbitrary a input ports of the M·n input ports 1130 and arbitrary a output ports of the M·n output ports 1131, each of a optical signals input to the optical switch network 1140 is dropped into M·n independent of the number a of the output ports to which the optical signals are switched, and accordingly, quantity of light is lowered.

On the contrary, in the optical communication network node of the fifth embodiment shown in FIG. 21, if the same switching is assumed, the 1×S optical switch 1620 within the optical selective network 1540 selectively drops the input a optical signals only into the predetermined a output ports, quantity of light is not lowered more than necessary.

Therefore, in the optical communication network node of the fifth embodiment, it is possible to reduce a light loss in the non-block optical switch network corresponding to each of the connecting function that is constructed by the optical selective switch networks 1540 and 1541, the (M·n)×1 optical switches 1550 and the L×1 optical switches 1551.

Figure 25:
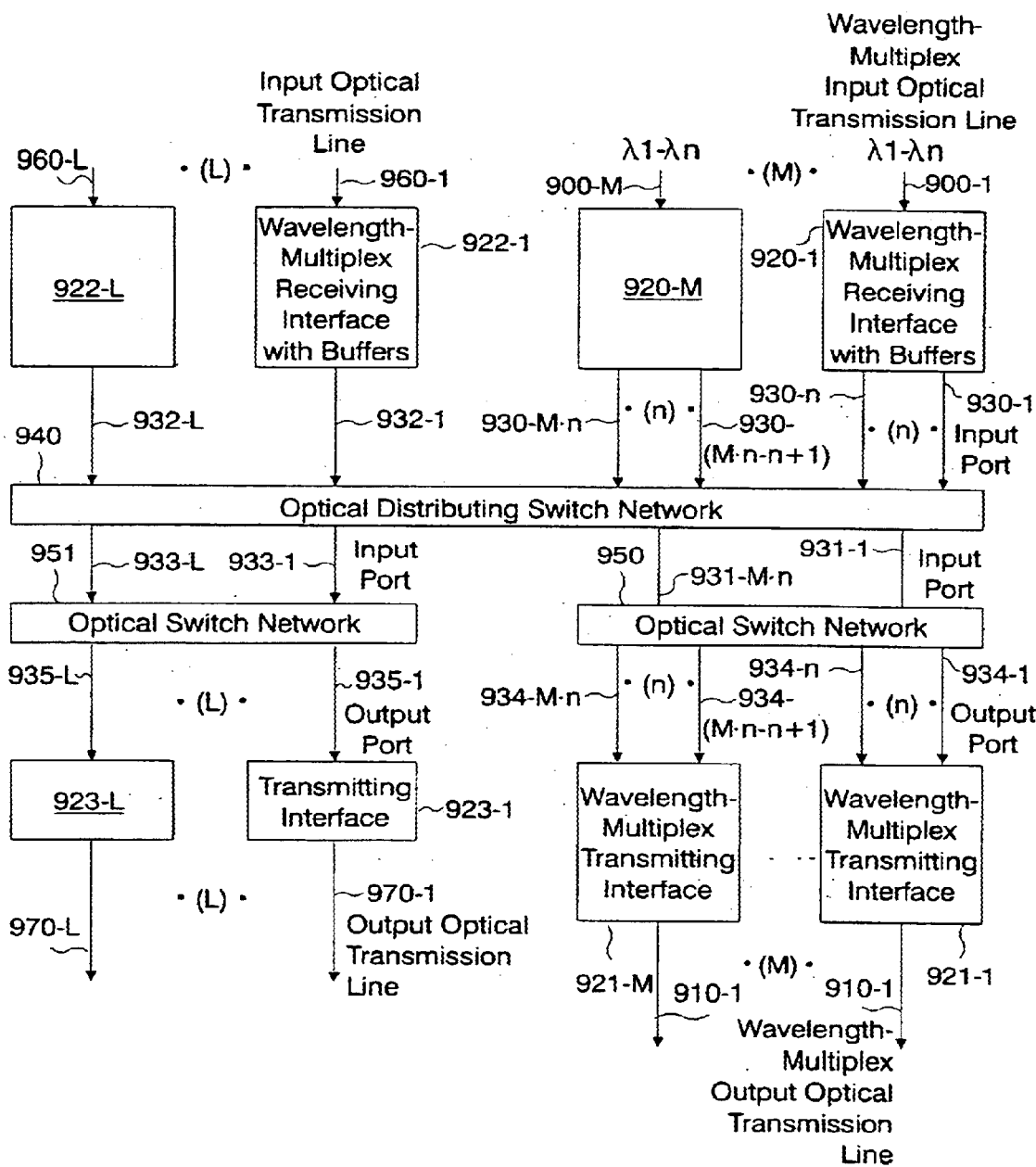
FIG. 25 is a block diagram showing an arrangement of a sixth embodiment of the optical communication network node of the present invention.

Next, a sixth embodiment of the present invention will be explained by referring to FIG. 25. FIG. 25 is a block diagram showing an arrangement of the sixth embodiment. In FIG. 25, a plurality of input optical transmission lines 1900-X (X is 1 to M) having one input end to which wavelength-multiplex optical signals are input are connected to a plurality of wavelength-multiplex receiving interfaces 1920-X (X is 1 to M) with buffers, respectively, and a plurality of output ends are connected to input ends of optical distributing switch network 1940 through input ports 1930-(X·n-n+1) to 1930-X·n (X is 1 to M) of the optical distributing switch network 1940.

The wavelength-multiplex receiving interfaces 1920-X (X is 1 to M) with the buffers, after separating wavelength-multiplex optical signals into a plurality of optical signals having different wavelengths, output these plurality of optical signals as it is from each of a plurality of output ends, or convert the plurality of optical signals into electric signals, temporarily store ATM cells in the buffers, which are taken out from transmission frames, and after processing headers of the ATM cells output from the buffers, convert the electric signals into optical signals and output the optical signals from each of the plurality of output ends.

The input ends of a plurality of receiving interfaces 1922-Y (Y is 1 to L) with the buffers are connected to a plurality of output optical transmission lines 1960-Y (Y is 1 to L).

The output ends of the plurality of receiving interfaces 1922-Y (Y is 1 to L) with the buffers are connected to input ends of an optical distributing switch network 1940 through input ports 1932-1 to 1932-L of the optical distributing switch network 1940.

Also, the plurality of receiving interfaces 1922-Y (Y is 1 to L) with the buffers convert optical signals input from the input end into electric signals, temporarily store ATM cells in the buffers, which are taken out from transmission frames, and after processing headers of the ATM cells output from the buffers, convert the electric signals into optical signals and output the optical signals from the output end.

The output ends of the above-described optical distributing switch network 1940 are connected to input ends of an optical switch network 1950 through input ports 1931-1 to 1931-M·n thereof, and are connected to input ends of an optical switch network 1951 through input ports 1933-1 to 1933-L thereof.

The optical distributing switch network 1940 has a plurality of input ends and a plurality of output ends, and switches optical signals from the plurality of input ends to the predetermined output ends.

The output ends of the optical switch network 1950 are connected to input ends of wavelength-multiplex transmitting interfaces 1921-1 to 1921-M through output ports 1934-1 to 1934-M·n thereof.

In the same manner, the output ends of the optical switch network 1951 are connected to input ends of the plurality of wavelength-multiplex transmitting interfaces 1921-1 to 1921-M through output ports 1935-1 to 1935-L thereof.

The optical switch network 1950 has a plurality of input ends and a plurality of output ends, and sets predetermined optical circuits between the plurality of predetermined input ends and output ends, or exchanges optical signals cell by cell under control by the plurality of wavelength-multiplex receiving interfaces 1920-X (X is 1 to M) with the buffers and the plurality of receiving interfaces 1922-Y (Y is 1 to L) with the buffers.

Also, the above-described optical switch network 1951 has a plurality of input ends and a plurality of output ends, and exchanges optical signals cell by cell under control by the plurality of wavelength-multiplex receiving interfaces 1920-X (X is 1 to M) with the buffers and the plurality of receiving interfaces 1922-Y (Y is 1 to L) with the buffers.

The above-described wavelength-multiplex transmitting interfaces 1921-1 to 1921-M have a plurality of input ends and one output end, respectively, and convert each of optical signals on optical circuits, which are input from the plurality of input ends, into optical signals having predetermined wavelengths as it is, or after storing ATM cells in transmission frames, which are taken out by converting each of the optical signals from the plurality of input ends into electric signals, convert the electric signals into optical signals having the predetermined wavelengths, combine the plurality of converted optical signals having the predetermined wavelengths, and output wavelength-multiplex optical signals from the one output end.

This output end is connected to a plurality of first output optical transmission lines 1910-X (X is 1 to M) to which the wavelength-multiplex optical signals are output.

The above-described plurality of transmitting interfaces 1123-Y (Y is 1 to L) have one input end and one output end, respectively, and after storing ATM cells in transmission frames, which are taken out by converting each of optical signals input from the input end into electric signals, convert the electric signals into optical signals, and output the optical signals from the output end.

This output end is connected to a plurality of output optical transmission lines 1970-Y (Y is 1 to L).

In the sixth embodiment, the optical switch network 1950 is provided for pass and inserting connection and the optical switch network 1951 is provided for drop and folded connection, and each of the optical signals which are passed and inserted or which are dropped and folded is separately sent to a predetermined output by the optical distributing switch network. As a result, unnecessary hardware can be reduced, and it is possible to realize a small-sized optical node.

Next, operation of this sixth embodiment will be explained. Also in the explanation, like in the explanation for each of the above-described embodiment, as a matter of convenience, it is referred to a drop of a signal that a signal from a optical communication network constructed of nodes is sent to other local networks and area networks contained in a node of its own. To the contrary, it is referred to an insert of a signal that a signal from these local networks and area networks is sent to an optical communication network. Moreover, it is referred to a pass of a signal that an optical signal from an adjacent node in an optical communication network is transferred to other nodes.

In FIG. 25, the wavelength-multiplex optical signals created by being multiplied by optical signals having n different wavelengths ($\lambda 1$ to $\lambda n$) are sent to the wavelength-multiplex receiving interfaces 1920-X (X is 1 to M) with the buffers, respectively.

Since each of the wavelength-multiplex receiving interfaces 1920-X (X is 1 to M) with the buffers is connected to the optical distributing switch network 1940 by each of the number n of the input ports 1930-(X·n-n+1) to 1930-X·n (X is 1 to M), the respective wavelength-multiplex receiving interfaces 1920-X (X is 1 to M) with the buffers, after separating the input wavelength-multiplex optical signals into optical signals having n different wavelengths, send these n optical signals to the optical distributing switch network 1940 from the input ports 1930-(X·n-n+1) to 1930-X·n (X is 1 to M).

Otherwise, the respective wavelength-multiplex receiving interfaces 1920-X (X is 1 to M) with the buffers, after separating the input wavelength-multiplex optical signals into optical signals having n different wavelengths, take out ATM cells from transmission frames every n optical signals, and also send optical cells to the optical distributing switch network 1940 from the input ports 1930-(X·n-n+1) to 1930-X·n (X is 1 to M) by way of the buffers.

On the other hand, the respective receiving interfaces 1922-Y (Y is 1 to L) with the buffers receive optical signals from the input optical transmission lines 1960-Y (Y is 1 to L), take out ATM cells from transmission frames, store the ATM cells in the buffers, and thereafter, send optical cells to the optical distributing switch network 1940 through the input ports 1932-Y (Y is 1 to L).

The optical distributing switch network 1940 switches the optical signals which are input from the wavelength-multiplex receiving interfaces 1920-X (X is 1 to M) with the buffers through the input ports 1930-1 to 1930-M·n and the optical signals which are input from the receiving interfaces 1922-Y (Y is 1 to L) with the buffers through the input ports 1932-1 to 1932-L to the optical switch networks 1950 and 1951.

When the optical switch network 1950 receives optical signals which have not passed through the buffers in the wavelength-multiplex receiving interfaces 1920-X (X is 1 to M) with the buffers, the optical signals are transmitted to the predetermined output ports 1934-1 to 1934-M·n by switching circuits in a circuit switching manner.

Also, when receiving the optical cells from the receiving interfaces 1922-Y (Y is 1 to L) with the buffers, the optical switch network 1950 switches the cells to the predetermined output ports 1934-1 to 1934-M·n cell by cell in accordance with switching control signals notified through control lines (not shown) from the receiving interfaces 1922-Y (Y is 1 to L) with the buffers.

On the other hand, when receiving the optical cells by way of the buffers within the wavelength-multiplex receiving interfaces 1920-X (X is 1 to M) with the buffers, the optical switch network 1951 switches the cells to the predetermined output ports 1935-1 to 1935-L cell by cell in accordance with switching control signals notified through control lines (not shown) from the wavelength-multiplex receiving interfaces 1920-X (X is 1 to M) with the buffers.

Furthermore, when receiving the optical cells from the receiving interfaces 1122-Y (Y is 1 to L) with the buffers, the optical switch network 1951 switches the cells to the predetermined output ports 1935-1 to 1935-L cell by cell in accordance with headers of the cells which are notified through control lines (not shown) from the receiving interfaces 1122-Y (Y is 1 to L) with the buffers.

The respective wavelength-multiplex transmitting interfaces 1921-X (X is 1 to M) are also connected to the optical switch network 1950 by each of the number n of the output ports 1934-(X·n-n+1) to 1934-X·n.

When receiving the optical signals switched in a circuit switching manner by the optical switch network 1950 by way of the output ports 1934-(X·n-n+1) to 1934-X·n (X is 1 to M), the respective wavelength-multiplex transmitting interfaces 1921-X (X is 1 to M), after converting these signals into optical signals having n wavelengths, combine them and send created wavelength-multiplex optical signals to the wavelength-multiplex output optical transmission lines 1910-X (X is 1 to M).

Also, when receiving the optical cells switched cell by cell by means of the optical switch network 1950 by way of the output ports 1934-(X·n-n+1) to 1934-X·n, the respective wavelength-multiplex transmitting interfaces 1921-X (X is 1 to M), after inserting these cells into the transmission frames every n cells and converting the cells into optical signals having n wavelengths, combine them and send created wavelength-multiplex optical signals to the wavelength-multiplex output optical transmission lines 1910-X (X is 1 to M).

On the other hand, each of the transmitting interfaces 1923-Y (Y is 1 to L) is connected to the optical switch network 1951 through the output ports 1935-Y (Y is 1 to L).

When receiving the optical cells switched cell by cell by means of the optical switch network 1951 by way of the output ports 1935-Y (Y is 1 to L), the respective transmitting interfaces 1923-Y (Y is 1 to L), after inserting the cells into the transmission frames, convert the cells into optical signals, and send the optical signals to the output optical transmission lines 1970-Y (Y is 1 to L).

In addition, with regard to a part to be applied in FIG. 16, the part having a name and an arrangement same as those of a part in FIG. 15 can be applied.

Also in the sixth embodiment of the present invention shown in FIG. 25, like in the above-described fourth embodiment, it is possible to reduce the cross points necessary for the optical switch network, compared with the prior art.

This is because while in the conventional arrangement, one optical switch network which is used therein realizes each connecting function for the drop and insertion of a signal and the pass and fold of a signal, the optical switch network 1950 is used for pass and inserting connections and the optical switch network 1951 is used for drop and folded connections in this sixth embodiment.

Therefore, the sixth embodiment of the present invention reduces the number of the cross points unnecessary for the optical switch networks under the comparison in the space dividing equivalent circuit, and in connection therewith, the hardware corresponding to the unnecessary cross points can be reduced and it is possible to realize a small-sized node.

Figure 26:
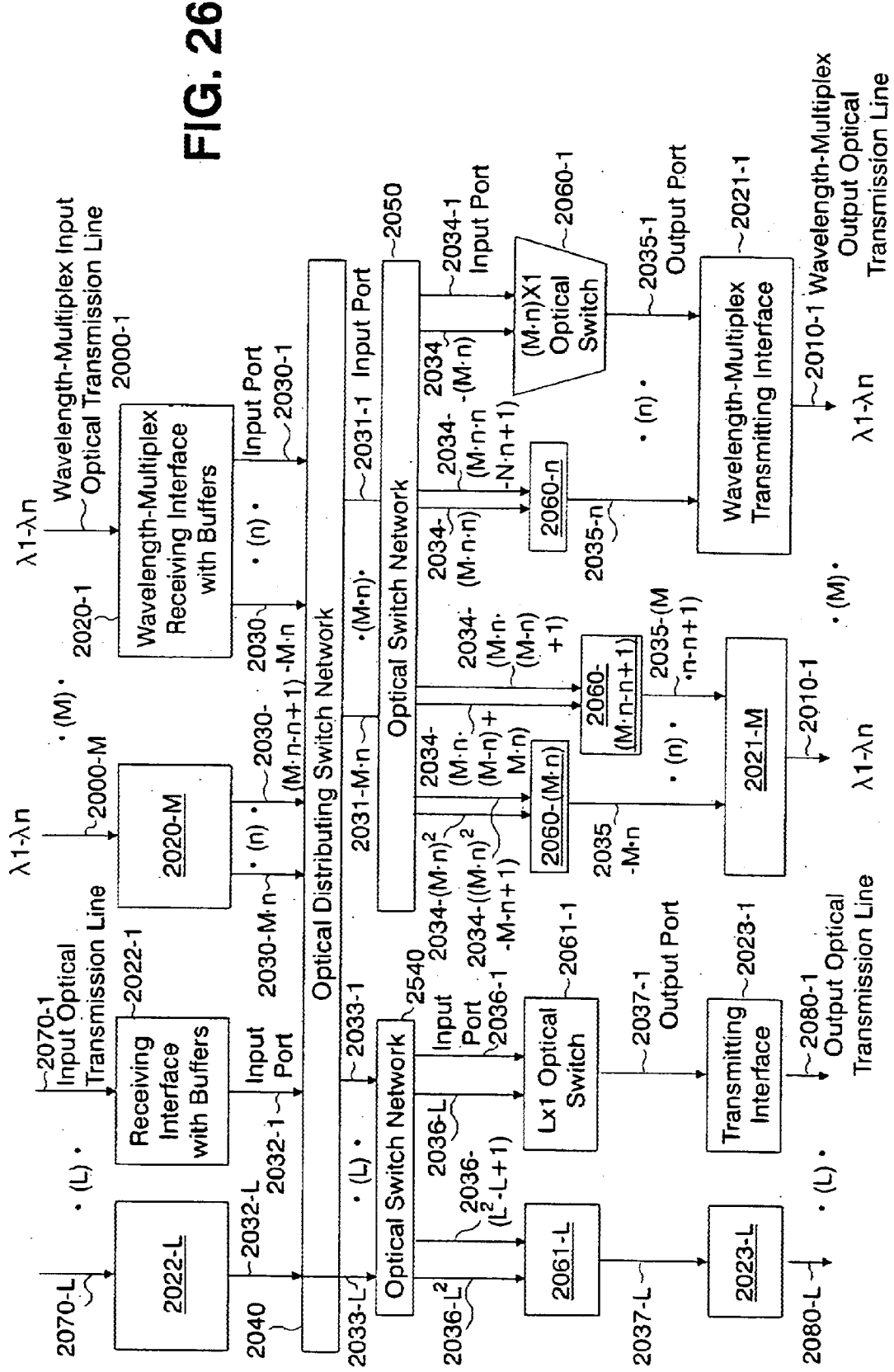
FIG. 26 is a block diagram showing an arrangement of a seventh embodiment of the optical communication network node of the present invention.

Next, a seventh embodiment of the optical communication network node of the present invention will be explained. FIG. 26 is a block diagram showing an arrangement of the seventh embodiment.

In FIG. 26, a plurality of wavelength-multiplex receiving interfaces 2020-X (X is 1 to M) with buffers have one input end connected to a plurality of input optical transmission lines 2000-X (X is 1 to M) to which wavelength-multiplex optical signals are input, and a plurality of output ends connected to input ends of an optical distributing switch network 2040 through input ports 2030-1 to 2030-M·n of the optical distributing switch network 2040.

The wavelength-multiplex receiving interfaces 2020-X (X is 1 to M) with the buffers, after separating wavelength-multiplex optical signals which are input from the one input end into a plurality of optical signals having different wavelengths, output these plurality of optical signals as it is from each of the plurality of output ends, or convert the plurality of optical signals into electric signals, temporarily store ATM cells in the buffers, which are taken out from transmission frames, and after processing headers of the ATM cells output from the buffers, convert the electric signals into optical signals and output the optical signals from each of the plurality of output ends.

Also, a plurality of receiving interfaces 2022-Y (Y is 1 to L) with the buffers have one input end connected to a plurality of input optical transmission lines 2070-Y (Y is 1 to L), and one output end, and convert optical signals input from the input end into electric signals, temporarily store ATM cells in the buffers, which are taken out from transmission frames, and after processing headers of the ATM cells output from the buffers, convert the electric signals into optical signals and output the optical signals from the output end.

The output ends of the plurality of receiving interfaces 2022-Y (Y is 1 to L) with the buffers are connected to input ends of the optical distributing switch network 2040 through input ports 2032-1 to 2032-L of the optical distributing switch network 2040.

The optical distributing switch network 2040 has a plurality of input ends and a plurality of output ends, and switches optical signals from the plurality of input ends to the predetermined output ends.

The output ends of the optical switch network 2040 are connected to input ends of an optical selective switch network 2050 through input ports 2031-1 to 2031-M·n of the optical selective switch network 2050.

The output ends of the optical switch network 2040 are connected to input ends of an optical selective switch network 2051 through input ports 2033-1 to 2033-L of the optical selective switch network 2051.

The optical selective switch network 2050 and the optical selective switch network 2051 have a plurality of input ends and a plurality of output ends, and selectively drops optical signals from the plurality of input ends into the predetermined one or more than one output ends.

The output ends of the optical selective switch network 2050 are connected to each input end of the optical switches 2060-1 to 2060-n and 2060-(M·n-n+1) to 2060-M·n through input ports 2034-1 to 2034-(M·n·n) and 2034-{(M·n (M-n)+ 1)} to 2034-M·n of the optical switches 2060-1 to 2060-n and 2060-(M·n-n+1) to 2060-M·n.

The respective output ports 2035-1 to 2035-n and 2035-(M·n-n+1) to 2035-M·n of the optical switches 2060-1 to 2060-n and 2060-(M·n-n+1)of the optical switches 2060-1 to 2060-n and 2060-(M·n-n+1) to 2060-M·n are connected to the respective input ends of wavelength-multiplex transmitting interfaces 2021-1 to 2021-M.

The respective output ends of the wavelength-multiplex transmitting interfaces 2021-1 to 2021-M are connected to the wavelength-multiplex output transmission lines 2010-1 to 2010-M.

A plurality of (M·n)×1 optical switches 2060-P (P is 1 to M·n) have a plurality of input ends and one output end, respectively, and set predetermined optical circuits between the plurality of predetermined input ends and the one output end, or exchange the optical signals cell by cell under control by the plurality of wavelength-multiplex receiving interfaces 2020-X (X is 1 to M) with the buffers and the plurality of receiving interfaces 2022-Y (Y is 1 to L) with the buffers.

Also, the wavelength-multiplex transmitting interfaces 2021-X (X is 1 to M) have a plurality of input ends and one output end, respectively, and convert each of optical signals on optical circuits, which are input from the plurality of input ends, into optical signals having predetermined wavelengths as it is, or after storing ATM cells in transmission frames, which are taken out by converting each of the optical signals from the plurality of input ends into electric signals, convert the electric signals into optical signals having the predetermined wavelengths, combine the plurality of converted optical signals having the predetermined wavelengths, and output wavelength-multiplex optical signals from the one output end.

Furthermore, the output ends of the above-described optical selective switch network 2051 are connected to input ends of the optical switches 2061-1 to 2061-L through the input ports 2036-1 to 2036-L thereof.

The respective output ends of the optical switches 2061-1 to 2061-L are connected to the respective input ends of transmitting interfaces 2023-1 to 2023-L through the output ports 2037-1 to 2037-L thereof.

The respective output ends of the transmitting interfaces 2023-1 to 2023-L are connected to the output transmission lines 2080-1 to 2080-L.

The above-described optical switches 2061-1 to 2061-L, as mentioned above, have a plurality of input ends and one output end, respectively, and exchange the optical signals cell by cell under control by the plurality of wavelength-multiplex receiving interfaces 2020-X (X is 1 to M) with the buffers and the plurality of receiving interfaces 2022-Y (Y is 1 to L) with the buffers.

Also, the above-described transmitting interfaces 2023-1 to 2023-L, as mentioned above, have one input end and one output end, respectively, and after storing ATM cells in transmission frames, which are taken out by converting each of the optical signals input from the input end into electric signals, convert the electric signals into optical signals, and output the optical signals from the output end through the plurality of output transmission lines 2080-Y (Y is 1 to L).

Next, operation of the seventh embodiment will be explained. In the seventh embodiment, by means of the optical selective switch network 2050 and the (M·n)×1 optical switches 2060-P (P is 1 to M·n) or by means of the optical selective switch network 2051 and the L×1 optical switches 2061-Y (Y is 1 to L), an optical switch network for pass and inserting connections and an optical switch network for drop and folded connections are realized, respectively, and the number of cross points are reduces, and also, the optical selective switch networks 2050 and 2051 drop the optical signals only into the predetermined (M·n)×1 optical switches 2060-P (P is 1 to M·n) and the L×1 optical switches 2061-Y (Y is 1 to L), and unnecessary optical drop is reduced.

Also in the explanation of the seventh embodiment, like in the explanation for each of the above-described embodiments, as a matter of convenience, it is referred to a drop of a signal that a signal from an optical communication network constructed of nodes is sent to other local networks and area networks contained in a node of its own. To the contrary, it is referred to an insert of a signal that a signal from these local networks and area networks is sent to an optical communication network. Moreover, it is referred to a pass of a signal that an optical signal from an adjacent node in an optical communication network is transferred to other nodes.

The wavelength-multiplex optical signals created by being multiplied by optical signals having n different wavelengths ($\lambda 1$ to $\lambda n$) are sent to the wavelength-multiplex receiving interfaces 2020-X (X is 1 to M) with the buffers, respectively, through the wavelength-multiplex input optical transmission lines 2000-X (X is 1 to M).

Each of the wavelength-multiplex receiving interfaces 2020-X (X is 1 to M) with the buffers is connected to the optical distributing switch network 2040 by each of the number n of the input ports 2030-(X·n-n+1) to 2030-X·n (X is 1 to M).

The respective wavelength-multiplex receiving interfaces 2020-X (X is 1 to M) with the buffers, after separating the input wavelength-multiplex optical signals into optical signals having n different wavelengths, send these n optical signals to the optical distributing switch network 2040 from the input ports 2030-(X·n-n+1) to 2030-X·n (X is 1 to M).

Otherwise, the respective wavelength-multiplex receiving interfaces 2020-X (X is 1 to M) with the buffers, after separating the input wavelength-multiplex optical signals into optical signals having n different wavelengths, take out ATM cells from transmission frames every n optical signals, and also send optical cells to the optical distributing switch network 2040 from the input ports 2030-(X·n-n+1) to 2030-X·n (X is 1 to M) by way of the buffers.

On the other hand, the respective receiving interfaces 2022-Y (Y is 1 to L) with the buffers receive optical signals from the input optical transmission lines 2070-Y (Y is 1 to L), take out ATM cells from transmission frames, store the ATM cells in the buffers, and thereafter, send optical cells to the optical distributing switch network 2040 through the input ports 2032-Y (Y is 1 to L).

The optical distributing switch network 2040 switches the optical signals which are input from the wavelength-multiplex receiving interfaces 2020-X (X is 1 to M) with the buffers and the receiving interfaces 2022-Y (Y is 1 to L) with the buffers to the optical selective switch networks 2050 and 2051 by way of the input ports 2031-P (P is 1 to M·n) and the input ports 2033-Y (Y is 1 to L).

The optical selective switch networks 2050 and 2051 drop the input optical signals only into the predetermined (M·n)×1 optical switches 2060-P (P is 1 to M·n) of the M n optical switches or only into the predetermined L×1 optical switches 2061-Y (Y is 1 to L) of the L optical switches.

The (M·n)×1 optical switches 2060-P (P is 1 to M·n) switch any one of the optical signals to the output ports 2035-P (P is 1 to M·n) in a circuit switching manner, which are input from the input ports 2034-(P·M·n-M·n+1) to 2034-P·M·n (P is 1 to M·n) and which have not passed through the buffers within the wavelength-multiplex receiving interfaces 2020-X (X is 1 to M) with the buffers.

Also, the (M·n)×1 optical switches 2060-P (P is 1 to M·n) switch the optical cells, which are input from the receiving interfaces 2022-Y (Y is 1 to L) with the buffers through the input ports 2034-(P·M·n-M·n+1) to 2034-P·M·n (P is 1 to M·n), to the output ports 2035-P (P is 1 to M·n) cell by cell in accordance with switching control signals notified through control lines (not shown) from the receiving interfaces 2022-Y (Y is 1 to L) with the buffers.

On the other hand, the L×1 optical switches 2061-Y (Y is 1 to L) switch the optical cells cell by cell, which are input from the input ports 2036-(Y·L-L+1) to 2036-Y·L (Y is 1 to L) by way of the buffers within the wavelength-multiplex receiving interfaces 2020-X (X is 1 to M) with the buffers, to the output ports 2037-Y (Y is 1 to L) in accordance with switching control signals notified through control lines (not shown) from the wavelength-multiplex receiving interfaces 2020-X (X is 1 to M) with the buffers.

Furthermore, the L×1 optical switches 2061-Y (Y is 1 to L) switch the optical cells cell by cell, which are input from the receiving interfaces 2022-Y (Y is 1 to L) with the buffers through the input ports 2036-(Y·L-L+1) to 2036-Y·L (Y is 1 to L), to the output ports 2037-Y (Y is 1 to L) in accordance with switching control signals notified through control lines (not shown) from the receiving interfaces 2022-Y (Y is 1 to L) with the buffers.

The respective wavelength-multiplex transmitting interfaces 2021-X (X is 1 to M) are connected to the (M·n)×1 optical switches 2050-P (P is 1 to M·n) by each of the number n of the output ports 2035-(X·n-n+1) to 2035-X·n.

When receiving the optical signals switched in a circuit switching manner by the (M·n)×1 optical switches 2060-P (P is 1 to M·n) by way of the output ports 2035-(X·n-n+1) to 2035-X·n (X is 1 to M), the respective wavelength-multiplex transmitting interfaces 2021-X (X is 1 to M), after converting these signals into optical signals having n wavelengths, combine them and send created wavelength-multiplex optical signals to the wavelength-multiplex output optical transmission lines 2010-X (X is 1 to M).

Also, when receiving the optical cells switched cell by cell by means of the (M·n)×1 optical switches 2060-P (P is 1 to M·n) by way of the output ports 2035-(X·n-n+1) to 2035-X·n (X is 1 to M), the respective wavelength-multiplex transmitting interfaces 2021-X (X is 1 to M), after inserting these cells into the transmission frames every n cells and converting the cells into optical signals having n wavelengths, combine them and send created wavelength-multiplex optical signals to the wavelength-multiplex output optical transmission lines 2010-X (X is 1 to M).

On the other hand, each of the transmitting interfaces 2023-Y (Y is 1 to L) is connected to the L×1 optical switches 2061-Y (Y is 1 to L) through the output ports 2037-Y (Y is 1 to L).

Therefore, when receiving the optical cells switched cell by cell by means of the L×1 optical switches 2061-Y (Y is 1 to L) by way of the output ports 2037-Y (Y is 1 to L), the respective transmitting interfaces 2023-Y (Y is 1 to L), after inserting the cells into the transmission frames, convert the cells into optical signals, and send the optical signals to the output optical transmission lines 2080-Y (Y is 1 to L).

In addition, with regard to a part to be applied in FIG. 26, the part having a name and an arrangement same as those of a part in FIG. 21 can be applied.

Also in the optical communication network node of the seventh embodiment shown in FIG. 26, like in the above-described fifth embodiment, it is possible to reduce the cross points necessary for the optical switch network, compared with the prior art and to reduce an optical loss. This is because by means of the optical selective switch network 2050 and the (M·n)×1 optical switches 2060 or by means of the optical selective switch network 2051 and the L×1 optical switches 2061, an optical switch network for pass and inserting connections and an optical switch network for drop and folded connections are realized, respectively, and the optical selective switch networks 2050 and 2051 drop the optical signals only into the predetermined (M·n)×1 optical switches 2060 and the L×1 optical switches 2061-Y (Y is 1 to L).

Figure 27:
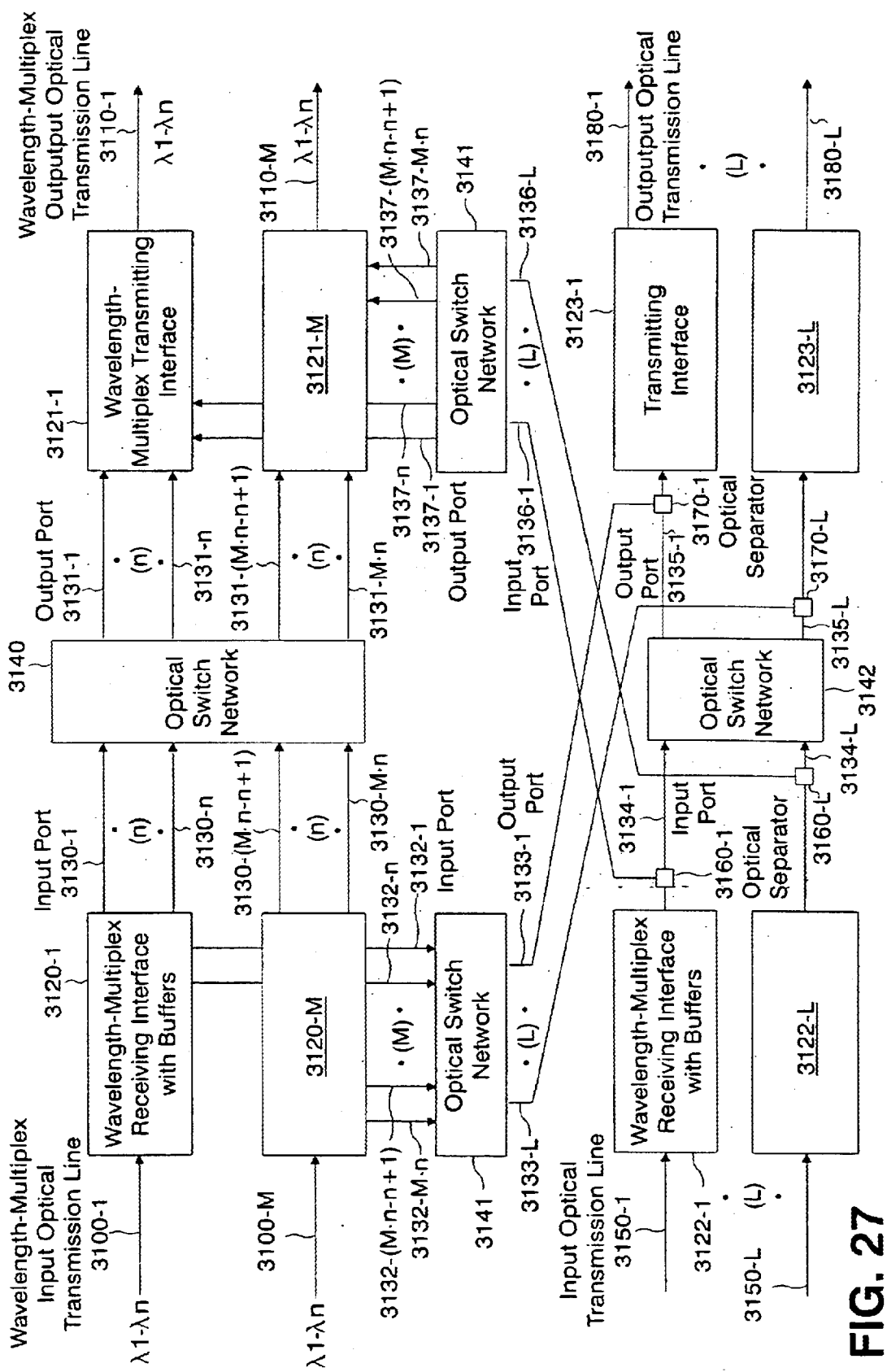
FIG. 27 is a block diagram showing an arrangement of an eighth embodiment of the optical communication network node of the present invention.

Next, an eighth embodiment of the present invention will be explained by referring to FIG. 27 to FIG. 29. FIG. 27 is a block diagram showing an arrangement of the eighth embodiment.

In FIG. 27, a plurality of input optical transmission lines 3100-X (X is 1 to M) to which wavelength-multiplex optical signals are input are connected to input ends of a plurality of wavelength-multiplex receiving interfaces 3120-X (X is 1 to M) with buffers.

The output ends of the wavelength-multiplex receiving interfaces 3120-X (X is 1 to M) with buffers are connected to input ends of an optical switch network 3140 through the input ports 3130-1 to 3130-n and 3130-(M·n-n+1) to 3130-M·n thereof.

Furthermore, the output ends of the wavelength-multiplex receiving interfaces 3120-X (X is 1 to M) with buffers are connected to input ends of an optical switch network 3141 through the input ports 3132-1 to 3132-n and 3132-(M·n-n+1) to 3132-M·n of the optical switch network 3141.

The wavelength-multiplex receiving interfaces 3120-X (X is 1 to M) with the buffers, after separating wavelength-multiplex optical signals which are input from the input ends into a plurality of optical signals having different wavelengths, output these plurality of optical signals as it is from each of first output ends, or convert the optical signals into electric signals, temporarily store ATM cells in the buffers, which are taken out from transmission frames, and after processing headers of the ATM cells output from the buffers, convert the electric signals into optical signals and output the optical signals from each of a plurality of second output ends.

Also, input ends of a plurality of receiving interfaces 3122-Y (Y is 1 to L) with the buffers are connected to a plurality of input optical transmission lines 3160-Y (Y is 1 to L).

The respective output ends of the plurality of receiving interfaces 3122-Y (Y is 1 to L) with the buffers are connected to optical separators 3160-1 to 3160-L and to the input ends of the optical switch network 3141 through the input ports 3134-1 to 3134-L thereof.

The receiving interfaces 3122-Y (Y is 1 to L) convert optical signals input from the input ends into electric signals, temporarily store ATM cells in the buffers, which are taken out from transmission frames, and after processing headers of the ATM cells output from the buffers, convert the electric signals into optical signals and output the optical signals from the output ends.

The output ends of the above-described optical switch network 3140 are connected to the input ends of wavelength-multiplex transmitting interfaces 3121-1 to 3121-M through output ports 3131-1 to 3131-n and 3131-(M·n-n+1) to 3131-M·n.

The output ends of the above-described optical switch network 3141 are connected to the input ends of transmitting interfaces 3123-1 to 3123-L through output ports 3133-1 to 3133-L and optical combiners 3170-1 to 3170-L.

The output ends of the above-described optical switch network 3142 are connected to the input ends of the transmitting interfaces 3123-1 to 3123-L through output ports 3135-1 to 3135-L and the above-described optical combiners 3170-1 to 3170-L.

The output ends of the above-described optical switch network 3143 are connected to the input ends of the wavelength-multiplex transmitting interfaces 3121-1 to 3121-M through output ports 3137-1 to 3137-n and 3137-(M·n-n+1) to 3137-M·n thereof.

The output ends of the wavelength-multiplex transmitting interfaces 3121-1 to 3121-M are connected to wavelength-multiplex output transmission lines 3110-1 to 3110-M.

The output ends of the transmitting interfaces 3123-1 to 3123-L are connected to output transmission lines 3180-1 to 3180-L.

The above-described optical switch network 3140 sets predetermined optical circuits between a plurality of predetermined input ends and output ends, and the above-described optical switch network 3141 exchanges the optical signals cell by cell under control by the plurality of wavelength-multiplex receiving interfaces 3120-X (X is 1 to M) with the buffers.

Also, the above-described optical switch networks 3142 and 3143 exchange the optical signals cell by cell under control by the plurality of receiving interfaces 3122-Y (Y is 1 to L) with the buffers.

Also, the above-described plurality of wavelength-multiplex transmitting interfaces 3121-X (X is 1 to M) convert each of optical signals on optical circuits, which are input from the plurality of first input ends, into optical signals having predetermined wavelengths as it is, or after storing ATM cells in transmission frames, which are taken out by converting each of the optical signals from the plurality of second input ends into electric signals, convert the electric signals into optical signals having the predetermined wavelengths, combine the plurality of converted optical signals having the predetermined wavelengths, and output wavelength-multiplex optical signals from the one output ends.

Also, the above-described plurality of transmitting interfaces 3123-Y (Y is 1 to L), after storing ATM cells in transmission frames, which are taken out by converting each of the optical signals input from the input ends into electric signals, convert the electric signals into optical signals, and output the optical signals from the output ends.

Next, operation of the eighth embodiment as constructed above will be explained. In the eighth embodiment, the optical switch networks 3140,3141,3142 and 3143 are provided for every connecting function, a hardware is prepared, which corresponds to the number of cross points corresponding to each of the connecting function in accordance with a ratio of each connection. As a result, an unnecessary hardware can be eliminated, and it becomes to realize a small-sized optical node.

Also in the explanation hereinafter, like in the explanation for each of the above-described embodiments, as a matter of convenience, it is referred to a drop of a signal that a signal from an optical communication network constructed of nodes is sent to other local networks and area networks contained in a node of its own. To the contrary, it is referred to an insert of a signal that a signal from these local networks and area networks is sent to an optical communication network. Moreover, it is referred to a pass of a signal that an optical signal from an adjacent node in an optical communication network is transferred to other nodes.

The wavelength-multiplex optical signals created by being multiplied by optical signals having n different wavelengths ($\lambda 1$ to $\lambda n$) are sent to the wavelength-multiplex receiving interfaces 3120-X (X is 1 to M) with the buffers, respectively, through the wavelength-multiplex input optical transmission lines 3100-X (X is 1 to M).

Each of the wavelength-multiplex receiving interfaces 3120-X (X is 1 to M) with the buffers is connected to the optical switch network 3140 by each of the number n of the input ports 3130-(X·n-n+1) to 3130-X·n (X is 1 to M) and is connected to the optical switch network 3141 by each of the number n of the input ports 3132-(X·n-n+1) to 3132-X·n (X is 1 to M).

The respective wavelength-multiplex receiving interfaces 3120-X (X is 1 to M) with the buffers, after separating the input wavelength-multiplex optical signals into optical signals having n different wavelengths, send these n optical signals to the optical switch network 3140 from the input ports 3130-(X·n-n+1) to 3130-X·n (X is 1 to Otherwise, the respective wavelength-multiplex receiving interfaces 3120-X (X is 1 to M) with the buffers, after separating the input wavelength-multiplex optical signals into optical signals having n different wavelengths, take out ATM cells from transmission frames every n optical signals, and send optical cells to the optical switch network 3141 from the input ports 3132-(X·n-n+1) to 3132-X·n (X is 1 to M) by way of the buffers.

On the other hand, the respective receiving interfaces 3122-Y (Y is 1 to L) with the buffers receive optical signals from the input optical transmission lines 3150-Y (Y is 1 to L), take out ATM cells from transmission frames, store the ATM cells in the buffers, and thereafter, send optical cells to the optical switch networks 3142 and 3143 from the input ports 3134-Y (Y is 1 to L) or the input ports 3136-Y (Y is 1 to L) by way of the optical separators 3160-Y (Y is 1 to L).

When receiving optical signals which have not passed through the buffers within the wavelength-multiplex receiving interfaces 3120-X (X is 1 to M) with the buffers, the optical switch network 3140 switches the optical signals to the predetermined output ports 3131-1 to 3131-M·n in a circuit switching manner.

Also, when receiving optical cells which are input by way of the buffers within the wavelength-multiplex receiving interfaces 3120-X (X is 1 to M) with the buffers, the optical switch network 3141 switches the cells cell by cell to the predetermined output ports 3133-Y (Y is 1 to L) in accordance with switching control signals notified through control lines (not shown) from the wavelength-multiplex receiving interfaces 3120-X (X is 1 to M) with the buffers.

When receiving optical cells which are input from the receiving interfaces 3122-Y (Y is 1 to L) with the buffers, the optical switch network 3142 switches the cells cell by cell to the predetermined output ports 3135-Y (Y is 1 to L) in accordance with headers of the cells which are notified through control lines (not shown) from the wavelength-multiplex receiving interfaces 3122-Y (Y is 1 to L) with the buffers.

When receiving optical cells which are input by way of the buffers within the receiving interfaces 3122-Y (Y is 1 to L) with the buffers, the optical switch network 3143 switches the cells cell by cell to the predetermined output ports 3137-1 to 3137-M·n in accordance with switching control signals notified through control lines (not shown) from the receiving interfaces 3122-Y (Y is 1 to L) with the buffers.

The respective wavelength-multiplex transmitting interfaces 3121-X (X is 1 to M) are also connected to the optical switch networks 3140 and 3143 by each of the number n of the output ports 3131-(X·n-n+1) to 3131-X·n (X is 1 to M) and by each of the number n of the output ports 3137-(X·n-n+1) to 3137-X·n (X is 1 to M), respectively.

When receiving the optical signals switched in a circuit switching manner by the optical switch network 3140 by way of the output ports 3131-(X·n-n+1) to 3131-X·n (X is 1 to M), the respective wavelength-multiplex transmitting interfaces 3121-X (X is 1 to M), after converting these signals into optical signals having n wavelengths, combine them and send created wavelength-multiplex optical signals to the wavelength-multiplex output optical transmission lines 3110-X (X is 1 to M).

Also, when receiving the optical cells switched cell by cell by means of the optical switch network 3143 by way of the output ports 3137-(X·n-n+1) to 3137-X·n (X is 1 to M), the respective wavelength-multiplex transmitting interfaces 3121-X (X is 1 to M), after inserting these cells into the transmission frames every n cells and converting the cells into optical signals having n wavelengths, combine them and send created wavelength-multiplex optical signals to the wavelength-multiplex output optical transmission lines 3110-X (X is 1 to M).

On the other hand, each of the transmitting interfaces 3123-Y (Y is 1 to L) is connected to the output ports 3133-Y and 3135-Y (Y is 1 to L) and the optical switch networks 3141 and 3142 through the optical combiners 3170-Y (Y is 1 to L).

When receiving the optical cells switched cell by cell by means of the optical switch networks 3141 and 3142, the respective transmitting interfaces 3123-Y (Y is 1 to L), after inserting the cells into the transmission frames, convert the cells into optical signals, and send the optical signals to the output optical transmission lines 3180-Y (Y is 1 to L).

Next, a detailed arrangement of each part in the eighth embodiment shown in FIG. 27 will be explained.

The optical switch network 760 of FIG. 10, for example, can be applied to the optical switch networks 3140 to 3143 of FIG. 27.

In this case, it is also possible to increase or decrease the optical switch networks 3140, 3141, 3142 and 3143 of FIG. 27 per optical sub-switch module unit in connection with the increase or decrease of each of the number n of the input ports 3130, 3132, 3234 and 3136 and output port 3131, 3133, 3135 and 3137.

In addition, in the present invention, it is not intended that the concrete arrangement of the optical switch networks 3140 to 3143 is limited only to the optical switch network 760 of FIG. 10, and it is possible to apply the network (FIG. 6) described in the above-described publication "Optical Path Cross-Connect Node Architecture with High Modularity for Photonic Transport Networks".

In this case, with regard to the optical switch networks 3140, 3141, 3142 and 3143, it is possible to increase or decrease a hardware of a required optical switch network in connection with the increase or decrease of the input ports 3130, 3132, 3234 and 3136 and output port 3131, 3133, 3135 and 3137 one by one.

Also, the receiving interface 1300 with the buffers shown in FIG. 18 and the transmitting interface 1301 shown in FIG. 19 can be applied to the receiving interfaces 3122 with the buffers and the transmitting interfaces 3123 of FIG. 27.

Figure 28:
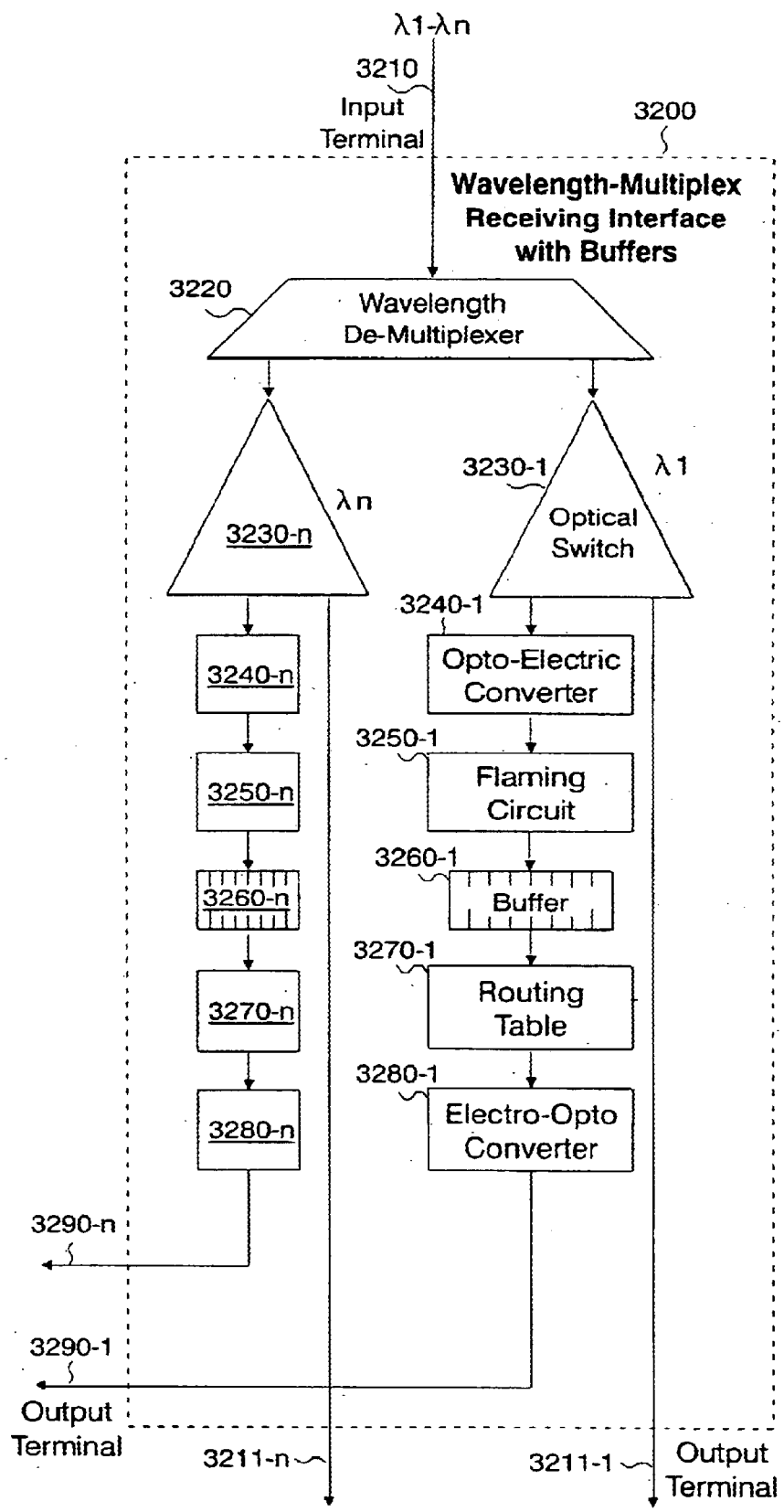
FIG. 28 is a block diagram showing an arrangement of a wavelength-multiplex receiving interface with a buffer used in the eighth embodiment of the optical communication network node of the present invention.
Figure 29:
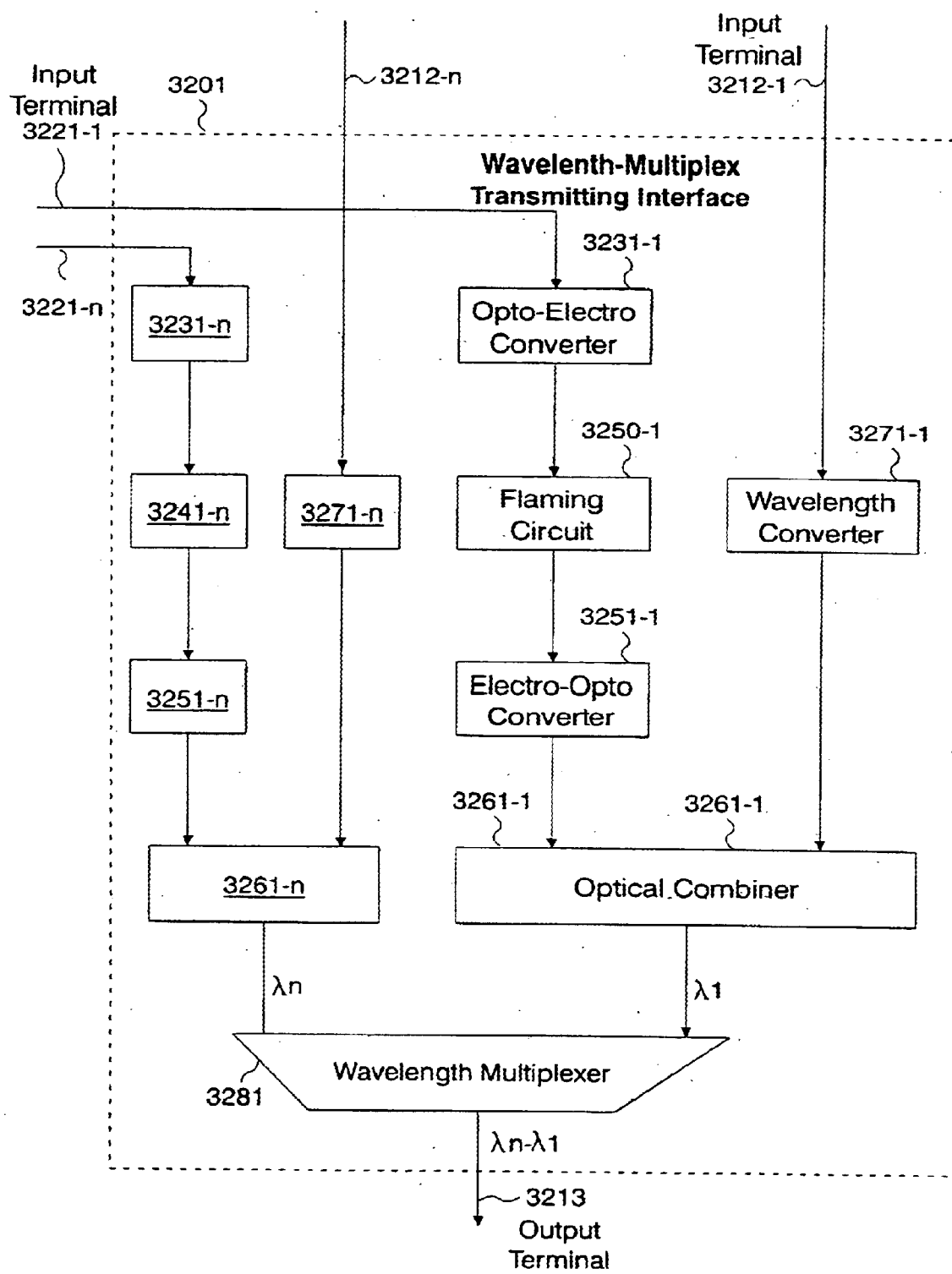
FIG. 29 is a block diagram showing an arrangement of a wavelength-multiplex transmitting interface used in the eighth embodiment of the optical communication network node of the present invention.

Detailed arrangements of the wavelength-multiplex receiving interfaces 3120 with the buffers and the wavelength-multiplex transmitting interfaces 3121 of FIG. 27 are shown in FIG. 28 and FIG. 29, respectively.

As shown in FIG. 28, in the wavelength-multiplex receiving interface 3200 with the buffers, the wavelength-multiplex input optical transmission lines 3100-X (X is 1 to M) of FIG. 27 and an input terminal 3210 are connected to each other, each of the input ports 3130-(X·n-n+1) to 3130-X·n (X is 1 to M) of the optical switch network 3140 is connected to output terminals 3211-Z (Z is 1 to n), and further, each of the input ports 3132-(X·n-n+1) to 3132-X·n (X is 1 to M) of the optical switch network 3141 is connected to output terminals 3290-Z (Z is 1 to n).

A wavelength de-multiplexer 3220 separates wavelength-multiplex signals from the input terminal 3210 into optical signals having n wavelengths, and sends each of the optical signals to optical switches 3230-Z (Z is 1 to n).

The optical switches 3230-Z (Z is 1 to n), in case of applying a circuit exchange to the input optical signals by the optical switch network 3140, switch the optical signals to output terminals 3211-Z (Z is 1 to n) in order to take a shortcut around opto-electro converter 3240-Z, flaming circuits 3250-Z, buffers 3260-Z, routing tables 3270-Z and electro-opto converters 3280-Z (Z is 1 to n).

Otherwise, the optical switches 3230-Z (Z is 1 to n), in case of exchanging the input optical signals in an ATM by the buffers 3260-Z (Z is 1 to n) and the optical switch network 3141 of FIG. 27, switch the optical signals to the opto-electro converters 3240-Z (Z is 1 to n).

The opto-electro converters 3240-Z (Z is 1 to n) convert the optical signals having predetermined wavelengths, which are input from the wavelength de-multiplexer 3220, respectively, into electric signals once, and output the electric signals to the flaming circuits 3250-Z (Z is 1 to n).

The flaming circuits 3250-Z (Z is 1 to n) receive the electric signals from the opto-electro converters 3240-Z (Z is 1 to n), take out cells from the transmission frames, and send the cells to the buffers 3260-Z (Z is 1 to n), respectively.

The buffers 3260-Z (Z is 1 to n) temporally store the input cells, and send the cells to the routing tables 3270-Z (Z is 1 to n) in a first-in/first-out manner, for example.

The routing tables 3270-Z (Z is 1 to n) analyze headers of the cells from the buffers 3260-Z (Z is 1 to n), and thereby, determine the output ports 3133-Y (Y is 1 to L) of the optical switch network 3141, from which the cells are output, rewrite values in the headers to predetermined values, and send them to the electro-opto converters 3280Z (Z is 1 to n).

Furthermore, for switching control of the optical switch network 3141, the routing tables 3270-Z (Z is 1 to n) notify the optical switch network 3141 of the output ports of the optical cells.

The electro-opto converters 3280-Z (Z is 1 to n) convert the cells from the routing tables 3270-Z (Z is 1 to n) into optical cells and send the optical cells to the optical combiners 3290-Z (Z is 1 to n), respectively.

In this way, after outputting the n optical signals that are multiplied by the wavelength-multiplex signals from the input terminal 3210 to the output terminals 3211-Z (Z is 1 to n) as it is without passing the buffers, or converting the n optical signals into electric signals, respectively, the wavelength-multiplex receiving interface 3200 with the buffers takes out the cells from the transmission frames, and after temporally storing the cells in the buffers, can output the cells to the output terminals 3290-Z (Z is 1 to n).

On the other hand, as shown in FIG. 29, in the wavelength-multiplex transmitting interface 3201, the output ports 3131-(X·n-n+1) to 3131-X·n (X is 1 to M) of the optical switch network 3140 of FIG. 27 are connected to input terminals 3120-Z (Z is 1 to n), respectively, and the output ports 3137-(X·n-n+1) to 3137-X·n (X is 1 to M) of the optical switch network 3143 are connected to input terminals 3221-Z (Z is 1 to n), respectively, and the wavelength-multiplex output optical transmission lines 3110-X (X is 1 to M) and an output terminal 3213 are connected to each other.

The optical signals exchanged in a circuit switching manner by the optical switch network 3140 are input to wavelength converters 3271-Z (Z is 1 to n).

The wavelength converters 3271-Z (Z is 1 to n) convert the optical signals input from the input terminals 3212-Z (Z is 1 to n) into optical signals having predetermined wavelengths $\lambda z$ (Z is 1 to n), and output the optical signals to the wavelength-multiplexer 3281 by way of the optical combiners 3261-Z (Z is 1 to n).

The optical signals exchanged in an ATM by the receiving interface 3122-Y (Y is 1 to L) with the buffers and the optical switch network 3143 are input to the opto-electro converters 3231-Z (Z is 1 to n) which is a photoelectric and electrooptical conversion system.

The opto-electro converters 3231-Z (Z is 1 to n) convert the optical cells from the input terminals 3221-Z (Z is 1 to n) into electric signals, and send the electrical signals to cell inserting circuits 3241-Z (Z is 1 to n).

The cell inserting circuits 3241-Z (Z is 1 to n) receive the cells from the opto-electro converters 3231-Z (Z is 1 to n), respectively, and insert them into the transmission frames, and send them to electro-opto converters 3251-Z (Z is 1 to n), respectively.

The electro-opto converters 3251-Z (Z is 1 to n) convert electric signals from the cell inserting circuits 3241-Z (Z is 1 to n) into optical signals having predetermined wavelengths $\lambda 1$ to $\lambda n$, respectively, and send the optical signals to a wavelength-multiplexer 3281 by way of the optical combiners 3261-Z (Z is 1 to n).

The wavelength-multiplexer 3281 combines the optical signals having n wavelengths from the electro-opto converters 3251-Z (Z is 1 to n) or the optical signals from the wavelength converters 3271-Z (Z is 1 to n), and sends wavelength-multiplex signals to the output terminal 3213.

In this way, the wavelength-multiplex transmitting interface 3201 converts the optical signals from the input terminals 3212-Z (Z is 1 to n) into optical signals having predetermined n wavelengths as it is, or converts the optical signals from the input terminals 3212-Z (Z is 1 to n) into electric signals, and thereafter, inserts the respective cells into the transmission frames and converts the cells into optical signals having predetermined n wavelengths, and sends the wavelength-multiplex signals to the output terminal 3213.

As explained above, in the eighth embodiment of the present invention, of which arrangement is shown in FIG. 27, cells which are multiplied by the optical signals having arbitrary wavelengths transmitted in the arbitrary wavelength-multiplex input optical transmission lines 3100-X (X is 1 to M) can be dropped into the arbitrary output optical transmission lines 3180-Y (Y is 1 to L).

Also, in accordance with the eighth embodiment, the cells from the arbitrary input optical transmission lines 3150-Y (Y is 1 to L) are converted into optical signals having arbitrary wavelengths and the optical signals can be inserted into the wavelength-multiplex output optical transmission lines 3110-X (X is 1 to M).

Moreover, in the node of the eighth embodiment, by converting the optical signals having arbitrary wavelengths of the arbitrary wavelength-multiplex input optical transmission lines 3100-X (X is 1 to M) into optical signals having arbitrary wavelengths of the arbitrary wavelength-multiplex output optical transmission lines 3110-X (X is 1 to M), the pass of the optical signals between the wavelength-multiplex input and output optical transmission lines can be realized, and a folded connection between the arbitrary input optical transmission lines 3150-Y (Y is 1 to L) and the arbitrary output optical transmission lines 3180-Y (Y is 1 to L) can be made.

In case that the optical communication network node of the eighth embodiment is analyzed by a space dividing equivalent circuit, it is possible to reduce the number of cross points necessary for the optical switch network, compared with the prior art.

This is because while in the conventional arrangement, one optical switch network which is used therein realizes each connecting function for the drop and insertion of a signal and the pass and fold of a signal, the optical switch networks are divided for each connecting function in the eighth embodiment.

For example, in case of M=8, n=8 and L=64, in the arrangement of FIG. 9, even if a ratio of each connection is changed, a space dividing equivalent circuit of the optical switch network 3340 always needs the cross points of $(M \cdot n+L)2=1282=16384$.

On the contrary, in the eighth embodiment, a case will be studied in which all of the optical signals from the M wavelength-multiplex input optical transmission lines 3100 are dropped into nodes, and all of the optical signals from the input optical transmission lines 3150 are inserted into the M wavelength-multiplex output optical transmission lines 3110.

However, a symmetric traffic (M·n=L) is assumed here, in which the total of the dropped optical signals and the total of the inserted optical signals are the same.

In this case, only the number of the cross points of the optical switch networks 3141 and 3143 other than the optical switch networks 3140 and 3142 is necessary, and if each of the optical switch networks is also analyzed by the space dividing equivalent circuit, the number of the cross points necessary for each of the optical switch networks 3141 and 3143 is $(n \cdot M) \cdot L=4096$, $L2=4096$, and the total required number of the cross points is 8192, which can be reduced to the half of the prior art.

Next, a case will be studied in which there is no optical signal to be dropped, and all of the optical signals from the M wavelength-multiplex input optical transmission lines 3100 pass to the M wavelength-multiplex output optical transmission lines 3110, and all of the optical signals from the input optical transmission lines 3150 are folded and connected to the output optical transmission lines 3180.

In this case, only the number of the cross points of the optical switch networks 3140 and 3142 becomes to be necessary, and if each of the optical switch networks is also analyzed by the space dividing equivalent circuit, the number of the cross points necessary for the optical switch network 3140 is $(n \cdot M)2=4096$ and the number of the cross points necessary for the optical switch network 3142 is $(n \cdot M)2=4096$, and the total required number of the cross points is also 8192, which can be reduced to the half of the prior art.

Moreover, a case will be studied in which a half (M1=4) of the optical signals from the M wavelength-multiplex input optical transmission lines 3100 pass and connect to the wavelength-multiplex output optical transmission lines 3110 and the remaining (M2=4, M1+M2=M, however.) optical signals are dropped to nodes, and a half (L1=32) of the optical signals from the L input optical transmission lines 3150 are inserted into the wavelength-multiplex output optical transmission lines 3110 and the remaining (L2=32, L1+L2=L, however.) optical signals are folded and connected to the output optical transmission lines 3180.

Also, a symmetric traffic is assumed and M2·n=L1. In this case, all of the optical switch networks 3140, 3141, 3142 and 3143 are utilized, and if each of the optical switch networks is also analyzed by the space dividing equivalent circuit, the number of the cross points necessary for the optical switch network 3140 is $(n \cdot M1)2=1024$, the number of the cross points necessary for the optical switch network 3141 is $(n \cdot M1 \cdot L)2=1024$, the number of the cross points necessary for the optical switch network 3142 is $L22=1024$, and the number of the cross points necessary for the optical switch network 3143 is (n·M2·L1)2=1024, respectively, and the total required number of the cross points is 4096, which can be reduced to one fourth of the prior art.

Therefore, the eighth embodiment reduces the number of the cross points unnecessary for the optical switch networks under the comparison in the space dividing equivalent circuit, and in connection thereto, the hardware corresponding to the unnecessary cross points can be reduced and it is possible to realize a small-sized node.

Apparently from the above, in eighth embodiment, since the optical switch networks are divided for every connecting function in the optical node, it is possible to reduce the number of the cross points of the optical switch networks which do not contribute to a connection to be realized, and it is possible to realize a small-sized node and lower a cost.

As mentioned above in detail, in accordance with the fourth embodiment, since the optical switch networks are divided into the optical switch networks for pass and drop connections and the optical switch networks for inserting and folded connections, it is possible to reduce the number of the cross points of the optical switch networks which do not contribute to a connection to be realized, and it is possible to reduce the required number of the cross points for the optical switch networks, realize a small-sized node and lower a cost.

Also, in accordance with the fifth embodiment, since by means of the optical selective switch network and the (M·n)×1 optical switch or another optical selective switch network and the L×1 optical switch, the optical switch networks for pass and drop connections and the optical switch networks for inserting and folded connections are realized, respectively, and since each of the optical selective switch networks are constructed so that the optical signals are dropped only into the predetermined (M·n)×1 optical switch and the L×1 optical switch, it is possible to reduce the required number of the cross points for the optical switch networks, realize a small-sized node and lower a cost, and it is possible to reduce an optical loss.

Moreover, in accordance with the sixth embodiment, since the optical switch networks are divided into the optical switch networks for pass and inserting connections and the optical switch networks for drop and folded connections, it is possible to reduce the number of the cross points of the optical switch networks which do not contribute to a connection to be realized, and it is possible to reduce the required number of the cross points for the optical switch networks, realize a small-sized node and lower a cost.

In accordance with the seventh embodiment, since by means of the optical selective switch network and the (M·n)×1 optical switch or another optical selective switch network and the L×1 optical switch, the optical switch networks for pass and inserting connections and the optical switch networks for drop and folded connections are realized, respectively, and since each of the optical selective switch networks are constructed so that the optical signals are dropped only into the predetermined (M·n)×1 optical switch and the L×1 optical switch, it is possible to reduce the required number of the cross points for the optical switch networks, realize a small-sized node and lower a cost, and it is possible to reduce an optical loss.

In accordance with the eighth embodiment, since the optical switch networks are divided for every connecting function in the optical node, it is possible to reduce the number of the cross points of the optical switch networks which do not contribute to a connection to be realized, and it is possible to realize a small-sized node and lower a cost.

The entire disclosure of Japanese Patent Applications No. 9-203682 filed on Jul. 30, 1997 and No. 10-56086 filed on Feb. 19, 1998 including specification, claims, drawing and summary are incorporated herein by reference in its entirety.

What is claimed is:

1. An optical communication network node comprising:

first optical dropping means for dropping optical signals having arbitrary wavelengths of wavelength-multiplex optical signals which is multiplied by a wavelength;

switching means for conducting switching of a signal after a drop by means of said optical dropping means, and an external input signal that is externally input; and first optical inserting means for joining a signal after switching by means of said switching means to said wavelength-multiplexing optical signals, wherein said switching means includes:

second optical dropping means for further dropping optical signals having arbitrary wavelengths of the signal after drop by means of said first optical dropping means;

a first input terminal to which a signal after drop by means of said second optical dropping means is input;

a plurality of first output terminals;

a first ATM switch for outputting an input to said first input terminal to a desired one of said plurality of first output terminals;

a second input terminal to which said external input signal is input;

a plurality of second output terminals;

a second ATM switch for outputting an input to said second input terminal to a desired one of said plurality of output terminals; and second optical inserting means for joining an output of said second ATM switch to the signal after drop by means of said first optical dropping means.

2. An optical communication network node according to claim 1, wherein said first and second ATM switches output said input to said input terminal to a desired one of said plurality of output terminals in accordance with contents of headers of ATM cells.

3. An optical communication network node having both an ATM exchange function for exchanging ATM cells and an optical exchange function for exchanging optical signals as it is, comprising:

a plurality of wavelength-multiplex receiving interfaces with buffers, having one input end and a plurality of output ends, for, after separating wavelength-multiplex optical signals input from said one input end through each of a plurality of first input optical transmission lines into a plurality of optical signals having different wavelengths, outputting said plurality of optical signals as it is from each of said plurality of output ends, or converting said plurality of optical signals into electric signals, temporarily storing ATM cells in said buffers, which are taken out from transmission frames, and after processing headers of said ATM cells output from said buffers, converting said electric signals into optical signals and outputting said optical signals from each of said plurality of output ends;

a plurality of receiving interfaces with buffers, having one input end and one output end, for converting optical signals input from said input end through each of a plurality of second input optical transmission lines into electric signals, temporarily storing ATM cells in said buffers, which are taken out from transmission frames, and after processing headers of said ATM cells output from said buffers, converting said electric signals into optical signals and outputting said optical signals from said output end;

a plurality of wavelength-multiplex transmitting interfaces, having a plurality of input ends and one output end, for converting each of optical signals on optical circuits, which are input from said plurality of input ends, into an optical signal having a predetermined wavelength as it is, or for, after storing ATM cells in transmission frames, which are taken out by converting each of optical signals from said plurality of input ends into electric signals, converting said electric signals into optical signals having said predetermined wavelength, combining said plurality of converted optical signals having said predetermined wavelength, outputting wavelength-multiplex optical signals from said one output end, and transmitting said signals to a plurality of first output optical transmission lines;

a plurality of transmitting interfaces, having one input end and one output end, for, after storing ATM cells in transmission frames, which are taken out by converting each of optical signals input from said input end into electric signals, converting said electric signals into optical signals, outputting said optical signals from said output end, and transmitting said signals to a plurality of second output optical transmission lines;

a first optical switch network, having a plurality of input ends and a plurality of output ends which are connected to each output end of said plurality of wavelength-multiplex receiving interfaces with said buffers, respectively, for setting said predetermined optical circuits between said plurality of predetermined input ends and output ends, or for exchanging said optical signals cell by cell under control by said plurality of wavelength-multiplex is receiving interfaces with said buffers;

a second optical switch network, having a plurality of input ends and a plurality of output ends which are connected to each output end of said plurality of receiving interfaces with said buffers, respectively, for exchanging said optical signals cell by cell under control by said plurality of receiving interfaces with said buffers; and an optical distributing switch network, having a plurality of input ends and a plurality of output ends which are connected to said first and second optical switch networks, for switching optical signals from said plurality of input ends to said output ends which are connected to said input ends of said plurality of predetermined wavelength-multiplex transmitting interfaces and said input end of said plurality of transmitting interfaces.

4. An optical communication network node according to claim 3, wherein each of said switch networks includes:

a plurality of optical separators, provided in a plurality of optical sub-switch modules, respectively, for separating an input signal into a plurality of optical signals; and a plurality of optical switches, provided in said plurality of optical sub-switch modules, respectively, for switching optical signals output from said optical separators to predetermined circuits between said input terminals and said output terminals of said optical switch networks in a circuit switching manner and selecting and outputting one of said optical signals, or for selecting and outputting one of optical signals separated by said optical separators, based on switching control signals in accordance with headers of cells which are processed by said wavelength-multiplex receiving interfaces with buffers.

5. An optical communication network node according to claim 3, wherein said wavelength-multiplex receiving interfaces with buffers includes:

a wavelength de-multiplexer for separating wavelength-multiplex signals input from said first optical transmission lines into a plurality of wavelengths;

a plurality of optical switches for directly outputting optical signals having a plurality of wavelengths output from said wavelength de-multiplexer, or for separating said optical signals so as to output said separated signals to a photoelectric converting system and an electrooptical converting system;

a opto-electro converter, provided in said photoelectric converting system and said electrooptical converting system of each of said optical switches, for converting said optical signals into electric signals;

a flaming circuit for receiving said electric signals converted in said opto-electro converter and taking out cells from transmission frame;

buffers temporally storing said cells taken out from said flaming circuit;

a routing table for analyzing headers of said cells output from said buffers and conducting a process for rewriting values in said header to predetermined values;

an electro-opto converter for converting said cells output from said routing table into optical cells; and optical combiners, provided in every said optical switch, for combining said optical cells converted in said electro-opto converter and said optical signals output from said optical switches.

6. An optical communication network node according to claim 5, wherein said transmitting interfaces includes:

a opto-electro converter for converting optical signals input from said optical distributing switch network into electric signals;

a cell inserting circuit for receiving said electric signals converted in said opto-electro converter and inserting said electric signals into transmission frame; and an electro-opto converter for converting said electric signals inserted into said transmission frames by said cell inserting circuit into optical signals and outputting said optical signals.

7. An optical communication network node according to claim 3, wherein said receiving interfaces with buffers includes:

a opto-electro converter for converting input optical signals into electric signals;

a flaming circuit for receiving said electric signals converted in said opto-electro converter and taking out cells from transmission frame;

buffers temporally storing said cells taken out from said flaming circuit;

a routing table for analyzing headers of said cells output from said buffers and conducting a process for rewriting values in said header to predetermined values; and an electro-opto converter for converting said cells output from said routing table into optical cells and outputting said optical cells.

8. An optical communication network node according to claim 3, wherein said transmitting interfaces includes:

a opto-electro converter for converting optical signals input from said optical distributing switch network into electric signals;

a cell inserting circuit for receiving said electric signals converted in said opto-electro converter and inserting said electric signals into transmission frame; and an electro-opto converter for converting said electric signals inserted into said transmission frames by said cell inserting circuit into optical signals and outputting said optical signals.

9. An optical communication network node having both an ATM exchange function for exchanging ATM cells and an optical exchange function for exchanging optical signals as it is, comprising:

a plurality of wavelength-multiplex receiving interfaces with buffers, having one input end and a plurality of output ends, for, after separating wavelength-multiplex optical signals input from said one input end through each of a plurality of first input optical transmission lines into a plurality of optical signals having different wavelengths, outputting said plurality of optical signals as it is from each of said plurality of output ends, or converting said plurality of optical signals into electric signals, temporarily storing ATM cells in said buffers, which are taken out from transmission frames, and after processing headers of said ATM cells output from said buffers, converting said electric signals into optical signals and outputting said optical signals from each of said plurality of output ends;

a plurality of receiving interfaces with buffers, having one input end and one output end, for converting optical signals input from said input end through each of a plurality of second input optical transmission lines into electric signals, temporarily storing ATM cells in said buffers, which are taken out from transmission frames, and after processing headers of said ATM cells output from said buffers, converting said electric signals into optical signals and outputting said optical signals from said output end;

a plurality of wavelength-multiplex transmitting interfaces, having a plurality of input ends and one output end, for converting each of optical signals on optical circuits, which are input from said plurality of input ends, into an optical signal having predetermined wavelengths as it is, or for, after storing ATM cells in transmission frames, which are taken out by converting each of optical signals from said plurality of input ends into electric signals, converting said electric signals into optical signals having said predetermined wavelengths, combining said plurality of converted optical signals having said predetermined wavelengths, outputting wavelength-multiplex optical signals from said one output end, and transmitting said signals to a plurality of first output optical transmission lines;

a plurality of transmitting interfaces, having one input end and one output end, for, after storing ATM cells in transmission frames, which are taken out by converting each of optical signals input from said input end into electric signals, converting said electric signals into optical signals, outputting said optical signals from said output end, and transmitting said signals to a plurality of second output optical transmission lines;

first and second optical selective switch networks, having a plurality of input ends and a plurality of output ends, for selectively sending optical signals from said plurality of input ends which are connected to said output ends of said plurality of wavelength-multiplex receiving interfaces with said buffers and said output end of said receiving interfaces with said buffers, respectively, to said predetermined one or more than one output ends;

a plurality of first optical switches, having a plurality of input ends and one output end which are connected to said output ends of said first optical selective switch network, for setting predetermined optical circuits between said plurality of predetermined input ends and one output end, or for exchanging said optical signals cell by cell under control by said plurality of wavelength-multiplex receiving interfaces with said buffers;

a plurality of second optical switches, having a plurality of input ends and one output end which are connected to said output ends of said second optical selective switch network, for exchanging said optical signals cell by cell under control by said plurality of receiving interfaces with said buffers; and an optical distributing switch network, having a plurality of input ends which are connected to output ends of said first and second optical switches, and an output end which is connected to said input ends of said plurality of wavelength-multiplex transmitting interfaces and said input end of said transmitting interfaces, for switching optical signals from said plurality of input ends to said predetermined output end.

10. An optical communication network node according to claim 9, wherein said wavelength-multiplex receiving interfaces with buffers includes:

a wavelength de-multiplexer for separating wavelength-multiplex signals input from said first optical transmission lines into a plurality of wavelengths;

a plurality of optical switches for directly outputting optical signals having a plurality of wavelengths output from said wavelength de-multiplexer, or for separating said optical signals so as to output said separated signals to a photoelectric converting system and an electrooptical converting system;

a opto-electro converter, provided in said photoelectric converting system and said electrooptical converting system of each of said optical switches, for converting said optical signals into electric signals;

a flaming circuit for receiving said electric signals converted in said opto-electro converter and taking out cells from transmission frame;

buffers temporally storing said cells taken out from said flaming circuit;

a routing table for analyzing headers of said cells output from said buffers and conducting a process for rewriting values in said header to predetermined values;

an electro-opto converter for converting said cells output from said routing table into optical cells; and optical combiners, provided in every said optical switch, for combining said optical cells converted in said electro-opto converter and said optical signals output from said optical switches.

11. An optical communication network node according to claim 9, wherein said wavelength-multiplex transmitting interfaces includes:

a plurality of optical switches for outputting optical signals input from said optical distributing switch network as it is, or for separating said optical signals so as to output said separated signals to a photoelectric converting system and an electrooptical converting system;

a wavelength converter for converting said optical signals output from said optical switches as it is into optical signals having predetermined wavelengths;

a opto-electro converter, provided in said photoelectric converting system and said electrooptical converting system, for converting optical signals output from said optical switches into electric signals;

a cell inserting circuit for receiving said electric signals converted in said opto-electro converter and inserting said electric signals into transmission frame; and an electro-opto converter for converting said electric signals inserted into said transmission frames by said cell inserting circuit into optical signals having predetermined wavelengths;

optical combiners, provided in every said optical switch, for combining said optical cells converted in said electro-opto converter and said optical signals converted in said wavelength converters; and a wavelength multiplexer for combining said optical signals in each of said optical combiners and outputting wavelength-multiplex signals.

12. An optical communication network node according to claim 9, wherein said first and second selective switch networks includes:

a plurality of optical switches for dropping optical signals input from said wavelength-multiplex receiving interfaces with buffers or said receiving interfaces with buffers only into predetermined output ports, and output said optical signals by selectively dropping said signals into an arbitrary output terminal group of a plurality of output terminal groups one by one.

13. An optical communication network node having both an ATM exchange function for exchanging ATM cells and an optical exchange function for exchanging optical signals as it is, comprising:

a plurality of wavelength-multiplex receiving interfaces with buffers, having one input end and a plurality of output ends, for, after separating wavelength-multiplex optical signals input from said one input end through each of a plurality of first input optical transmission lines into a plurality of optical signals having different wavelengths, outputting said plurality of optical signals as it is from each of said plurality of output ends, or converting said plurality of optical signals into electric signals, temporarily storing ATM cells in said buffers, which are taken out from transmission frames, and after processing headers of said ATM cells output from said buffers, converting said electric signals into optical signals and outputting said optical signals from each of said plurality of output ends;

a plurality of receiving interfaces with buffers, having one input end and one output end, for converting optical signals input from said input end through each of a plurality of second input optical transmission lines into electric signals, temporarily storing ATM cells in said buffers, which are taken out from transmission frames, and after processing headers of said ATM cells output from said buffers, converting said electric signals into optical signals and outputting said optical signals from said output end;

a plurality of wavelength-multiplex transmitting interfaces, having a plurality of input ends and one output end, for converting each of optical signals on optical circuits, which are input from said plurality of input ends, into optical signals having predetermined wavelengths as it is, or for, after storing ATM cells in transmission frames, which are taken out by converting each of optical signals from said plurality of input ends into electric signals, converting said electric signals into optical signals having said predetermined wavelengths, combining said plurality of converted optical signals having said predetermined wavelengths, outputting wavelength-multiplex optical signals from said one output end, and transmitting said signals to a plurality of first output optical transmission lines;

a plurality of transmitting interfaces, having one input end and one output end, for, after storing ATM cells in transmission frames, which are taken out by converting each of optical signals input from said input end into electric signals, converting said electric signals into optical signals, outputting said optical signals from said output end, and transmitting said signals to a plurality of second output optical transmission lines;

a first optical switch network, having a plurality of input ends and a plurality of output ends which are connected to each output end of said wavelength-multiplex receiving interfaces, for setting said predetermined optical circuits between said plurality of predetermined input ends and output ends, or for exchanging said optical signals cell by cell under control by said plurality of wavelength-multiplex receiving interfaces with said buffers and said plurality of receiving interfaces with said buffers;

a second optical switch network, having a plurality of input ends and a plurality of output ends which are connected to each output end of said receiving interfaces, for exchanging said optical signals cell by cell under control by said plurality of wavelength-multiplex receiving interfaces with said buffers and said plurality of receiving interfaces with said buffers; and an optical distributing switch network, having a plurality of input ends which are connected to each output end of said plurality of wavelength-multiplex receiving interfaces with said buffers and said plurality of multiplex interfaces with said buffers, and a plurality of output ends which are connected to said input ends of said first optical switch network and said inputs of said second optical switch network, for switching optical signals from said plurality of input ends to said predetermined output ends.

14. An optical communication network node having both an ATM exchange function for exchanging ATM cells and an optical exchange function for exchanging optical signals as it is, comprising:

a plurality of wavelength-multiplex receiving interfaces with buffers, having one input end and a plurality of output ends, for, after separating wavelength-multiplex optical signals input from said one input end through each of a plurality of first input optical transmission lines into a plurality of optical signals having different wavelengths, outputting said plurality of optical signals as it is from each of said plurality of output ends, or converting said plurality of optical signals into electric signals, temporarily storing ATM cells in said buffers, which are taken out from transmission frames, and after processing headers of said ATM cells output from said buffers, converting said electric signals into optical signals and outputting said optical signals from each of said plurality of output ends;

a plurality of receiving interfaces with buffers, having one input end and one output end, for converting optical signals input from said input end is through each of a plurality of second input optical transmission lines into electric signals, temporarily storing ATM cells in said buffers, which are taken out from transmission frames, and after processing headers of said ATM cells output from said buffers, converting said electric signals into optical signals and outputting said optical signals from said output end;

a plurality of wavelength-multiplex transmitting interfaces, having a plurality of input ends and one output end, for converting each of optical signals on optical circuits, which are input from said plurality of input ends, into an optical signal having a predetermined wavelength as it is, or for, after storing ATM cells in transmission frames, which are taken out by converting each of optical signals from said plurality of input ends into electric signals, converting said electric signals into optical signals having said predetermined wavelength, combining said plurality of converted optical signals having said predetermined wavelength, outputting wavelength-multiplex optical signals from said one output end, and transmitting said signals to a plurality of first output optical transmission lines;

a plurality of transmitting interfaces, having one input end and one output end, for, after storing ATM cells in transmission frames, which are taken out by converting each of optical signals input from said input end into electric signals, converting said electric signals into optical signals, outputting said optical signals from said output end, and transmitting said signals to a plurality of second output optical transmission lines;

first and second optical selective switch networks, having a plurality of input ends and a plurality of output ends, for selectively dropping optical signals from said plurality of input ends into said predetermined one or more than one output ends;

a plurality of first optical switches, having a plurality of input ends which are connected to each of the output ends of said first optical selective switch network, and one output end which is connected to each input end of each of said wavelength-multiplex receiving interfaces, for setting predetermined optical circuits between said plurality of predetermined input ends and one output end, or for exchanging said optical signals cell by cell under control by said plurality of wavelength-multiplex receiving interfaces with said buffers and said plurality of receiving interfaces with the buffers;

a plurality of second optical switches, having a plurality of input ends which are connected to said output ends of said second optical selective switch network, and one output end, for exchanging said optical signals cell by cell under control by said plurality of wavelength-multiplex receiving interfaces with said buffers and said plurality of receiving interfaces with said buffers; and an optical distributing switch network, having a plurality of input ends which are connected to each of the output ends of said plurality of wavelength-multiplex receiving interfaces with said buffers, and a plurality of output ends which are connected to each of said input ends of said first optical selective switch network and said second optical selective switch network, for switching optical signals from said plurality of input ends to said predetermined output ends.

15. An optical communication network node having both an ATM exchange function for exchanging ATM cells and an optical exchange function for exchanging optical signals as it is, comprising:

a plurality of wavelength-multiplex receiving interfaces with buffers, having one input end, a plurality of first output ends, and a plurality of second output ends, for, after separating wavelength-multiplex optical signals input from said one input end through each of a plurality of first input optical transmission lines into a plurality of optical signals having different wavelengths, outputting said plurality of optical signals as it is from each of said plurality of first output ends, or converting said plurality of optical signals into electric signals, temporarily storing ATM cells in said buffers, which are taken out from transmission frames, and after processing headers of said ATM cells output from said buffers, converting said electric signals into optical signals and outputting said optical signals from each of said plurality of second output ends;

a plurality of receiving interfaces with buffers, having one input end and one output end, for converting optical signals input from said input end through each of a plurality of second input optical transmission lines into electric signals, temporarily storing ATM cells in said buffers, which are taken out from transmission frames, and after processing headers of said ATM cells output from said buffers, converting said electric signals into optical signals and outputting said optical signals from said output end;

a plurality of wavelength-multiplex transmitting interfaces, having a plurality of first input ends, a plurality of second input ends, and one output end, for converting each of optical signals on optical circuits, which are input from said plurality of first input ends, into an optical signal having a predetermined wavelength as it is, or for, after storing ATM cells in transmission frames, which are taken out by converting each of optical signals from said plurality of second input ends into electric signals, converting said electric signals into optical signals having said predetermined wavelength, combining said plurality of converted optical signals having said predetermined wavelength, outputting wavelength-multiplex optical signals from said one output end, and transmitting said signals to a plurality of first output optical transmission lines;

a plurality of transmitting interfaces, having one input end and one output end, for, after storing ATM cells in transmission frames, which are taken out by converting each of optical signals input from said input end into electric signals, converting said electric signals into optical signals, outputting said optical signals from said output end to said plurality of first output optical transmission lines;

a first optical switch network, having a plurality of input ends which are connected to said first output ends of said wavelength-multiplex receiving interfaces with said buffers, and an output end which is connected to said input end of said plurality of wavelength-multiplex receiving interfaces, for setting said predetermined optical circuits between said plurality of predetermined input ends and output end;

a second optical switch network, having a plurality of input ends which are connected to said second output ends of said wavelength-multiplex receiving interfaces with buffers, and a plurality of output ends which are connected to said input end of said transmitting interfaces through an optical combiner, for exchanging said optical signals cell by cell under control by said plurality of wavelength-multiplex receiving interfaces with said buffers;

a third optical switch network, having a plurality of input ends which are connected to said output end of said plurality of receiving interfaces with said buffers through an optical separator, and a plurality of output ends which are connected to said input end of said transmitting interfaces through said optical combiner, for exchanging said optical signals cell by cell under control by said plurality of receiving interfaces with said buffers; and a fourth optical switch network, having a plurality of input ends which are connected to said output end of said plurality of receiving interfaces with said buffers through said optical separator, and a plurality of output ends which are connected to each of said second input ends of said plurality of wavelength-multiplex transmitting interfaces, for exchanging said optical signals cell by cell under control by said plurality of receiving interfaces with said buffers.

16. An optical communication network node according to claim 15, wherein said receiving interfaces with buffers includes:

a opto-electro converter for converting input optical signals into electric signals;

a flaming circuit for receiving said electric signals converted in said opto-electro converter and taking out cells from transmission frame;

buffers temporally storing said cells taken out from said flaming circuit;

a routing table for analyzing headers of said cells output from said buffers and conducting a process for rewriting values in said header to predetermined values; and an electro-opto converter for converting said cells output from said routing table into optical cells and outputting said optical cells.

17. An optical communication network node according to claim 15, wherein said wavelength-multiplex receiving interfaces with buffers includes:

a wavelength de-multiplexer for separating wavelength-multiplex signals input from said first optical transmission lines into a plurality of wavelengths;

a plurality of optical switches, in case of converting optical signals having a plurality of wavelengths in an ATM which are output from said wavelength de-multiplexer, for outputting said optical signals to said optical switch networks, or for separating said optical signals so as to output said separated signals to a photoelectric converting system and an electrooptical converting system;

a opto-electro converter, provided in said photoelectric converting system and said electrooptical converting system of each of said optical switches, for converting said optical signals into electric signals;

a flaming circuit for receiving said electric signals converted in said opto-electro converter and taking out cells from transmission frame;

buffers temporally storing said cells taken out from said flaming circuit;

a routing table for analyzing headers of said cells output from said buffers and conducting a process for rewriting values in said header to predetermined values;

and an electro-opto converter for converting said cells output from said routing table into optical cells.

18. An optical communication network node according to claim 15, wherein said wavelength-multiplex transmitting interfaces includes:

a plurality of wavelength converters for converting optical signals exchanged in said first optical switch network into optical signals having predetermined wavelengths;

a plurality of opto-electro converters, provided in a photoelectric converting system and a electrooptical converting system, for converting optical signals converted in an ATM by said fourth optical switch network of said receiving interfaces with said buffers into electric signals;

a plurality of cell inserting circuits for inserting said electric signals converted in said opto-electro converters into transmission frame;

a plurality of electro-opto converters for converting said electric signals from said cell inserting circuits into optical signals having predetermined wavelengths; and optical combiners, provided in every said photoelectric converting system and said electrooptical converting system, for combining said optical signals of which wavelength has been converted in said wavelength converters and said optical signals converted in said electro-opto converters.

19. An optical communication network node according to claim 15, wherein each of said switch networks includes:

a plurality of wavelength converters, provided in a plurality of optical sub-switch modules, respectively, for converting input optical signals into optical signals having predetermined wavelengths;

a plurality of star couplers, provided in said plurality of optical sub-switch modules, respectively, for multiplexing optical signals input from said wavelength converters and separating said optical signals into a plurality of wavelength-multiplex signals;

a plurality of optical switches, provided in said optical sub-switch modules, respectively, for selecting one of said wavelength-multiplex signals separated from said star couplers, respectively; and a variable wavelength filter, provided in each of said optical sub-switch modules for every said optical switch, for selecting optical signals having predetermined wavelengths of one wavelength-multiplex signal selected every said optical switch, and outputting said optical signals.

* * * * *